US009031259B2

(12) United States Patent
Yamabe

(10) Patent No.: US 9,031,259 B2
(45) Date of Patent: May 12, 2015

(54) NOISE REDUCTION APPARATUS, AUDIO INPUT APPARATUS, WIRELESS COMMUNICATION APPARATUS, AND NOISE REDUCTION METHOD

(75) Inventor: Takaaki Yamabe, Yokohama (JP)

(73) Assignee: JVC Kenwood Corporation, Kanagawa-Ku, Yokohama-Shi, Kanagawa-Ken (JP)

( * ) Notice: Subject to any disclaimer, the term of this patent is extended or adjusted under 35 U.S.C. 154(b) by 426 days.

(21) Appl. No.: 13/617,143

(22) Filed: Sep. 14, 2012

(65) Prior Publication Data

US 2013/0073283 A1 Mar. 21, 2013

(30) Foreign Application Priority Data

Sep. 15, 2011 (JP) ................................ 2011-201759
Sep. 15, 2011 (JP) ................................ 2011-201760

(51) Int. Cl.
*H04B 15/00* (2006.01)
*H04R 3/00* (2006.01)
*G10L 21/0216* (2013.01)

(52) U.S. Cl.
CPC ... *G10L 21/0216* (2013.01); *G10L 2021/02165* (2013.01)

(58) Field of Classification Search
CPC ............ G10L 2021/02165; G10L 2021/02166
USPC ...................................................... 381/92–95
See application file for complete search history.

(56) References Cited

U.S. PATENT DOCUMENTS 4,742,548 A * 5/1988 Sessler et al. ................... 381/92
5,226,076 A * 7/1993 Baumhauer et al. ..... 379/420.02
6,069,961 A * 5/2000 Nakazawa ...................... 381/92
6,339,758 B1 * 1/2002 Kanazawa et al. ............ 704/226
7,092,529 B2 * 8/2006 Yu et al. ..................... 381/71.11
7,983,720 B2 * 7/2011 Chen .......................... 455/575.1
8,194,880 B2 * 6/2012 Avendano ....................... 381/92
2004/0066941 A1 * 4/2004 Amada et al. ................... 381/98
2007/0076898 A1 * 4/2007 Sarroukh et al. ................ 381/92
2008/0260175 A1 * 10/2008 Elko ............................ 381/73.1
2009/0043577 A1 * 2/2009 Godavarti ...................... 704/233
2010/0323652 A1 * 12/2010 Visser et al. ............... 455/232.1
2012/0130713 A1 * 5/2012 Shin et al. ..................... 704/233
2013/0073283 A1 * 3/2013 Yamabe ........................ 704/226

FOREIGN PATENT DOCUMENTS

JP 06-067693 3/1994
JP 2000-305594 11/2000
JP 2010-232862 10/2010

* cited by examiner

*Primary Examiner* — Samuel G Neway

(74) *Attorney, Agent, or Firm* — Renner, Kenner, Greive, Bobak, Taylor & Weber

(57) ABSTRACT

It is determined whether or not a sound picked up by at least either a first microphone or a second microphone is a speech segment. When it is determined that the sound picked up by the first or the second microphone is the speech segment, a voice incoming direction indicating from which direction a voice sound travels is detected based on a first sound pick-up signal obtained based on a sound picked up by the first microphone and a second sound pick-up signal obtained based on a sound picked up by the second microphone. A noise reduction process is performed using the first and second sound pick-up signals based on speech segment information indicating that the sound picked up by the first or the second microphone is the speech segment and voice incoming-direction information indicating the voice incoming direction.

20 Claims, 21 Drawing Sheets

118

NOISE REDUCTION APPARATUS, AUDIO INPUT APPARATUS, WIRELESS COMMUNICATION APPARATUS, AND NOISE REDUCTION METHOD

CROSS-REFERENCE TO RELATED APPLICATIONS

This application is based on and claims the benefit of priority from the prior Japanese Patent Application No. 2011-201759 filed on Sep. 15, 2011 and the prior Japanese Patent Application No. 2011-201760 filed on Sep. 15, 2011, the entire contents of which are incorporated herein by reference.

BACKGROUND OF THE INVENTION

The present invention relates to a noise reduction apparatus, an audio input apparatus, a wireless communication apparatus, and a noise reduction method.

A noise cancelling function (a noise reduction apparatus) is known for reducing noise components carried by a voice signal so that a voice sound can be clearly listened.

In a known noise cancelling function, a noise signal obtained based on a sound picked up by a sub-microphone for use in picking up mainly noise sounds is subtracted from a voice signal obtained based on a sound picked up by a main microphone for use in picking up mainly voice sounds, thereby reducing noise components carried by the voice signal. However, the known noise cancelling function does not work well in an environment of high noise level.

Therefore, the known noise cancelling function does not satisfy a demand for high quality of a voice sound, for example, in communication using a wireless communication apparatus in an environment of high noise level.

SUMMARY OF THE INVENTION

A purpose of the present invention is to provide a noise reduction apparatus, an audio input apparatus, a wireless communication apparatus, and a noise reduction method that can reduce a noise component carried by a voice signal in a variety of environments.

The present invention provides a noise reduction apparatus comprising: a speech segment determiner configured to determine whether or not a sound picked up by at least either a first microphone or a second microphone is a speech segment and to output speech segment information when it is determined that the sound picked up by the first or the second microphone is the speech segment; a voice direction detector configured, when receiving the speech segment information, to detect a voice incoming direction indicating from which direction a voice sound travels, based on a first sound pick-up signal obtained based on a sound picked up by the first microphone and a second sound pick-up signal obtained based on a sound picked up by the second microphone and to output voice incoming-direction information when the voice incoming direction is detected; and an adaptive filter configured to perform a noise reduction process using the first and second sound pick-up signals based on the speech segment information and the voice incoming-direction information.

Moreover, the present invention provides an audio input apparatus comprising: a first face and an opposite second face that is apart from the first face with a specific distance; a first microphone or a second microphone provided on the first face and the second face, respectively; a speech segment determiner configured to determine whether or not a sound picked up by at least either the first microphone or the second microphone is a speech segment and to output speech segment information when it is determined that the sound picked up by the first or the second microphone is the speech segment; a voice direction detector configured, when receiving the speech segment information, to detect a voice incoming direction indicating from which direction a voice sound travels, based on a first sound pick-up signal obtained based on a sound picked up by the first microphone and a second sound pick-up signal obtained based on a sound picked up by the second microphone and to output voice incoming-direction information when the voice incoming direction is detected; and an adaptive filter configured to perform a noise reduction process using the first and second sound pick-up signals based on the speech segment information and the voice incoming-direction information.

Furthermore, the present invention provides a noise reduction method comprising the steps of: determining whether or not a sound picked up by at least either a first microphone or a second microphone is a speech segment; detecting a voice incoming direction indicating from which direction a voice sound travels, based on a first sound pick-up signal obtained based on a sound picked up by the first microphone and a second sound pick-up signal obtained based on a sound picked up by the second microphone, when it is determined that the sound picked up by the first or the second microphone is the speech segment; and performing a noise reduction process using the first and second sound pick-up signals based on speech segment information indicating that the sound picked up by the first or the second microphone is the speech segment and voice incoming-direction information indicating the voice incoming direction.

DETAILED DESCRIPTION OF PREFERRED EMBODIMENTS

Embodiments of a noise reduction apparatus, an audio input apparatus, a wireless communication apparatus, and a noise reduction method according the present invention will be explained with reference to the attached drawings.

Embodiment 1

Figure 1:
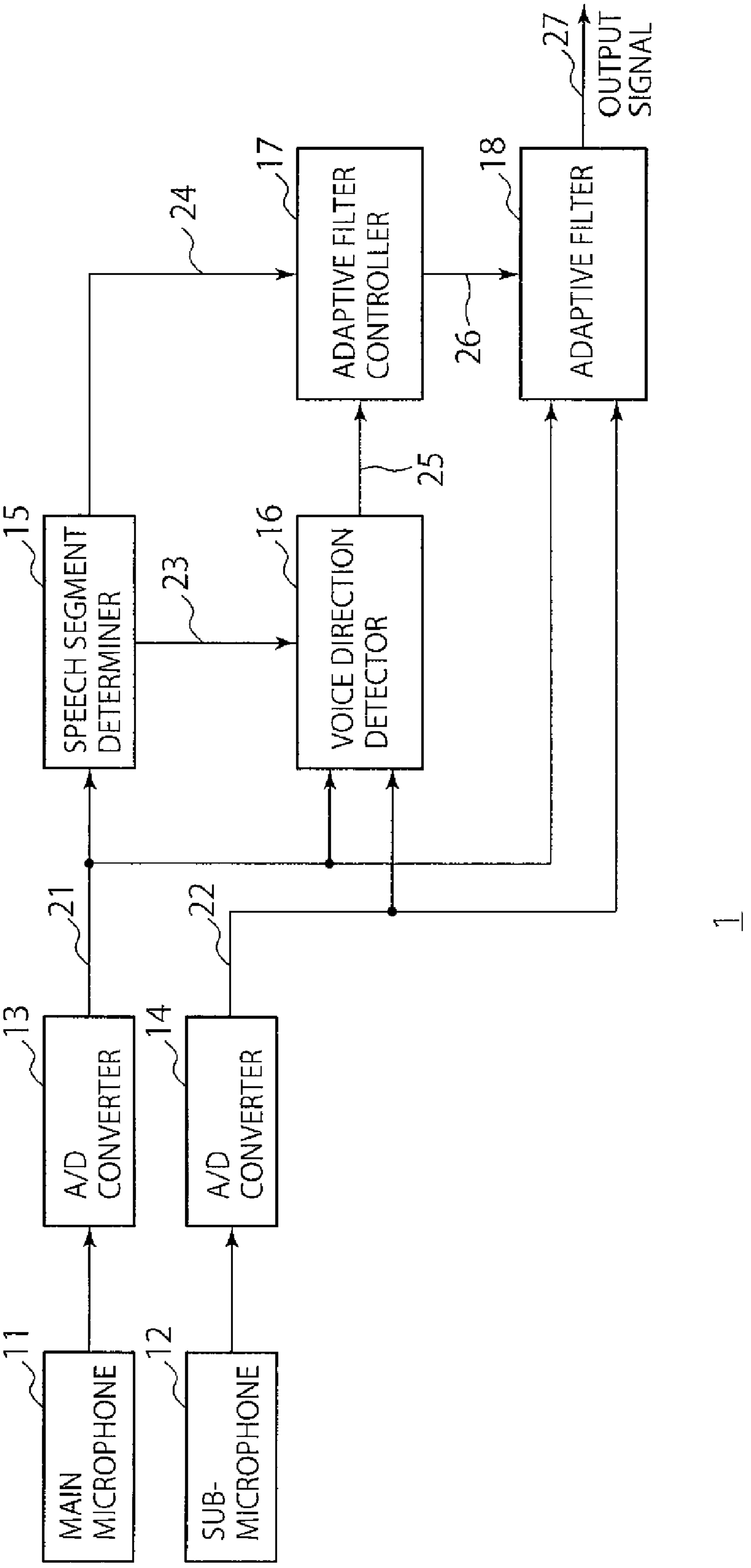
FIG. 1 is a block diagram schematically showing the configuration of a noise reduction apparatus according to a first embodiment of the present invention.

FIG. 1 is a block diagram schematically showing the configuration of a noise reduction apparatus 1 according to a first embodiment of the present invention.

The noise reduction apparatus 1 shown in FIG. 1 is provided with a main microphone 11, a sub-microphone 12, A/D converters 13 and 14, a speech segment determiner 15, a voice direction detector 16, an adaptive filter controller 17, and an adaptive filter 18.

The main microphone 11 and the sub-microphone 12 pick up a sound including a voice component (speech segment) and/or a noise component. In detail, the main microphone 11 is a voice-component pick-up microphone that picks up a sound that mainly includes a voice component and converts the sound into an analog signal that is output to the A/D converter 13. The sub-microphone 12 is a noise-component pick-up microphone that picks up a sound that mainly includes a noise component and converts the sound into an analog signal that is output to the A/D converter 14. A noise component picked up by the sub-microphone 12 is used for reducing a noise component included in a sound picked up by the main microphone 11, for example.

The first embodiment is described with two microphones (which are the main microphone 11 and the sub-microphone 12 in FIG. 1) connected to the noise reduction apparatus 1. However, two or more sub-microphones can be connected to the noise reduction apparatus 1.

In FIG. 1, the A/D converter 13 samples an analog signal output from the main microphone 11 at a predetermined sampling rate and converts the sampled analog signal into a digital signal to generate a sound pick-up signal 21. A signal that carries a sound picked up by a microphone is referred to as a sound pick-up signal, hereinafter. The sound pick-up signal 21 generated by the A/D converter 13 is output to the speech segment determiner 15, the voice direction detector 16, and the adaptive filter 18.

The A/D converter 14 samples an analog signal output from the sub-microphone 12 at a predetermined sampling rate and converts the sampled analog signal into a digital signal to generate a sound pick-up signal 22. The sound pick-up signal 22 generated by the A/D converter 14 is output to the voice direction detector 16 and the adaptive filter 18.

In the first embodiment, a frequency band for a voice sound input to the main microphone 11 and the sub-microphone 12 is roughly in the range from 100 Hz to 4,000 Hz, for example. In this frequency band, the A/D converters 13 and 14 convert an analog signal carrying a voice component into a digital signal at a sampling frequency in the range from about 8 kHz to 12 kHz.

A sound pick-up signal that mainly carries a voice component is referred to as a voice signal, hereinafter. On the other hand, a sound pick-up signal that mainly carries a noise component is referred to as a noise-dominated signal, hereinafter.

The speech segment determiner 15 determines whether or not a sound picked up the main microphone 11 is a speech segment (voice component) based on a sound pick-up signal 21 output from the A/D converter 13. When it is determined that a sound picked up the main microphone 11 is a speech segment, the speech segment determiner 15 outputs speech segment information 23 and 24 to the voice direction detector 16 and the adaptive filter controller 17, respectively.

The speech segment determiner 15 can employ any speech segment determination techniques. However, when the noise reduction apparatus 1 is used in an environment of high noise level, highly accurate speech segment determination is required. In such a case, for example, a speech segment determination technique I described in U.S. patent application Ser. No. 13/302,040 or a speech segment determination technique II described in U.S. patent application Ser. No. 13/364,016 can be used. With the speech segment determination technique I or II, a human voice is mainly detected and a speech segment is detected accurately.

The speech segment determination technique I focuses on frequency spectra of a vowel sound that is a main component of a voice sound, to detect a speech segment. In detail, in the speech segment determination technique I, a signal-to-noise ratio is obtained between a peak level of a vowel-sound frequency component and a noise level appropriately set in each frequency band and it is determined whether the obtained signal-to-noise ratio is a specific ratio for a specific number of peaks, thereby detecting a speech segment.

Figure 2:
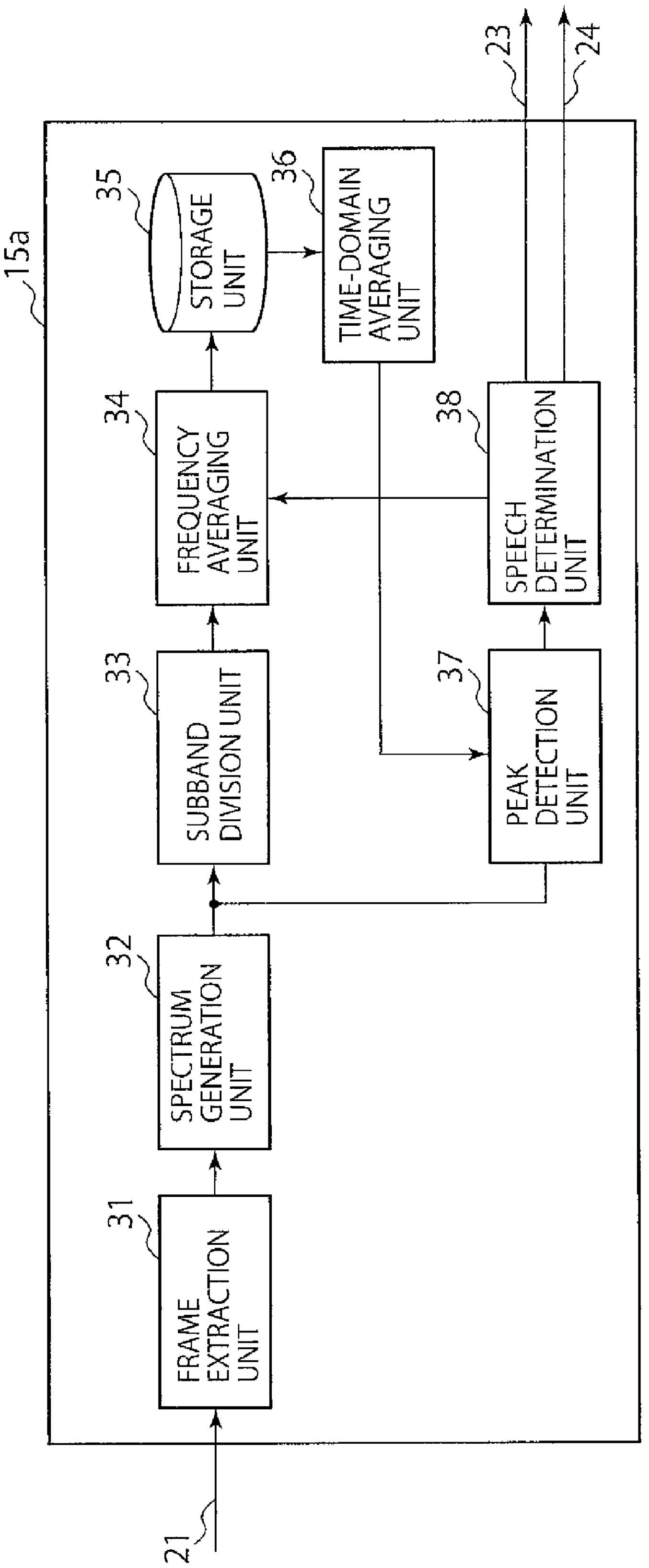
FIG. 2 is a block diagram schematically showing an exemplary configuration of a speech segment determiner installed in the noise reduction apparatus according to the first embodiment of the present invention.

FIG. 2 is a block diagram schematically showing the configuration of a speech segment determiner 15*a* employing the speech segment determination technique I.

The speech segment determiner 15*a* is provided with a frame extraction unit 31, a spectrum generation unit 32, a subband division unit 33, a frequency averaging unit 34, a storage unit 35, a time-domain averaging unit 36, a peak detection unit 37, and a speech determination unit 38.

In FIG. 2, the sound pick-up signal 21 output from the AD converter 13 (FIG. 1) is input to the frame extraction unit 31. The frame extraction unit 31 extracts a signal portion for each frame having a specific duration corresponding to a specific number of samples from the input sound pick-up signal 21, to generate per-frame input signals. The frame extraction unit 31 sends the generated per-frame input signals to the spectrum generation unit 32 one after another.

The spectrum generation unit 32 performs frequency analysis of the per-frame input signals to convert the per-frame input signals in the time domain into per-frame input signals in the frequency domain, thereby generating a spectral pattern. The spectral pattern is the collection of spectra having different frequencies over a specific frequency band. The technique of frequency conversion of per-frame signals in the time domain into the frequency domain is not limited to any particular one. Nevertheless, the frequency conversion requires high frequency resolution enough for recognizing speech spectra. Therefore, the technique of frequency conversion in this embodiment may be FFT (Fast Fourier Transform), DCT (Discrete Cosine Transform), etc. that exhibit relatively high frequency resolution.

In FIG. 2, the spectrum generation unit 32 generates a spectral pattern in the range from at least 200 Hz to 700 Hz.

Spectra (referred to as formant, hereinafter) represent the feature of a voice and are to be detected in determining speech segments by the speech determination unit 38, which will be described later. The spectra generally involve a plurality of formants from the first formant corresponding to a fundamental pitch to the n-th formant (n being a natural number) corresponding to a harmonic overtone of the fundamental pitch. The first and second formants mostly exist in a frequency band below 200 Hz. This frequency band involves a low-frequency noise component with relatively high energy. Thus, the first and second formants tend to be embedded in the low-frequency noise component. A formant at 700 Hz or higher has low energy and hence also tends to be embedded in a noise component. Therefore, the determination of speech segments can be efficiently performed with a spectral pattern in a narrow range from 200 Hz to 700 Hz.

A spectral pattern generated by the spectrum generation unit 32 is sent to the subband division unit 33 and the peak detection unit 37.

The subband division unit 33 divides the spectral pattern into a plurality of subbands each having a specific bandwidth, in order to detect a spectrum unique to a voice for each appropriate frequency band. The specific bandwidth treated by the subband division unit 33 is in the range from 100 Hz to 150 Hz in this embodiment. Each subband covers about ten spectra.

The first formant of a voice is detected at a frequency in the range from about 100 Hz to 150 Hz. Other formants that are harmonic overtone components of the first formant are detected at frequencies, the multiples of the frequency of the first formant. Therefore, each subband involves about one formant in a speech segment when it is set to the range from 100 Hz to 150 Hz, thereby achieving accurate determination of a speech segment in each subband. On the other hand, if a subband is set wider than the range discussed above, it may involve a plurality of peaks of voice energy. Thus, a plurality of peaks may inevitably be detected in this single subband, which have to be detected in a plurality of subbands as the features of a voice, causing low accuracy in the determination of a speech segment. A subband set narrower than the range discussed above dose not improve the accuracy in the determination of a speech segment but causes a heavier processing load.

The frequency averaging unit 34 acquires average energy for each subband sent from the subband division unit 33. The frequency averaging unit 34 obtains the average of the energy of all spectra in each subband. Not only the spectral energy, the frequency averaging unit 34 can treat the maximum or average amplitude (the absolute value) of spectra for a smaller computation load.

The storage unit 35 is configured with a storage medium such as a RAM (Random Access Memory), an EEPROM (Electrically Erasable and Programmable Read Only Memory), a flash memory, etc. The storage unit 35 stores the average energy per subband for a specific number of frames (the specific number being a natural number N) sent from the frequency averaging unit 34. The average energy per subband is sent to the time-domain averaging unit 36.

The time-domain averaging unit 36 derives subband energy that is the average of the average energy derived by the frequency averaging unit 34 over a plurality of frames in the time domain. The subband energy is the average of the average energy per subband over a plurality of frames in the time domain. In this embodiment, the subband energy is treated as a standard noise level of noise energy in each subband. The average energy can be averaged to be the subband energy in the time domain with less drastic change. The time-domain averaging unit 36 performs a calculation according to an equation (1) shown below:

$$Eavr = \sum_{i=0}^{N} \frac{E(i)}{N} \tag{1}$$

where Eavr and E(i) are: the average of average energy over N frames; and average energy in each frame, respectively.

Instead of the subband energy, the time-domain averaging unit 36 may acquire an alternative value through a specific process that is applied to the average energy per subband of an immediate-before frame (which will be explained later) using a weighting coefficient and a time constant. In this specific process, the time-domain averaging unit 36 performs a calculation according to equations (2) and (3) shown below:

$$Eavr2 = \frac{\text{E\_last} \times \alpha + \text{E\_cur} \times \beta}{T} \tag{2}$$

where Eavr2, E_last, and E_cur are: an alternative value for subband energy; subband energy in an immediate-before frame that is just before a target frame that is subjected to a speech-segment determination process; and average energy in the target frame, respectively; and $$T = \alpha + \beta \tag{3}$$

where α and β are a weighting coefficient for E_last and E_cur, respectively, and T is a time constant.

Subband energy (a noise level for each subband) is stationary, hence is not necessarily quickly included in the speech-segment determination process for a target frame. Moreover, there is a case where, for a per-frame input signal that is determined as a speech segment by the speech determination unit 38, as described later, the time-domain averaging unit 36 does not include the energy of a speech segment in the derivation of suband energy or adjusts the degree of inclusion of the energy in the subband-energy derivation. For this purpose, suband energy is included in the speech-segment determination process for a target frame after the speech-segment determination for the frame just before the target frame at the speech determination unit 38. Accordingly, the subband energy derived by the time-domain averaging unit 36 is used in the segment determination at the speech determination unit 38 for a frame next to the target frame.

The peak detection unit 37 derives an energy ratio (SNR: Signal to Noise Ratio) of the energy in each spectrum in the spectral pattern (sent from the spectrum generation unit 32) to the subband energy (sent from the time-domain averaging unit 36) in a subband in which the spectrum is involved.

In detail, the peak detection unit 37 performs a calculation according to an equation (4) shown below, using the subband energy for which the average energy per subband has been included in the subband-energy derivation in the frame just before a target frame, to derive SNR per spectrum $$SNR = \frac{\text{E\_spec}}{\text{Noise\_Level}} \tag{4}$$

where SNR, E_spec, and Noise_Level are: a signal to noise ratio (a ratio of spectral energy to subband energy; spectral energy; and subband energy (a noise level in each subband), respectively.

It is understood from the equation (4) that a spectrum with SNR of 2 has a gain of about 6 dB in relation to the surrounding average spectra.

Then, the peak detection unit 37 compares SNR per spectrum and a predetermined first threshold level to determine whether there is a spectrum that exhibits a higher SNR than the first threshold level. If it is determined that there is a spectrum that exhibits a higher SNR than the first threshold level, the peak detection unit 37 determines the spectrum as a formant and outputs formant information indicating that a formant has been detected, to the speech determination unit 38.

On receiving the formant information, the speech determination unit 38 determines whether a per-frame input signal of the target frame is a speech segment, based on a result of determination at the peak detection unit 37. In detail, the speech determination unit 38 determines that a per-frame input signal is a speech segment when the number of spectra of this per-frame input signal that exhibit a higher SNR than the first threshold level is equal to or larger than a first specific number.

Suppose that average energy is derived for all frequency bands of a spectral pattern and averaged in the time domain to acquire a noise level. In this case, even if there is a spectral peak (formant) in a band with a low noise level and that should be determined as a speech segment, the spectrum is inevitably determined as a non-speech segment when compared to a high noise level of the average energy. This results in erroneous determination that a per-frame input signal that carries the spectral peak is a non-speech segment.

To avoid such erroneous determination, the speech segment determiner 15*a* derives subband energy for each subband. Therefore, the speech determination unit 38 can accurately determine whether there is a formant in each subband with no effects of noise components in other subbands.

Moreover, the speech segment determiner 15*a* employs a feedback mechanism with average energy of spectra in subbands in the time domain derived for a current frame, for updating subband energy for the speech-segment determination process to the frame following to the current frame. The feedback mechanism provides subband energy that is the energy averaged in the time domain, that is stationary noise energy.

As discussed above, there is a plurality of formants from the first formant to the n-th formant that is a harmonic overtone component of the first formant. Therefore, there is a case where, even if some formants are embedded in noises of a higher level, or higher subband energy in any subband, other formants are detected. In particular, surrounding noises are converged into a low frequency band. Therefore, even if the first formant (corresponding to a fundamental pitch) and the second formant (corresponding to the second harmonic of the fundamental pitch) are embedded in low frequency noises, there is a possibility that formants of the third harmonic or higher are detected.

Accordingly, the speech determination unit 38 can determine that a per-frame input signal is a speech segment when the number of spectra of this per-frame input signal that exhibit a higher SNR than the first threshold level is equal to or larger than the first specific number. This achieves noise-robust speech segment determination.

The peak detection unit 37 may vary the first threshold level depending on subband energy and subbands. For example, the peak detection unit 37 may be equipped with a table listing threshold levels corresponding to a specific range of subbands and subband energy. Then, when a subband and subband energy are derived for a spectrum to be subjected to the speech determination, the peak detection unit 37 looks up the table and sets a threshold level corresponding to the derived subband and subband energy to the first threshold level. With this table in the peak detection unit 37, the speech determination unit 38 can accurately determine a spectrum as a speech segment in accordance with the subband and subband energy, thus achieving further accurate speech segment determination.

Moreover, when the number of spectra of a per-frame input signal that exhibit a higher SNR than the first threshold level reaches the first specific number, the peak detection unit 37 may stop the SNR derivation and the comparison between SNR and the first threshold level. This makes possible a smaller processing load to the peak detection unit 37.

Moreover, the speech determination unit 38 may output a result of the speech segment determination process to the time-domain averaging unit 36 to avoid the effects of voices to subband energy to raise the reliability of speech segment determination, as explained below.

There is a high possibility that a spectrum is a formant when the spectrum exhibits a higher SNR than the first threshold level. Moreover, voices are produced by the vibration of the vocal cords, hence there are energy components of the voices in a spectrum with a peak at the center frequency and in the neighboring spectra. Therefore, it is highly likely that there are also energy components of the voices on spectra before and after the neighboring spectra. Accordingly, the time-domain averaging unit 36 excludes these spectra at once to eliminate the effects of voices from the derivation of subband energy.

Moreover, if noises that exhibit an abrupt change are involved in a speech segment and a spectrum with the noises is included in the derivation of subband energy, it gives adverse effects to the estimation of noise level. However, the time-domain averaging unit 36 can also detect and remove such noises in addition to a spectrum that exhibits a higher SNR than the first threshold level and surrounding spectra.

In detail, the speech determination unit 38 outputs information on a spectrum exhibiting a higher SNR than the first threshold level to the time-domain averaging unit 36. This is not shown in FIG. 2 because of an option. Then, the time-domain averaging unit 36 derives subband energy per subband based on the energy obtained by multiplying average energy by an adjusting value of 1 or smaller. The average energy to be multiplied by the adjusting value is the average energy of a subband involving a spectrum that exhibits a higher SNR than the first threshold level or of all subbands of a per-frame input signal that involves such a spectrum of a high SNR.

The reason for multiplication of the average energy by the adjusting value is that the energy of voices is relatively greater than that of noises, and hence subband energy cannot be correctly derived if the energy of voices is included in the subband energy derivation.

The time-domain averaging unit 36 with the multiplication described above can derive subband energy correctly with less effect of voices.

The speech determination unit 38 may be equipped with a table listing adjusting values of 1 or smaller corresponding to a specific range of average energy so that it can look up the table to select an adjusting value depending on the average energy. Using the adjusting value from this table, the time-domain averaging unit 36 can decrease the average energy appropriately in accordance with the energy of voices.

Moreover, the technique described below may be employed in order to include noise components in a speech segment in the derivation of subband energy depending on the change in magnitude of surrounding noises in the speech segment.

In detail, the frequency averaging unit 34 excludes a particular spectrum or particular spectra from the average-energy deviation. The particular spectrum is a spectrum that exhibits a higher SNR than the first threshold level. The particular spectra are a spectrum that exhibits a higher SNR than the first threshold level and the neighboring spectra of this spectrum.

In order to perform the derivation of average energy with the exclusion of spectra described above, the speech determination unit 38 outputs information on a spectrum exhibiting a higher SNR than the first threshold level to the frequency averaging unit 34. Then, the frequency averaging unit 34 excludes a particular spectrum or particular spectra from the average-energy derivation. The particular spectrum is a spectrum that exhibits a higher SNR than the first threshold level. The particular spectra are a spectrum that exhibits a higher SNR than the first threshold level and the neighboring spectra of this spectrum. And, the frequency averaging unit 34 derives average energy per subband for the remaining spectra. The derived average energy is stored in the storage unit 35. Based on the stored average energy, the time-domain averaging unit 36 derives subband energy.

In this embodiment, the speech determination unit 38 outputs information on a spectrum exhibiting a higher SNR than the first threshold level to the frequency averaging unit 34. Then, the frequency averaging unit 34 excludes particular average energy from the average-energy derivation. The particular average energy is the average energy of a spectrum that exhibits a higher SNR than the first threshold level or the average energy of this spectrum and the neighboring spectra. And, the frequency averaging unit 34 derives average energy per subband for the remaining spectra. The derived average energy is stored in the storage unit 35.

The time-domain averaging unit 36 acquires the average energy stored in the storage unit 35 and also the information on the spectra that exhibit a higher SNR than the first threshold level. Then, the time-domain averaging unit 36 derives suband energy for the current frame, with the exclusion of particular average energy from the averaging in the time domain (in the subband-energy derivation). The particular average energy is the average energy of a subband involving a spectrum that exhibits a higher SNR than the first threshold level or the average energy of all subbands of a per-frame input signal that involves a spectrum that exhibits a higher energy ratio than the first threshold level. The time-domain averaging unit 36 keeps the derived subband energy for the frame that follows the current frame.

In this case, when using the equation (1), the time-domain averaging unit 36 disregards the average energy in a subband that is to be excluded from the subband-energy derivation or in all subbands of a per-frame input signal that involves a subband that is to be excluded from the subband-energy derivation and derives subband energy for the succeeding subbands. When using the equation (2), the time-domain averaging unit 36 temporarily sets T and 0 to $\alpha$ and $\beta$, respectively, in substituting the average energy in the subband or in all subbands discussed above, for E_cur.

As discussed above, there is a high possibility that a spectrum is a formant and also the surrounding spectra are formants when this spectrum exhibits a higher SNR than the first threshold level. The energy of voices may affect not only a spectrum, in a subband, that exhibits a higher SNR than the first threshold level but also other spectra in the subband. The effects of voices spread over a plurality of subbands, as a fundamental pitch or harmonic overtones. Thus, even if there is only one spectrum, in a subband of a per-frame input signal, that exhibits a higher SNR than the first threshold level, the energy components of voices may be involved in other subbands of this input signal. However, the time-domain averaging unit 36 excludes this suband or the per-frame input signal involving this subband from the subband-energy derivation, thus not updating the subband energy at the frame of this input signal. In this way, the time-domain averaging unit 36 can eliminate the effects of voices to the subband energy.

The speech determination unit 38 may be installed with a second threshold level, different from (or unequal to) the first threshold level, to be used for determining whether to include average energy in the averaging in the time domain (in the subband acquisition). In this case, the speech determination unit 38 outputs information on a spectrum exhibiting a higher SNR than the second threshold level to the frequency averaging unit 34. Then, the frequency averaging unit 34 does not derive the average energy of a subband involving a spectrum that exhibits a higher SNR than the second threshold level or of all subbands of a per-frame input signal that involves a spectrum that exhibits a higher energy ratio than the second threshold level. Accordingly, the time-domain averaging unit 36 does not include the average energy discussed above in the averaging in the time domain (in the subband energy acquisition).

Accordingly, using the second threshold level, the speech determination unit 38 can determine whether to include average energy in the averaging in the time domain at the time-domain averaging unit 36, separately from the speech segment determination process.

The second threshold level can be set higher or lower than the first threshold level for the processes of determination of speech segments and inclusion of average energy in the averaging in the time domain, performed separately from each other for each subband.

Described first is that the second threshold level is set higher than the first threshold level. The speech determination unit 38 determines that there is no speech segment in a subband if the subband does not involve a spectrum exhibiting a higher energy ratio than the first threshold level. In this case, the speech determination unit 38 determines to include the average energy in that subband in the averaging in the time domain at the time-domain averaging unit 36. On the contrary, the speech determination unit 38 determines that there is a speech segment in a subband if the subband involves a spectrum exhibiting an energy ratio higher than the first threshold level but equal to or lower than the second threshold level. In this case, the speech determination unit 38 also determines to include the average energy in that subband in the averaging in the time domain at the time-domain averaging unit 36. However, the speech determination unit 38 determines that there is a speech segment in a subband if the subband involves a spectrum exhibiting a higher energy ratio than the second threshold level. In this case, the speech determination unit 38 determines not to include the average energy in that subband in the averaging in the time domain at the time-domain averaging unit 36.

Described next is that the second threshold level is set lower than the first threshold level. The speech determination unit 38 determines that there is no speech segment in a subband if the subband does not involve a spectrum exhibiting a higher energy ratio than the second threshold level. In this case, the speech determination unit 38 determines to include the average energy in that subband in the averaging in the time domain at the time-domain averaging unit 36. Moreover, the speech determination unit 38 determines that there is no speech segment in a subband if the subband involves a spectrum exhibiting an energy ratio higher than the second threshold level but equal to or lower than the first threshold level. In this case, the speech determination unit 38 determines not to include the average energy in that subband in the averaging in the time domain direction at the time-domain averaging unit 36. Furthermore, the speech determination unit 38 determines that there is a speech segment in a subband if the subband involves a spectrum exhibiting a higher energy ratio than the first threshold level. In this case, the speech determination unit 38 also determines not to include the average energy in that subband in the averaging in the time domain at the time-domain averaging unit 36.

As described above, using the second threshold level different from the first threshold level, the time-domain averaging unit 36 can derive subband energy more appropriately.

If subband energy is affected by the voice energy of high level, speech determination is inevitably performed based on subband energy higher than an actual noise level, resulting in a bad result. In order to avoid such a problem, the speech segment determiner 15*a* controls the effects of voice energy to subband energy after speech segment determination to accurately detect formants while preserving correct subband energy.

As described above in detail, the speech segment determiner 15*a* employing the speech segment determination technique I is provided with: the frame extraction unit 31 that extracts a signal portion for each frame having a specific duration from an input signal, to generate per-frame input signals; the spectrum generation unit 32 that performs frequency analysis of the per-frame input signals to convert the per-frame input signals in the time domain into per-frame input signals in the frequency domain, thereby generating a spectral pattern; the subband division unit 33 that divides the spectral pattern into a plurality of subbands each having a specific bandwidth; the frequency averaging unit 34 that acquires average energy for each subband; the storage unit 35 that stores the average energy per subband for a specific number of frames; the time-domain averaging unit 36 that derives subband energy that is the average of the average energy over a plurality of frames in the time domain; the peak detection unit 37 that derives an energy ratio of the energy in each spectrum in the spectral pattern to the subband energy in a subband in which the spectrum is involved; and the speech determination unit 38 that determines whether a per-frame input signal of a target frame is a speech segment, based on the energy ratio.

The speech determination unit 38 determines that a per-frame input signal of a target frame is a speech segment when the number of spectra of the per-frame input signal, having the energy ratio that exceeds the first threshold level, is equal to or larger than a predetermined number, for example.

Next, the speech segment determination technique II will be explained. The speech segment determination technique II focuses on the characteristics of a consonant that exhibits a spectral pattern having a tendency of rise to the right, to detect a speech segment. In detail, according to the speech segment determination technique II, a spectral pattern of a consonant is detected in a range of an intermediate to a high frequency band, and a frequency distribution of the consonant embedded in noises but with less effects of the noises is extracted to detect a speech segment.

Figure 3:
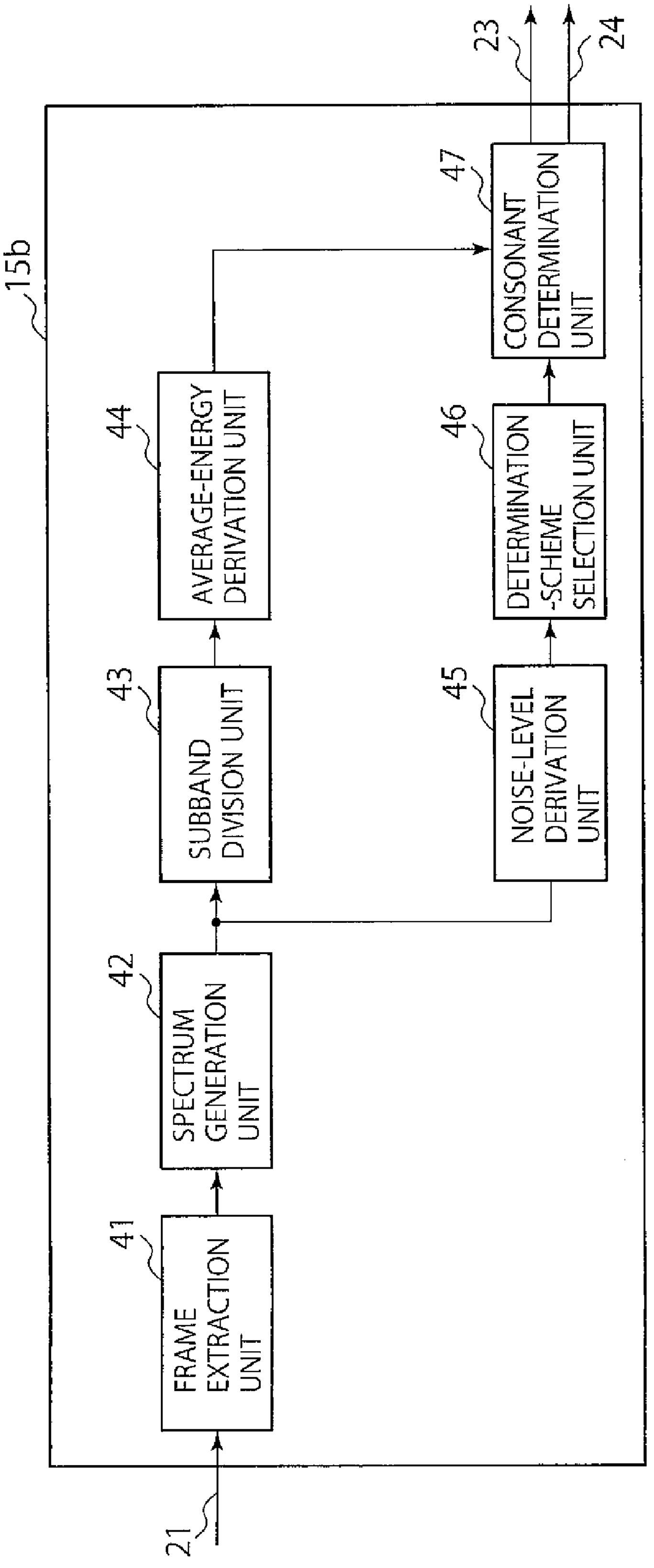
FIG. 3 is a block diagram schematically showing another exemplary configuration of a speech segment determiner installed in the noise reduction apparatus according to the first embodiment of the present invention.

FIG. 3 is a block diagram schematically showing the configuration of a speech segment determiner 15*b* employing the speech segment determination technique II.

The speech segment determiner 15*b* is provided with a frame extraction unit 41, a spectrum generation unit 42, a subband division unit 43, an average-energy derivation unit 44, a noise-level derivation unit 45, a determination-scheme selection unit 46, and a consonant determination unit 47.

In FIG. 3, the sound pick-up signal 21 output from the AD converter 13 (FIG. 1) is input to the frame extraction unit 41. The frame extraction unit 41 extracts a signal portion for each frame having a specific duration corresponding to a specific number of samples from the input digital signal, to generate per-frame input signals. The frame extraction unit 41 sends the generated per-frame input signals to the spectrum generation unit 42 one after another.

The spectrum generation unit 42 performs frequency analysis of the per-frame input signals to convert the per-frame input signals in the time domain into per-frame input signals in the frequency domain, thereby generating a spectral pattern. The technique of frequency conversion of per-frame signals in the time domain into the frequency domain is not limited to any particular one. Nevertheless, the frequency conversion requires high frequency resolution enough for recognizing speech spectra. Therefore, the technique of frequency conversion in this embodiment may be FFT (Fast Fourier Transform), DCT (Discrete Cosine Transform), etc. that exhibit relatively high frequency resolution.

A spectral pattern generated by the spectrum generation unit 42 is sent to the subband division unit 43 and the noise-level derivation unit 45.

The subband division unit 43 divides each spectrum of the spectral pattern into a plurality of subbands each having a specific bandwidth. In FIG. 3, each spectrum in the range from 800 Hz to 3.5 kHz is separated into subbands each having a bandwidth in the range from 100 Hz to 300 Hz, for example. The spectral pattern having spectra divided as described above is sent to the average-energy derivation unit 44.

The average-energy derivation unit 44 derives subband average energy that is the average energy in each of the subbands adjacent one another divided by the subband division unit 43. The subband average energy in each of the subbands is sent to the consonant determination unit 47.

The consonant determination unit 47 compares the subband average energy between a first subband and a second subband that comes next to the first subband and that is a higher frequency band than the first subband, in each of consecutive pairs of first and second subbands. Each subband that is a higher frequency band in each former pair is the subband that is a lower frequency band in each latter pair that comes next to the each former subband. Then, the consonant determination unit 47 determines that a per-frame input signal having a pair of first and second subbands includes a consonant segment if the second subband has higher subband average energy than the first subband. These comparison and determination by the consonant determination unit 47 are referred as determination criteria, hereinafter.

In detail, the subband division unit 43 divides each spectrum of the spectral pattern into a subband 0, a subband 1, a subband 2, a subband 3, . . . , a subband n−2, a subband n−1, and a subband n (n being a natural number) from the lowest to the highest frequency band of each spectrum. The average-energy derivation unit 44 derives subband average energy in each of the divided subbands. The consonant determination unit 47 compares the subband average energy between the subbands 0 and 1 in a pair, between the subbands 1 and 2 in a pair, between the subbands 2 and 3 in a pair, . . . , between the subbands n−2 and n−1 in a pair, and between the subbands n−1 and n in a pair. Then, the consonant determination unit 47 determines that a per-frame input signal having a pair of a first subband and a second subband that comes next the first subband includes a consonant segment if the second subband (that is a higher frequency band than the first band) has higher subband average energy than the first subband. The determination is performed for the succeeding pairs.

In general, a consonant exhibits a spectral pattern that has a tendency of rise to the right. With the attention being paid to this tendency, the consonant-segment detection apparatus 47 derives subband average energy for each of subbands in a spectral pattern and compares the subband average energy between consecutive two subbands to detect the tendency of spectral pattern to rise to the right that is a feature of a consonant. Therefore, the speech segment determiner 15*b* can accurately detect a consonant segment included in an input signal.

In order to determine consonant segments, the consonant determination unit 47 is implemented with a first determination scheme and a second determination scheme.

In the first determination scheme: the number of subband pairs is counted that are extracted according to the determination criteria described above; and the counted number is compared with a predetermined first threshold value, to determine a per-frame input signal having the subband pairs includes a consonant segment if the counted number is equal to or larger than the first threshold value.

Different from the first determination scheme, if subband pairs extracted according to the determination criteria described above are consecutive pairs, the second determination scheme is performed as follows: the number of the consecutive subband pairs is counted with weighting by a weighting coefficient larger than 1; and the weighted counted number is compared with a predetermined second threshold value, to determine a per-frame input signal having the consecutive subband pairs includes a consonant segment if the weighted counted number is equal to or larger than the second threshold value.

The first and second determination schemes are selectively used depending on a noise level, as explained below.

When a noise level is relatively low, a consonant segment exhibits a spectral pattern having a clear tendency of rise to the right. In this case, the consonant determination unit 47 uses the first determination scheme to accurately detect a consonant segment based on the number of subband pairs detected according to the determination criteria described above.

On the other hand, when a noise level is relatively high, a consonant segment exhibits a spectral pattern with no clear tendency of rise to the right, due to being embedded in noises. Therefore, the consonant determination unit 47 cannot accurately detect a consonant segment based on the number of subband pairs detected randomly among the subband pairs according to the determination criteria, with the first determination scheme. In this case, the consonant determination unit 47 uses the second determination scheme to accurately detect a consonant segment based on the number of subband pairs that are consecutive pairs detected (not randomly detected among the subband pairs) according to the determination criteria, with weighting to the number of subband pairs by a weighting coefficient or a multiplier larger than 1.

In order to select the first or the second determination scheme, the noise-level derivation unit 45 derives a noise level of a per-frame input signal. In detail, the noise-level derivation unit 45 obtains an average value of energy in all frequency bands in the spectral pattern over a specific period, as a noise level, based on a signal from the spectrum generation unit 42. It is also preferable for the noise-level derivation unit 45 to derive a noise level by averaging subband average energy, in the frequency domain, in a particular frequency band in the spectral pattern over a specific period based on the subband average energy derived by the average-energy derivation unit 44. Moreover, the noise-level derivation unit 45 may derive a noise level for each per-frame input signal.

The noise level derived by the noise-level derivation unit 45 is supplied to the determination-scheme selection unit 46. The determination-scheme selection unit 46 compares the noise level and a fourth threshold value that is a value in the range from −50 dB to −40 dB, for example. If the noise level is smaller than the fourth threshold value, the determination-scheme selection unit 46 selects the first determination scheme for the consonant determination unit 47, that can accurately detect a consonant segment when a noise level is relatively low. On the other hand, if the noise level is equal to or larger than the fourth threshold value, the determination-scheme selection unit 46 selects the second determination scheme for the consonant determination unit 47, that can accurately detect a consonant segment even when a noise level is relatively high.

Accordingly, with the selection between the first and second determination schemes of the consonant determination unit 47 according to the noise level, the speech segment determiner 15*b* can accurately detect a consonant segment.

In addition to the first and second determination schemes, the consonant determination unit 47 may be implemented with a third determination scheme which will be described below.

When a noise level is relatively high, the tendency of a spectral pattern of a consonant segment to rise to the right may be embedded in noises. Furthermore, suppose that a spectral pattern has several separated portions each having energy with steep fall and rise with no tendency of rise to the right. Such a spectral pattern cannot be determined as a consonant segment by the second determination scheme with weighting to a continuous rising portion of the spectral pattern (to the number of consecutive subband pairs detected according to the determination criteria, as described above).

Accordingly, the third determination scheme is used when the second determination scheme fails in consonant determination (if the counted weighted number of the consecutive subband pairs having higher average subband energy is smaller than the second threshold value).

In detail, in the third determination scheme, the maximum average subband energy is compared between a first group of at least two consecutive subbands and a second group of at least two consecutive subbands (the second group being of higher frequency than the first group), each group having been detected in the same way as the second determination scheme. The comparison between two first and second groups each of at least two consecutive subbands is performed from the lowest to the highest frequency band in a spectral pattern. Then, the number of groups each having higher subband average energy in the comparison is counted with weighting by a weighting coefficient larger than 1 and the weighted counted number is compared with a predetermined third threshold value, to determine a per-frame input signal having the subband groups includes a consonant segment if the weighted counted number is equal to or larger than the third threshold value.

Accordingly, by way of the third determination scheme with the comparison of subband average energy over a wide range of frequency band, the tendency of rise to the right can be converted into a numerical value by counting the number of subband groups in the entire spectral pattern. Therefore, the speech segment determiner 15*b* can accurately detect a consonant segment based on the counted number.

As described above, the determination-scheme selection unit 46 selects the third determination scheme when the second determination scheme fails in consonant determination. In detail, even when the second determination scheme determines no consonant segment, there is a possibility of failure to detect consonant segments. Accordingly, when the second determination scheme determines no consonant segment, the consonant determination unit 47 uses the third determination scheme that is more robust against noises than the second determination scheme to try to detect consonant segments. Therefore, with the configuration described above, the speech segment determiner 15*b* can detect consonant segments more accurately.

As described above in detail, the speech segment determiner 15*b* employing the speech segment determination technique II is provided with: the frame extraction unit 41 that extracts a signal portion for each frame having a specific duration from an input signal, to generate per-frame input signals; the spectrum generation unit 42 that performs frequency analysis of the per-frame input signals to convert the per-frame input signals in the time domain into per-frame input signals in the frequency domain, thereby generating a spectral pattern; the subband division unit 43 that divides the spectral pattern into a plurality of subbands each having a specific bandwidth; the average-energy derivation unit 44 that derives subband average energy that is the average energy in each of the subbands adjacent one another; the noise-level derivation unit 45 that derives a noise level of each per-frame input signal; the determination-scheme selection unit 46 that compares the noise level and a predetermined threshold value to select a determination scheme; and the consonant determination unit 47 that compares the subband average energy between subbands according to the selected determination scheme to detect a consonant segment.

The consonant determination unit 47 compares the subband average energy between a first subband and a second subband that comes next to the first subband and that is a higher frequency band than the first subband, in each of consecutive pairs of first and second subbands. Each subband that is a higher frequency band in each former pair is the subband that is a lower frequency band in each latter pair that comes next to the each former subband. Then, the consonant determination unit 47 determines that a per-frame input signal having a pair of first and second subbands includes a consonant segment if the second subband has higher subband average energy than the first subband. It is also preferable for the consonant determination unit 47 to determine that a per-frame input signal having subband pairs includes a consonant segment if the number of the subband pairs, in each of which the second subband has higher subband average energy than the first subband, is larger than a predetermined value.

As described above in detail, according to the speech segment determiner 15*b*, consonant segments can be detected accurately in an environment at a relatively high noise level.

When the speech segment determination technique I or II described above is applied to the noise reduction apparatus 1 in the first embodiment, a parameter can be set to each equipment provided with the noise reduction apparatus 1. In detail, when the speech segment determination technique I or II is applied to equipment provided with the noise reduction apparatus 1 that requires higher accuracy for the speech segment determination, higher or larger threshold levels or values (in the technique I or II) can be set as a parameter for the speech segment determination.

In the noise reduction apparatus 1 shown in FIG. 1, the speech segment determiner 15 performs speech segment determination using only the sound pick-up signal 21 obtained based on a sound picked up by the main microphone 11. This is based on a presumption in the first embodiment that it is highly likely that voice sounds are mostly picked up by the main microphone 11, not by the sub-microphone 12.

Figure 8:
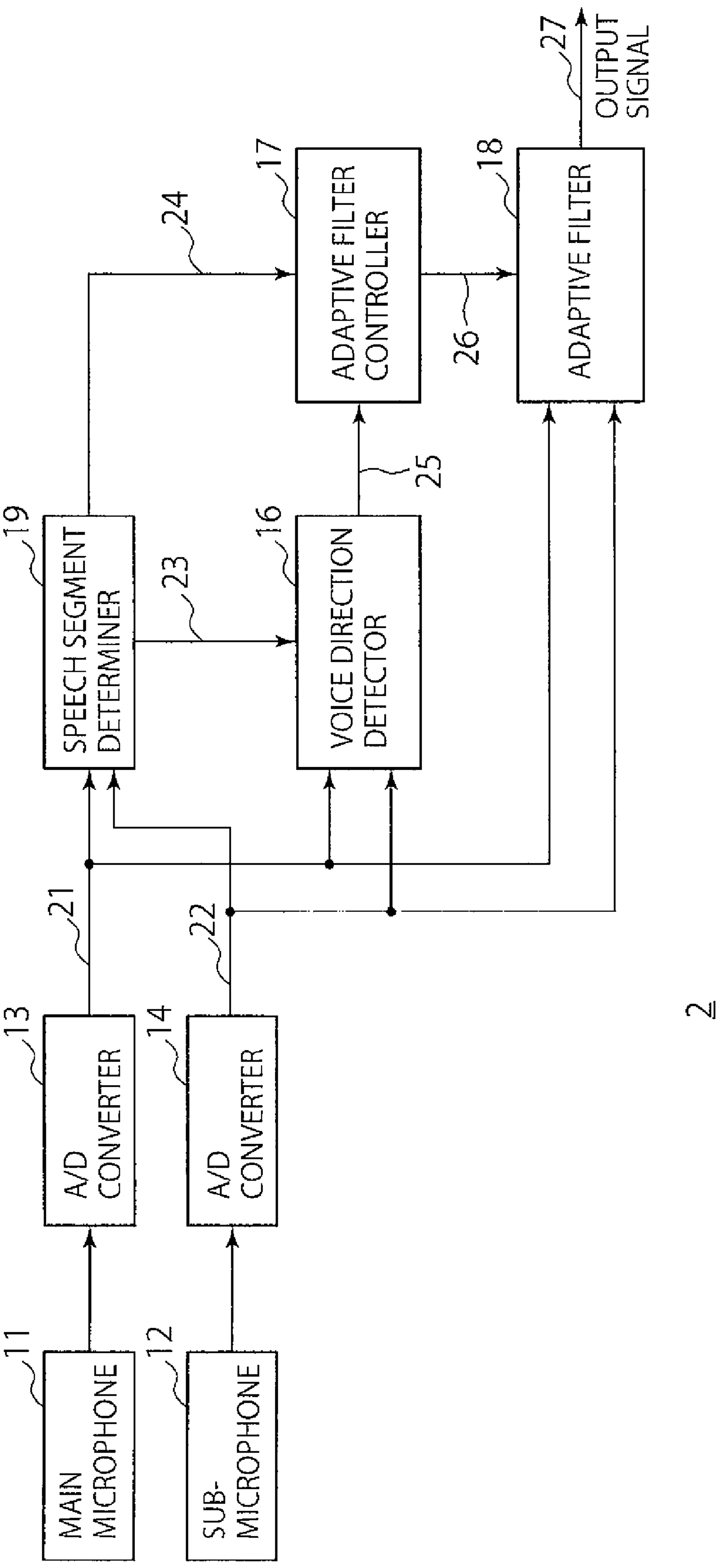
FIG. 8 is a block diagram schematically showing a modification to the noise reduction apparatus according to the first embodiment of the present invention.

However, it may happen that voice sounds are mostly picked up by the sub-microphone 12, not by the main microphone 11, depending on the environment in which the noise reduction apparatus 1 is used. For this reason, as shown in FIG. 8, both of the sound pick-up signals 21 and 22 obtained based on sounds picked by the main microphone 11 and the sub-microphone 12, respectively, may be supplied to a speech segment determiner 19 for speech segment determination. Shown in FIG. 8 is a noise reduction apparatus 2 that is a modification to the noise reduction apparatus 1 according to the first embodiment. The speech segment determiner 19 in the modification may be provided with two separate circuits: one for determining whether or not a sound picked up by the main microphone 11 is a speech segment based on the sound pick-up signal 21; and another for determining whether or not a sound picked up by the sub-microphone 12 is a speech segment based on the sound pick-up signal 22. The other components of the noise reduction apparatus 2 of FIG. 8 are identical to those of the noise reduction apparatus 1 of FIG. 1, hence the explanation thereof being omitted.

Returning to FIG. 1, the voice direction detector 16 of the noise reduction apparatus 1 detects a voice incoming direction that indicates from which direction a voice sound travels, based on the sound pick-up signals 21 and 22 and outputs voice incoming-direction information 25 to the adaptive filter controller 17.

There are several techniques for voice direction detection. One technique is to detect a voice incoming direction based on a phase difference between the sound pick-up signals 21 and 22. Another technique is to detect a voice incoming direction based on the difference or ratio between the magnitudes of a sound (the sound pick-up signal 21) picked up by the main microphone 11 and a sound (the sound pick-up signal 22) picked up by the sub-microphone 12. The difference and the ratio between the magnitudes of sounds are referred to as a power difference and a power ratio, respectively. Both factors are referred to as power information, hereinafter.

Whatever the technique is used, the voice direction detector 16 detects a voice incoming direction only when the speech segment determiner 15 determines that a sound picked up by the main microphone 11 is a speech segment. In other words, the voice direction detector 16 detects a voice incoming direction in the duration of a speech segment, or while a voice sound is arriving, whereas does not detect a voice incoming direction in any duration except for a speech segment.

The main microphone 11 and the sub-microphone 12 shown in FIGS. 1 and 8 may be provided on both sides of equipment having the noise reduction apparatus 1 installed therein. In detail, the main microphone 11 may be provided on the front face of the equipment on which a voice sound can be easily picked up whereas the sub-microphone 12 may be provided on the rear face of the equipment on which a voice sound can not be easily picked up. This microphone arrangement is particularly useful when the equipment having the noise reduction apparatus 1 installed therein is mobile equipment (a wireless communication apparatus) such as a transceiver, a speaker microphone (an audio input apparatus) connected to a wireless communication apparatus, etc. With this microphone arrangement, the main microphone 11 can mainly pick up a voice component whereas the sub-microphone 12 can mainly pick up a noise component.

The wireless communication apparatus and the audio input apparatus described above usually have a size a little bit smaller than a user's clenched fist. Therefore, it is quite conceivable that the difference between a distance from a sound source to the main microphone 11 and a distance from the sound source to the sub-microphone 12 is in the range from about 5 cm to 10 cm, although depending on the apparatus, microphone arrangement, etc. When a voice spatial travel speed is set to 34,000 cm/s, the distance by which a voice sound travels is 4.25 (=34,000/8,000) cm during one sampling period at a sampling frequency of 8 kHz. If the distance between the main microphone 11 and the sub-microphone 12 is 5 cm, it is not enough to predict a voice incoming direction at a sampling frequency of 8 kHz.

In this case, when the sampling frequency is set to 24 kHz three times as high as 8 kHz, the distance by which a voice sound travels is about 1.42 (≈34,000/24,000) cm during one sampling period. Therefore, three or four phase difference points can be found in the distance of 5 cm. Accordingly, for the detection of a voice incoming direction based on the phase difference between the sound pick-up signals 21 and 22, it is preferable to set the sampling frequency to 24 kHz or higher for these pick-up signals to be input to the voice direction detector 16.

In the noise reduction apparatus 1 shown in FIG. 1, suppose that the sampling frequency for the sound pick-up signals 21 and 22 output from the A/D converters 13 and 14, respectively, is in the range from 8 kHz to 12 kHz. In this case, a sampling frequency converter may be provided between the A/D converters 13 and 14, and the voice direction detector 16, to convert the sampling frequency for the sound pick-up signals 21 and 22 to be supplied to the voice direction detector 16 into 24 kHz or higher.

Conversely, it is supposed in the noise reduction apparatus 1 shown in FIG. 1 that the sampling frequency for the sound pick-up signals 21 and 22 output from the A/D converters 13 and 14 is 24 kHz or higher. In this case, it is a feasible option to provide a sampling frequency converter between the A/D converter 13 and the speech segment determiner 15, and another sampling frequency converter between the A/D converters 13 and 14, and the adaptive filter 18, to convert the sampling frequency for the sound pick-up signals 21 and 22 into a frequency in the range from 8 kHz to 12 kHz.

In summary, it is an option that the sound pick-up signals 21 and 22 are supplied to the voice direction detector 16 at the sampling frequency of 24 kHz or higher and supplied to the adaptive filter 18 at the sampling frequency of 12 kHz or lower.

The detection of a voice incoming direction based on the phase difference between the sound pick-up signals 21 and 22 mentioned above will be explained in detail.

Figure 4:
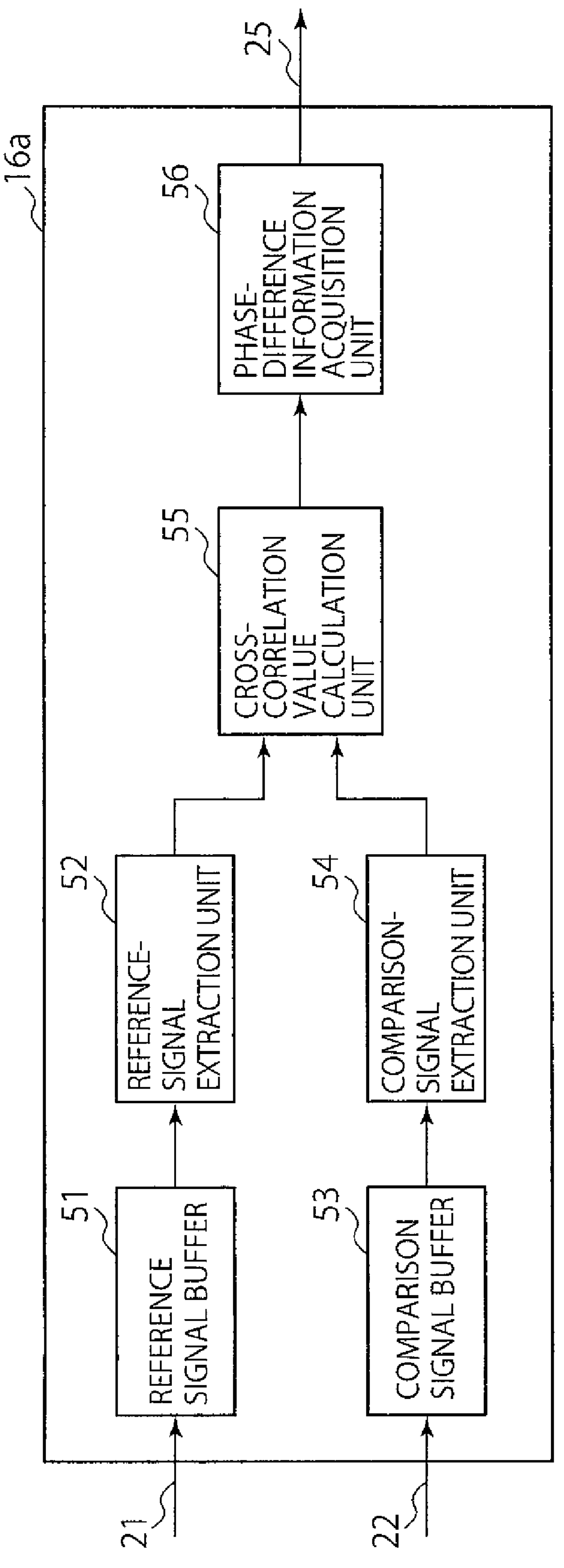
FIG. 4 is a block diagram schematically showing an exemplary configuration of a voice direction detector installed in the noise reduction apparatus according to the first embodiment of the present invention.

FIG. 4 is a block diagram showing an exemplary configuration of a voice direction detector 16*a* installed in the noise reduction apparatus 1 according to the first embodiment, for detection of a voice incoming direction based on the phase difference between the sound pick-up signals 21 and 22.

The voice direction detector 16*a* shown in FIG. 4 is provided with a reference signal buffer 51, a reference-signal extraction unit 52, a comparison signal buffer 53, a comparison-signal extraction unit 54, a cross-correlation value calculation unit 55, and a phase-difference information acquisition unit 56.

The reference signal buffer 51 temporarily stores a sound pick-up signal 21 output from the A/D converter 13 (FIG. 1), as a reference signal. The comparison signal buffer 53 temporarily stores a sound pick-up signal 22 output from the A/D converter 14 (FIG. 1), as a comparison signal. The reference and comparison signals are used for the calculation at the cross-correlation value calculation unit 55, which will be described later.

Suppose that a user is talking into a wireless communication apparatus, an audio input apparatus, etc., equipped with the noise reduction apparatus 1. In this case, there is a difference between voice sounds picked up by the main microphone 11 and the sub-microphone 12 in FIG. 1, concerning the phase (amount of delay), magnitude (amount of attenuation), etc. Nevertheless, it is quite conceivable that the voice sounds picked up by the main microphone 11 and the sub-microphone 12 have a specific relationship with each other concerning the phase, magnitude, etc., thus having a high correlation with each other. This is because the voice sounds are the same voice sound generated at the same time by a single sound source that is the user who is talking into a wireless communication apparatus, an audio input apparatus, etc., equipped with the noise reduction apparatus 1.

On the other hand, noise sounds generated from several sound sources have no specific relationship with each other concerning the phase (amount of delay), magnitude (amount of attenuation), etc. In other words, such noise sounds generated from several sound sources have a difference, per sound source, concerning the phase, magnitude, etc., when picked up by the main microphone 11 and the sub-microphone 12, thus having a low correlation with each other.

In the first embodiment (FIG. 1), a voice incoming direction is detected by the voice direction detector 16 only when the speech segment determiner 15 detects a speech segment. It is thus quite conceivable that voice sounds picked up by the main microphone 11 and the sub-microphone 12 have a high correlation with each other when a voice incoming direction is detected by the voice direction detector 16. Therefore, by measuring the correlation between sounds picked up by the main microphone 11 and the sub-microphone 12 only when the speech segment determiner 15 detects a speech segment, the phase difference of sounds between the two microphones can be obtained to predict a voice incoming direction from a sound source. The phase difference of sounds between the main microphone 11 and sub-microphone 12 can be calculated using the cross correlation function or by the least square method.

The cross correlation function for two signal waveforms x1(*t*) and x2(*t*) is expressed by the following equation (5).

$$\varphi_{1,2}(\tau) = \left(\frac{1}{N}\right)n = \sum_{N=0}^{N-1} x_1(t)x_2(t+\tau) \tag{5}$$

When the cross correlation function is used, in FIG. 4, the reference-signal extraction unit 52 extracts a signal waveform x1(*t*) carried by a sound pick-up signal (reference signal) 21 and sets the signal waveform x1(*t*) as a reference waveform. On the other hand, the comparison-signal extraction unit 54 extracts a signal waveform x2(*t*) carried by a sound pick-up signal (comparison signal) 22 and shifts the signal waveform x2(*t*) in relation to the signal waveform x1(*t*).

The cross-correlation value calculation unit 55 performs convolution (a product-sum operation) to the signal waveforms x1(*t*) and x2(*t*) to find signal points of the sound pick-up signals 21 and 22 having a high correlation. In this operation, the signal waveform x2(*t*) is shifted forward and backward (delayed and advanced) in relation to the signal waveform x1(*t*) in accordance with the maximum phase difference calculated based on the sampling frequency for the sound pick-up signal 22 and the spatial distance between the main microphone 11 and the sub-microphone 12, to calculate a convolution value. It is determined that signal points of the sound pick-up signals 21 and 22 having the maximum convolution value and the same sign (positive or negative) have the highest correlation.

When the least square method is used instead of convolution, the following equation (6) can be used.

$$1=\Sigma_{i=1}{}^{n}(y_i-f(x_i{}^{2} \tag{6}$$

When the least square method is used, the reference-signal extraction unit 52 extracts a signal waveform carried by a sound pick-up signal (reference signal) 21 and sets the signal waveform as a reference waveform. On the other hand, the comparison-signal extraction unit 54 extracts a signal waveform carried by a sound pick-up signal (comparison signal) 22 and shifts the signal waveform in relation to the reference signal waveform of the sound pick-up signal 21.

The cross-correlation value calculation unit 55 calculates the sum of squares of differential values between the reference and comparison signal waveforms of the sound pick-up signals 21 and 22, respectively. It is determined that signal points of the sound pick-up signals 21 and 22 having the minimum sum of squares are the portions of the signals 21 and 22 where the both signals have a similar waveform (or overlap each other) at the highest correlation. It is preferable for the least square method to adjust a reference signal and a comparison signal to have the same magnitude. It is therefore preferable to normalize the reference and comparison signals using either signal as a reference.

Then, the cross-correlation value calculation unit 55 outputs information on correlation between the reference and comparison signals, obtained by the calculation described above, to the phase-difference information acquisition unit 56. Suppose that there are two signal waveforms (a signal waveform carried by the sound pick-up signal 21 and a signal waveform carried by the sound pick-up signal 22) that are determined by the cross-correlation value calculation unit 55 as having a high correlation with each other. In this case, it is highly likely that the two signals waveforms are signal waveforms of voice sounds generated by a single sound source. The phase-difference information acquisition unit 56 acquires a phase difference between the two signal waveforms determined as having a high correlation with each other to obtain a phase difference between a voice component picked up by the main microphone 11 and a voice component picked up by the sub-microphone 12.

There are two cases concerning the phase difference acquired by the phase-difference information acquisition unit 56, that are phase advance and phase delay.

In the case of phase advance, the phase of a voice component included in a sound picked up by the main microphone 11 (the phase of a voice component carried by the sound pick-up signal 21) is more advanced than the phase of a voice component included in a sound picked up by the sub-microphone 12 (the phase of a voice component carried by the sound pick-up signal 22). In this case, it is presumed that a sound source is located closer to the main microphone 11 than to the sub-microphone 12, or a user speaks into the main microphone 11.

In the case of phase delay, the phase of a voice component included in a sound picked up by the main microphone 11 is more delayed than the phase of a voice component included in a sound picked up by the sub-microphone 12. In this case, it is presumed that a sound source is located closer to the sub-microphone 12 than to the main microphone 11, or a user speaks into the sub-microphone 12.

Moreover, there is a case in which the phase difference between a phase of a voice component included in a sound picked up by the main microphone 11 and a phase of a voice component included in a sound picked up by the sub-microphone 12 falls in a specific range ($-T<\text{phase difference}<T$), or the absolute value of the phase difference is smaller than a specific value T. In this case, it is presumed that a sound source is located in a center area between the main microphone 11 and the sub-microphone 12.

Based on the presumption discussed above, the phase-difference information acquisition unit 56 outputs the acquired phase difference information to the adaptive filter controller 17 (FIG. 1), as voice incoming-direction information 25.

In FIG. 1, the voice direction detector 16 detects a voice incoming direction when the speech segment determiner 15 determines that a sound picked up by the main microphone 11 is a speech segment (voice component) based on the sound pick-up signal 21 input thereto. As discussed above, it is presumed that a voice component picked up by the main microphone 11 and a voice component picked up by the sub-microphone 12 have a high correlation if both voice components are included in a sound generated by a single sound source. Therefore, even if this sound includes a noise component, the voice direction detector 16 can accurately calculate a phase difference between voice components picked up by the main microphone 11 and the sub-microphone 12 when the voice direction detector 16*a* (FIG. 4) is used as the voice direction detector 16.

The detection of a voice incoming direction based on the power information on the sound pick-up signals 21 and 22 mentioned above will be explained next in detail.

Figure 5:
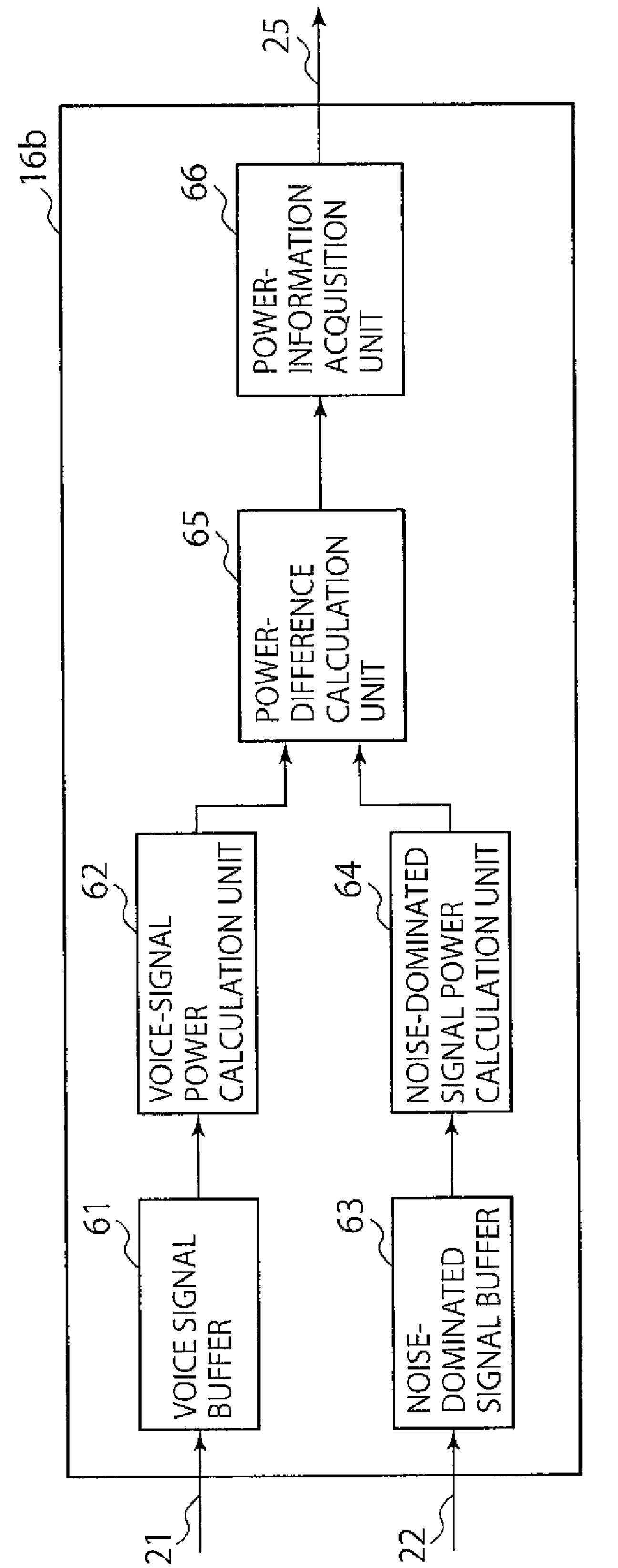
FIG. 5 is a block diagram schematically showing another exemplary configuration of a voice direction detector installed in the noise reduction apparatus according to the first embodiment of the present invention.

FIG. 5 is a block diagram showing an exemplary configuration of a voice direction detector 16*b* installed in the noise reduction apparatus 1 according to the first embodiment, for detection of a voice incoming direction based on the power information on the sound pick-up signals 21 and 22.

The voice direction detector 16*b* shown in FIG. 5 is provided with a voice signal buffer 61, a voice-signal power calculation unit 62, a noise-dominated signal buffer 63, a noise-dominated signal power calculation unit 64, a power-difference calculation unit 65, and a power-information acquisition unit 66. The voice direction detector 16*b* obtains power information (power difference in FIG. 5) on the sound pick-up signals 21 and 22 per unit time (for each predetermined duration).

The voice signal buffer 61 temporarily stores a sound pick-up signal 21 supplied from the A/D converter 13 (FIG. 1) in order to store the sound pick-up signal 21 for a predetermined duration. The noise-dominated signal buffer 63 also temporarily stores a sound pick-up signal 22 supplied from the A/D converter 14 (FIG. 1) in order to store the sound pick-up signal 22 for the predetermined duration.

The sound pick-up signal 21 stored by the voice signal buffer 61 for the predetermined duration is supplied to the voice-signal power calculation unit 62 for calculation of a power value for the predetermined duration. The sound pick-up signal 22 stored by the noise-dominated signal buffer 63 for the predetermined duration is supplied to the noise-dominated signal power calculation unit 64 for calculation of a power value for the predetermined duration.

A power value per unit of time (for each predetermined duration) is the magnitude of the sound pick-up signals 21 and 22 per unit of time, for example, the maximum amplitude, an integral value of amplitude of the sound pick-up signals 21 and per unit of time, etc. Any value that indicates the magnitude of the sound pick-up signals 21 and 22 may be used in the voice direction detector 16*b*.

The power values of the sound pick-up signals 21 and 22 obtained by the voice-signal power calculation unit 62 and the noise-dominated signal power calculation unit 64, respectively, are supplied to the power-difference calculation unit 65. The power-difference calculation unit 65 calculates a power difference between the power values and outputs a calculated power difference to the power-information acquisition unit 66. Based on the output power difference, the power-information acquisition unit 66 acquires power information on the sound pick-up signals 21 and 22.

Concerning the magnitude of the sound pick-up signals 21 and 22, there are two cases for the magnitude of sounds picked up by the main microphone 11 and the sub-microphone 12.

A first case is that the magnitude of a sound picked up by the main microphone 11 is larger than a sound picked up by the sub-microphone 12. This is the case in which a power value of the sound pick-up signal 21 is larger than a power value of the sound pick-up signal 22. In this case, it is presumed that a sound source is located closer to the main microphone 11 than to the sub-microphone 12, or a user speaks into the main microphone 11.

A second case is that the magnitude of a sound picked up by the main microphone 11 is smaller than a sound picked up by the sub-microphone 12. This is the case in which a power value of the sound pick-up signal 21 is smaller than a power value of the sound pick-up signal 22. In this case, it is presumed that a sound source is located closer to the sub-microphone 12 than to the main microphone 11, or a user speaks into the sub-microphone 12.

Moreover, there is a case in which the power difference between a sound picked up by the main microphone 11 and a sound picked up by the sub-microphone 12 falls in a specific range ($-P<\text{power difference}<P$), or the absolute value of the power difference is smaller than a specific value P. In this case, it is presumed that a sound source is located in a center area between the main microphone 11 and the sub-microphone 12.

Based on the presumption discussed above, the power-information acquisition unit 66 outputs the acquired power information (information on power difference) to the adaptive filter controller 17 (FIG. 1), as voice incoming-direction information 25.

As described above, the voice direction detector 16 detects a voice incoming direction based on the phase difference between or power information on the sound pick-up signals 21 and 22, in this embodiment. The method of detecting a voice incoming direction may be performed based on the phase difference only or the power information only, or a combination of these factors. The combination of the phase difference and power information is useful for mobile equipment (a wireless communication apparatus) such as a transceiver, compact equipment such as a speaker microphone (an audio input apparatus) attached to a wireless communication apparatus, etc. This is because, in such mobile equipment and compact equipment, it could happen that a microphone is covered with a user's hand or clothes, depending on how a user holds a mobile equipment or compact equipment. For such a mobile equipment and compact equipment, the voice direction detector 16 can more accurately detect a voice incoming direction based on both of the phase difference between and the power information on the sound pick-up signals 21 and 22.

Returning to FIG. 1, the adaptive filter controller 17 generates a control signal 26 for control of the adaptive filter 18 based on the speech segment information 24 and the voice incoming-direction information 25 output from the speech segment determiner 15 and the voice direction detector 16, respectively. The generated control signal 26 carries the speech segment information 24 and the voice incoming-direction information 25, which is then output to the adaptive filter 18.

The adaptive filter 18 generates a low-noise signal when sound pick-up signals 21 and 22 are supplied from the A/D converters 13 and 14, respectively, and outputs the low-noise signal as an output signal 27. In detail, in order to reduce a noise component carried by a sound pick-up signal 21 (a voice signal), the sub-microphone 12 picks up a noise-dominated sound including a noise component that is converted into a sound pick-up signal 22 (a noise-dominated signal) by the A/D converter 14. Based on the noise-dominated sound, the adaptive filter 18 generates a pseudo-noise component that is highly likely carried by the sound pick-up signal 21 (a voice signal) if it is a real noise component, and subtracts the pseudo-noise component from the sound pick-up signal 21 for noise reduction.

If a voice component of an excessive sound level is picked by the sub-microphone 12 in addition to a noise-dominated sound, the output signal 27 that is a low-noise version of the sound pick-up signal 21 (a voice signal) may have a lowered level or carry an obscure voice sound due to the echo of the voice component of the excessive sound level picked by the sub-microphone 12.

In order to avoid such a lowered level or an obscure voice sound, in this embodiment, an allowable range of mixture of unwanted sound in which a voice component is picked up by the sub-microphone 12 with a noise component may be set and noise reduction is performed by the adaptive filter 18 when the mixture of unwanted sound is within the allowable range.

If the sound contamination described above is outside the allowable range, a sound pick-up signal (voice signal) 21 picked up by the main microphone 11 may be output as the output signal 21 with no noise reduction at the adaptive filter 18. However, when the sound contamination is outside the allowable range, it is also assumed that a noise component is mainly picked up the main microphone 11 (a voice-component pick-up microphone) while a voice component is mainly picked up the sub-microphone 12 (a noise-component pick-up microphone).

In the case where the sound contamination is outside the allowable range, the sound pick-up signal 21 (a voice signal) and the sound pick-up signal 22 (a noise-dominated signal) may be switched in a noise reduction process at the adaptive filter 18. In detail, in this option, the sound pick-up signal 22 is treated as a voice signal to be subjected to the noise reduction process while the sound pick-up signal 21 is treated as a noise-dominated signal for use in the noise reduction process, at the adaptive filter 18.

For the noise reduction process discussed above, the adaptive filter controller 17 outputs the control signal 26 to the adaptive filter 18. In this noise reduction control, the speech segment information 24 supplied to the adaptive filter controller 17 is used as information for deciding the timing of updating the filter coefficients of the adaptive filter 18. In this embodiment, the noise reduction process may be performed in two ways. When not a speech segment but a noise segment is detected by the speech segment determiner 15, the filter coefficients of the adaptive filter 18 are updated for active noise reduction. On the other hand, when a speech segment is detected by the speech segment determiner 15, the noise reduction process is performed with no updating of the filter coefficients of the adaptive filter 18.

The noise reduction control performed by the adaptive filter controller 17 will be described in detail.

Explained first is the noise reduction control using a phase difference PD1 as the voice incoming-direction information 25 obtained by the voice direction detector 16*a* shown in FIG. 4. The phase difference PD1 is defined as the phase difference between the phase of a voice component carried by a sound pick-up signal 21 obtained based on a sound picked up by the main microphone 11 and the phase of a voice component carried by a sound pick-up signal 22 obtained based on a sound picked up by the sub-microphone 12.

The noise reduction control using the phase difference PD1 is performed by the adaptive filter controller 17 in three ways depending on the relationship between the phase difference PD1 and a predetermined positive value T, that is, PD1≥T, PD1≤−T or −T<PD1<T, that is analyzed by the adaptive filter controller 17.

When the relationship PD1≥T is established, the adaptive filter controller 17 controls the adaptive filter 18 to perform a regular noise reduction process. The relationship PD1≥T indicates that the phase of a voice component carried by a sound pick-up signal 21 obtained based on a sound picked up by the main microphone 11 is more advanced than the phase of a voice component carried by a sound pick-up signal 22 obtained based on a sound picked up by the sub-microphone 12.

In this case, the adaptive filter 18 performs the regular noise reduction process to reduce a noise component carried by the sound pick-up signal (a voice signal) 21 using the sound pick-up signal (a noise-dominated signal) 22 to produce the output signal 27. Moreover, in this case, the speech segment determiner 15 detects a speech segment based on the sound pick-up signal 21 obtained based on a sound picked up by the main microphone 11.

When the relationship PD1≤−T is established, the adaptive filter controller 17 controls the adaptive filter 18 to switch the sound pick-up signal (a voice signal) 21 and the sound pick-up signal (a noise-dominated signal) 22 in a noise reduction process. The relationship PD1≤−T indicates that the phase of a voice component carried by the sound pick-up signal 22 obtained based on a sound picked up by the sub-microphone 12 is more advanced than the phase of a voice component carried by the sound pick-up signal 21 obtained based on a sound picked up by the main microphone 11.

In this case, the adaptive filter controller 17 treats the sound pick-up signal (a noise-dominated signal) 22 as a voice signal while treats the sound pick-up signal (a voice signal) 21 as a noise-dominated signal. Then, the adaptive filter controller 17 controls the adaptive filter 18 to reduce a noise component carried by the sound pick-up signal 22 (a voice signal) 22 using the sound pick-up signal 21 (a noise-dominated signal) 22 to produce the output signal 27. Moreover, in this case, the speech segment determiner 15 may detect a speech segment based on the sound pick-up signal 22 obtained based on a sound picked up by the sub-microphone 12 when the modification shown in FIG. 8 is employed. This is because the sound pick-up signal 22 obtained based on a sound picked up by the sub-microphone 12 is more suitable for speech segment determination than the sound pick-up signal 21 obtained based on a sound picked up by the main microphone 11 when the phase of a voice component carried by the sound pick-up signal 22 is more advanced than the phase of a voice component carried by the sound pick-up signal 21.

When the relationship −T<PD1<T is established, the adaptive filter controller 17 determines that the sound pick-up signals 21 and 22 are not usable for the noise reduction process at the adaptive filter 18. This is because it is highly likely that the distance from a sound source to the main microphone 11 and the distance from the sound source to the sub-microphone 12 are almost the same as each other. In this case, the adaptive filter controller 17 controls the adaptive filter 18 to output either the sound pick-up signal 21 or the sound pick-up signal 22 as the output signal 27, with no noise reduction process. In other words, the adaptive filter 18 outputs either the sound pick-up signal 21 or the sound pick-up signal 22 as the output signal 27, with no noise reduction process, when the absolute value |PD1| is smaller than the predetermined value T.

In this case, since the sound pick-up signals 21 and 22 are determined as not usable for the noise reduction process, in order to select a sound pick-up signal carrying a larger magnitude, the adaptive filter controller 17 may perform determination as to which of the sounds picked up by the main microphone 11 and the sub-microphone 12 is larger, using the circuit like shown in FIG. 5. In this case, if it is determined that the magnitude of a sound picked up by the main microphone 11 is larger than the magnitude of a sound picked up by the sub-microphone 12, the adaptive filter controller 17 controls the adaptive filter 18 to output the sound pick-up signal 21 as the output signal 27. On the other hand, if it is determined that the magnitude of a sound picked up by the sub-microphone 12 is larger than the magnitude of a sound picked up by the main microphone 11, the adaptive filter controller 17 controls the adaptive filter 18 to output the sound pick-up signal 22 as the output signal 27.

Explained next is the noise reduction control using power information PD2 as the voice incoming-direction information 25 obtained by the voice direction detector 16*b* shown in FIG. 5. The power difference PD2 is defined as the difference between the magnitude of a sound pick-up signal 21 obtained based on a sound picked up by the main microphone 11 and the magnitude of a sound pick-up signal 22 obtained based on a sound picked up by the sub-microphone 12. The magnitude is the maximum amplitude, an integral value of amplitude of the sound pick-up signals 21 and 22, etc., as explained above.

The noise reduction control using the power difference PD2 is performed by the adaptive filter controller 17 in three ways depending on the relationship between the power difference PD2 and a predetermined positive value P, that is, PD2≥P, PD2≤−P or −P<PD2<P, that is analyzed by the adaptive filter controller 17.

When the relationship PD2≥P is established, the adaptive filter controller 17 controls the adaptive filter 18 to perform a regular noise reduction process. The relationship PD2≥P indicates that the magnitude of the sound pick-up signal 21 obtained based on a sound picked up by the main microphone 11 is larger than the magnitude of the sound pick-up signal 22 obtained based on a sound picked up by the sub-microphone 12.

In this case, the adaptive filter 18 performs the regular noise reduction process to reduce a noise component carried by the sound pick-up signal (a voice signal) 21 using the sound pick-up signal (a noise-dominated signal) 22 to produce the output signal 27. Moreover, in this case, the speech segment determiner 15 detects a speech segment based on the sound pick-up signal 21 obtained based on a sound picked up by the main microphone 11.

When the relationship PD2≤−P is established, the adaptive filter controller 17 controls the adaptive filter 18 to switch the sound pick-up signal (a voice signal) 21 and the sound pick-up signal (a noise-dominated signal) 22 in a noise reduction process. The relationship PD2≤−P indicates that the magnitude of the sound pick-up signal 22 obtained based on a sound picked up by the sub-microphone 12 is larger than the magnitude of the sound pick-up signal 21 obtained based on a sound picked up by the main microphone 11.

In this case, the adaptive filter controller 17 treats the sound pick-up signal (a noise-dominated signal) 22 as a voice signal while treats the sound pick-up signal (a voice signal) 21 as a noise-dominated signal. Then, the adaptive filter controller 17 controls the adaptive filter 18 to reduce a noise component carried by the sound pick-up signal 22 (a voice signal) 22 using the sound pick-up signal 21 (a noise-dominated signal) 22 to produce the output signal 27. In this case, the speech segment determiner 15 may detect a speech segment based on the sound pick-up signal 22 obtained based on a sound picked up by the sub-microphone 12 when the modification shown in FIG. 8 is employed. This is because the sound pick-up signal 22 obtained based on a sound picked up by the sub-microphone 12 is more suitable for speech segment determination than the sound pick-up signal 21 obtained based on a sound picked up by the main microphone 11 when the magnitude of the sound pick-up signal 22 is larger than the magnitude of the sound pick-up signal 21.

When the relationship −P<PD2<P is established, the adaptive filter controller 17 determines that the sound pick-up signals 21 and 22 are not usable for the noise reduction process at the adaptive filter 18. This is because it is highly likely that the distance from a sound source to the main microphone 11 and the distance from the sound source to the sub-microphone 12 are almost the same as each other. In this case, the adaptive filter controller 17 controls the adaptive filter 18 to output either the sound pick-up signal 21 or the sound pick-up signal 22 as the output signal 27, with no noise reduction process. In other words, the adaptive filter 18 outputs either the sound pick-up signal 21 or the sound pick-up signal 22 as the output signal 27, with no noise reduction process, when the absolute value |PD2| is smaller than the predetermined value P.

In this case, since the sound pick-up signals 21 and 22 are determined as not usable for the noise reduction process, in order to select a sound pick-up signal that has a more advanced phase, the adaptive filter controller 17 may perform determination as to which of the sounds picked up by the main microphone 11 and the sub-microphone 12 has a more advanced phase, using the circuit like shown in FIG. 4. In this case, if it is determined that the phase of a sound picked up by the main microphone 11 is more advanced than the phase of a sound picked up by the sub-microphone 12, the adaptive filter controller 17 controls the adaptive filter 18 to output the sound pick-up signal 21 as the output signal 27. On the other hand, if it is determined that the phase of a sound picked up by the sub-microphone 12 is more advanced than the phase of a sound picked up by the main microphone 11, the adaptive filter controller 17 controls the adaptive filter 18 to output the sound pick-up signal 22 as the output signal 27.

Figure 6:
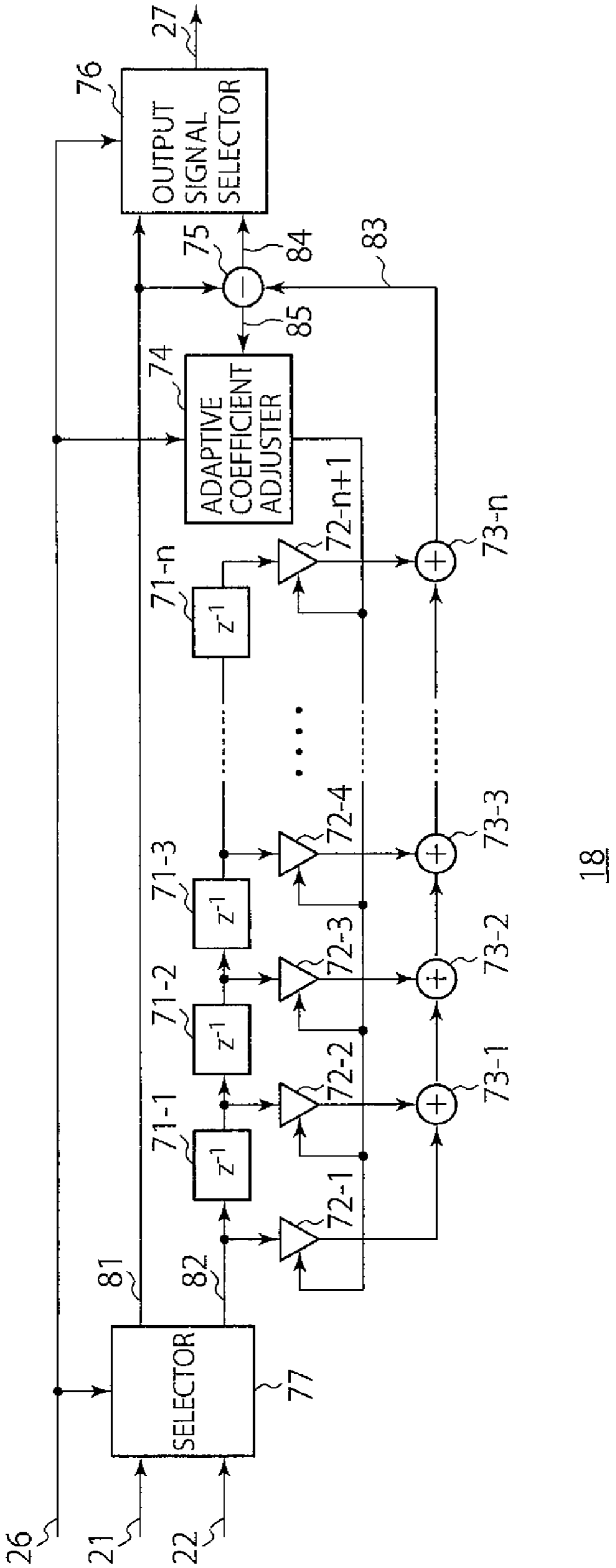
FIG. 6 is a block diagram showing an exemplary configuration of an adaptive filter installed in the noise reduction apparatus according to the first embodiment of the present invention.

FIG. 6 is a block diagram showing an exemplary configuration of the adaptive filter 18 installed in the noise reduction apparatus 1 according to the first embodiment.

The adaptive filter 18 shown in FIG. 6 is provided with delay elements 71-1 to 71-*n*, multipliers 72-1 to 72-*n*+1, adders 73-1 to 73-*n*, an adaptive coefficient adjuster 74, a subtracter 75, an output signal selector 76, and a selector 77.

With reference to FIG. 1, the selector 77 switches the sound pick-up signals 21 and 22 input from the A/D converters 21 and 22, respectively, in accordance with the control signal 26 (such as, the voice incoming-direction information 25 given by the voice direction detector 16) output from the adaptive filter controller 17. In detail, the selector 77 switches the sound pick-up signals 21 and 22 between two output modes. In a first output mode, the selector 77 outputs the sound pick-up signal 21 as a voice signal 81 and the sound pick-up signal 22 as a noise-dominated signal 82. In a second output mode, the selector 77 outputs the sound pick-up signal 21 as a noise-dominated signal 82 and the sound pick-up signal 22 as a voice signal 81.

The selector 77 is put into the first output mode in accordance with the control signal 26 when the phase of a sound pick-up signal 21 obtained based on a sound picked up by the main microphone 11 is more advanced than the phase of a sound pick-up signal 22 obtained based on a sound picked up by the sub-microphone 12. On the other hand, the selector 77 is put into the second output mode in accordance with the control signal 26 when the phase of a sound pick-up signal 22 obtained based on a sound picked up by the sub-microphone 12 is more advanced than the phase of a sound pick-up signal 21 obtained based on a sound picked up by the main microphone 11.

Moreover, the selector 77 may be put into the first output mode in accordance with the control signal 26 when the magnitude of a sound pick-up signal 21 obtained based on a sound picked up by the main microphone 11 is larger than the magnitude of a sound pick-up signal 22 obtained based on a sound picked up by the sub-microphone 12. On the other hand, the selector 77 may be put into the second output mode in accordance with the control signal 26 when the magnitude of a sound pick-up signal 22 obtained based on a sound picked up by the sub-microphone 12 is larger than the magnitude of a sound pick-up signal 21 obtained based on a sound picked up by the main microphone 11.

The delay elements 71-1 to 71-*n*, the multipliers 72-1 to 72-*n*+1, and the adders 73-1 to 73-*n* constitute an FIR filter that processes the noise-dominated signal 82 to generate a pseudo-noise signal 83.

The adaptive coefficient adjuster 74 adjusts the coefficients of the multipliers 72-1 to 72-*n*+1 in accordance with the control signal 26 (for example, the speech segment information 24 and the voice incoming-direction information 25) depending on what is indicated by the speech segment information 24 and/or the voice incoming-direction information 25.

In detail, the adaptive coefficient adjuster 74 adjusts the coefficients of the multipliers 72-1 to 72-*n*+1 to have a smaller adaptive error when the speech segment information 24 indicates a noise segment (a non-speech segment). On the other hand, the adaptive coefficient adjuster 74 makes no adjustments or a fine adjustment only to the coefficients of the multipliers 72-1 to 72-*n*+1 when the speech segment information 24 indicates a speech segment. Moreover, the adaptive coefficient adjuster 74 makes no adjustments or a fine adjustment only to the coefficients of the multipliers 72-1 to 72-*n*+1 when the voice incoming-direction information 25 indicates that a voice sound is coming from an inappropriate direction. When the voice incoming-direction information 25 indicates an inappropriate incoming direction, cancellation of a voice component is limited by diminishing a noise reduction effect with no adjustments or a fine adjustment only in the noise reduction process. Moreover, when the speech segment information 24 indicates a noise segment (a non-speech segment) and when the voice incoming-direction information 25 indicates an inappropriate direction, the adaptive coefficient adjuster 74 makes no adjustments or a fine adjustment only to the coefficients of the multipliers 72-1 to 72-*n*+1. Also in this case, cancellation of a voice component is limited by diminishing a noise reduction effect with no adjustments or a fine adjustment only in the noise reduction process.

The subtracter 75 subtracts the pseudo-noise signal 83 from the voice signal 81 to generate a low-noise signal 84 that is then output to the output signal selector 76. The low-noise signal 84 is also output to the adaptive coefficient adjuster 74, as a feedback signal 85.

The output signal selector 76 selects either the voice signal 81 or the low-noise signal 84, as the output signal 27, in accordance with the control signal 26 (for example, the voice incoming-direction information 25) output from the adaptive filter controller 17. In detail, when the voice incoming-direction information 25 indicates that a voice sound is coming from an inappropriate direction (for example, in the case of $-T<$phase difference PD1$<T$), the output signal selector 76 outputs the voice signal 81 as the output signal 27, with no noise reduction. On the other hand, when the voice incoming-direction information 25 indicates that a voice sound is coming from an appropriate direction (for example, in the case of PD1$\geq$T or PD1$\leq -$T), the output signal selector 76 outputs the low-noise signal 84 as the output signal 27.

Figure 7:
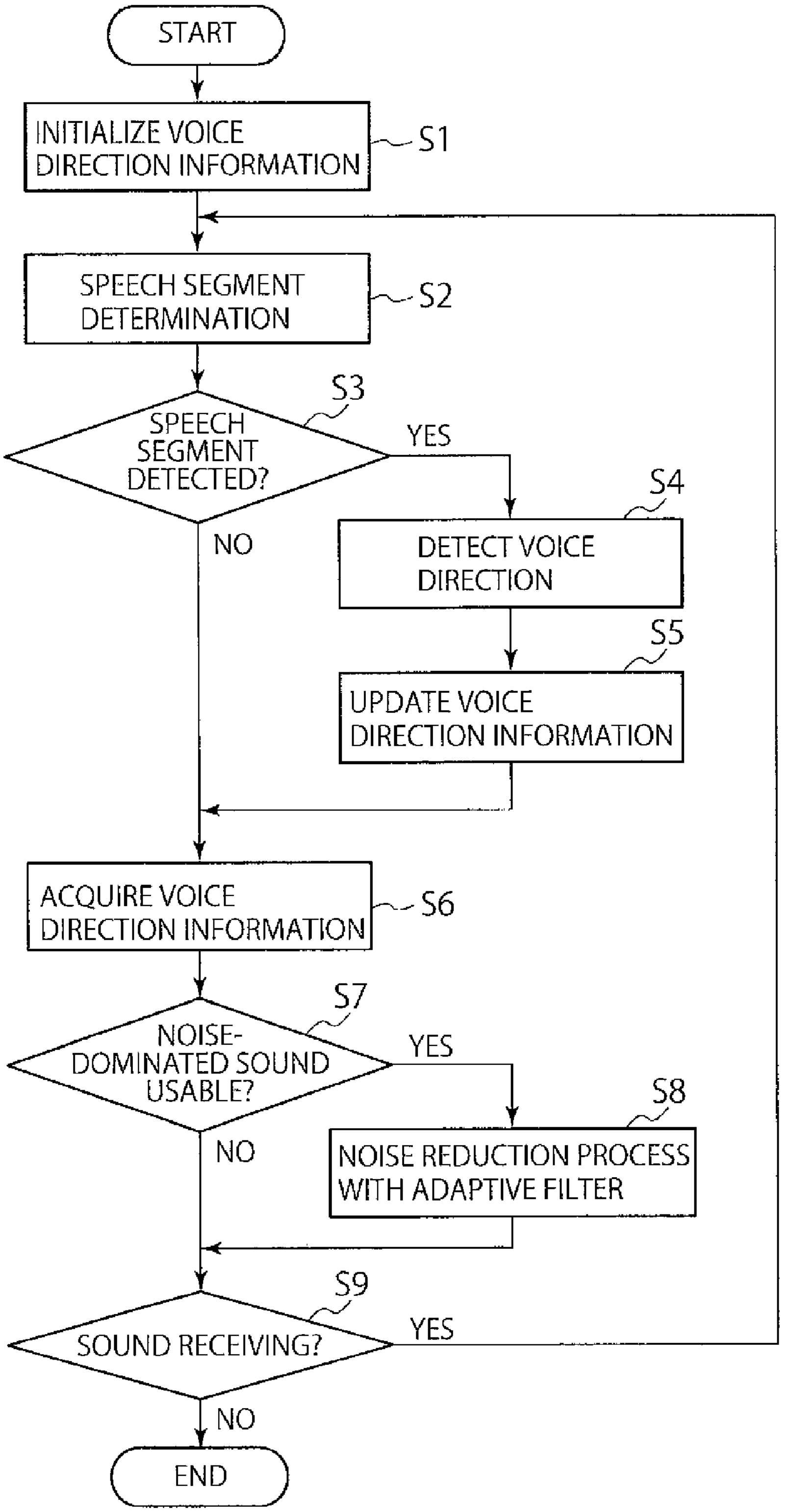
FIG. 7 is a flowchart showing an operation of the noise reduction apparatus according to the first embodiment of the present invention.

Next, the operation of the noise reduction apparatus 1 (FIG. 1) will be explained with reference to FIG. 7 that is a flowchart showing an operation that starts, for example, when sound reception starts.

One requirement in this operation is that the voice incoming-direction information 25 generated by the voice direction detector 16 is updated when it is certain that a sound picked up by the main microphone 11 is a speech segment, or the speech segment determiner 15 detects a speech segment.

Under the requirement discussed above, the voice incoming-direction information 25 is initialized to a predetermined initial value (step S1). The initial value is a parameter to be set to equipment having the noise reduction apparatus 1 installed therein, when the equipment is used in an appropriate mode (with the microphones 11 and 12 at an appropriate position when used), for example.

Then, it is determined by the speech segment determiner 15 whether a sound picked up by the main microphone 11 is a speech segment (step S2). High accuracy of speech segment determination is achieved with stricter requirement, such as, higher or larger threshold levels or values in the speech segment determination technique I or II described above.

In FIG. 1, the speech segment determiner 15 detects a speech segment based only on the sound pick-up signal 21 obtained from a sound picked up by the main microphone 11, under the precondition that it is highly like that a voice sound is picked up by the main microphone 11. Nonetheless, it may also happen that a voice sound is mostly picked up by the sub-microphone 12, rather than by the main microphone 11, depending on in what environment the noise reduction apparatus of the present invention is used. For such a case, the noise reduction apparatus 2 (a modification to the noise reduction apparatus 1) shown in FIG. 8 is preferable in that the speech segment determiner 19 detects a speech segment based of both of the sound pick-up signals 21 and 22 obtained from sounds picked by the main microphone 11 and the sub-microphone 12, respectively.

When a speech segment is detected by the speech segment determiner 15 (YES in step S3), the speech segment information 23 and 24 are supplied to the voice direction detector 16 and the adaptive filter controller 17, respectively. Then, a voice incoming direction is detected by the voice direction detector 16 based on the sound pick-up signals 21 and 22 (step S4). The voice incoming direction may be detected based on: the phase difference between the sound pick-up signals 21 and 22; the power information (the difference or ratio) on the magnitude of the sound pick-up signals 21 and 22, etc. Then, the voice incoming-direction information 25 is updated by the voice direction detector 16 to new information that indicates a newly detected voice incoming direction (step S5).

On the other hand, when no speech segment is detected by the speech segment determiner 15 (NO in step S3), the voice incoming-direction information 25 is not updated due to no performance of the detection of a voice incoming direction by the voice direction detector 16 at this stage. No update on the voice incoming-direction information 25 is based on the assumption that, when no speech segment is detected, it is highly likely that the sound pick-up signals 21 and 22 include no voice component even if the phase difference or power information is acquired between these sound pick-up signals.

As described above, the voice incoming-direction information 25 generated by the voice direction detector 16 is updated when it is certain that a sound picked up by the main microphone 11 is a speech segment, or the speech segment determiner 15 detects a speech segment, in this embodiment.

In the noise reduction apparatus 1 shown in FIG. 1, the same speech segment information 23 and 24 are output from the speech segment determiner 15 to the voice direction detector 16 and the adaptive filter controller 17, respectively. However, the speech segment information 23 may be generated based on the speech segment determination with stricter conditions than the speech segment information 24. In other words, the speech segment information 23 supplied to the voice direction detector 16 may be more accurate information than the speech segment information 24 supplied to the adaptive filter controller 17.

In order to achieve the generation of speech segment information with different accuracy, although not shown, first and second speech segment determiners may be provided for the adaptive filter controller 17 and the voice direction detector 16, respectively, instead of the speech segment determiner 15, to each of which the sound pick-up signal 21 is output from the AD converter 13. In this case, the first speech segment determiner performs speech segment determination to the sound pick-up signal 21 with a first determination condition and supplies first speech segment information to the adaptive filter controller 17. The second speech segment determiner performs speech segment determination to the sound pick-up signal 21 with a second determination condition that is stricter than the first determination condition and supplies second speech segment information to the voice direction detector 16.

The first and second speech segment determiners may be installed with the speech segment determination technique I or II described above. In the case of the speech segment determination technique I, the peak detection unit 37 (FIG. 2) compares SNR and a predetermined first threshold level to determine whether there is a spectrum that involves a peak that is a feature of a voice segment, as described above. As the determination condition mentioned above, the first threshold level may be set to a higher level for the second speech segment determiner that supplies second speech segment information to the voice direction detector 16 than for the first speech segment determiner that supplies first speech segment information to the adaptive filter controller 17.

Moreover, in order to achieve the generation of speech segment information with different accuracy, although not shown, a single speech segment determiner may have the first and second determination conditions discussed above to perform two speech-segment determination processes simultaneously and generate two pieces of information for the voice direction detector 16 and the adaptive filter controller 17, respectively.

With the modifications on the generation of speech segment information with different accuracy, there are advantages as discussed below.

A lenient determination condition for speech segment determination (for example, a lower first threshold level in the speech segment determination technique I to more easily determine a speech segment) for use in adaptive filter control can avoid such a situation that a voice sound is cancelled in an environment of high noise level due to inaccurate speech segment determination.

On the contrary, a strict determination condition for speech segment determination (for example, a higher first threshold level in the speech segment determination technique I to more accurately determine a speech segment) for use in voice incoming-direction detection can detect the location of a user who is speaking more accurately. While a user is speaking, the positional relationship between the user and a microphone is mostly constant, and hence it is preferable for the voice incoming-direction information 25 to be updated only when a speech segment is detected with a strict determination condition. Accordingly, it is preferable for the speech segment determination to be performed with a strict determination condition for use in voice incoming-direction detection.

Following to step S3 or S5, the current voice incoming-direction information 25 based on the voice incoming-direction information updated before is acquired by the adaptive filter controller 17 (step S6). It is then determined by the adaptive filter controller 17 whether a noise-dominated sound picked up by the sub-microphone 12 is usable for reduction (the noise reduction process) of a noise component included in a sound picked up by the main microphone 11 (step S7), which will be explained in detail later.

When it is determined that a noise-dominated sound picked up by the sub-microphone 12 is usable for the noise reduction process (YES in step S7), the noise reduction process is performed by the adaptive filter 18 (step S8). On the other hand, when it is determined that a noise-dominated sound picked up by the sub-microphone 12 is unusable for the noise reduction process (NO in step S7), the noise reduction process is not performed by the adaptive filter 18.

Following to step S7 or S8, it is checked whether a sound (a voice or noise sound) is being picked up by the main microphone 11 and/or the sub-microphone 12 (step S9). When a sound is being picked up (YES in step S9), the process returns to step S2 to repeat this and the following steps. On the other hand, when any sound is not being picked up (NO in step S9), the operation of the noise reduction apparatus 1 (with the noise reduction process) is finished.

Step S7 on the determination as to whether a noise-dominated sound picked up by the sub-microphone 12 is usable for the noise reduction process (step S8) will be explained in detail.

Explained first is the case in which a voice incoming direction is detected by the voice direction detector 16, in step S4, based on the phase difference PD1 between the sound pick-up signals 21 and 22, with the analysis by the adaptive filter controller 17 on the relationship between the phase difference PD1 and the positive value T, that is, PD1≥T, PD1≤−T or −T<PD1<T.

When the relationship PD1≥T is established, it is determined that a noise-dominated sound picked up by the sub-microphone 12 is usable for the noise reduction process (YES in step S7). This is because the relationship PD1≥T indicates that the phase of a voice component carried by a sound pick-up signal 21 obtained based on a sound picked up by the main microphone 11 is more advanced than the phase of a voice component carried by a sound pick-up signal 22 obtained based on a sound picked up by the sub-microphone 12. Then, the regular noise reduction process is performed by the adaptive filter 18 (step S8) to reduce a noise component carried by the sound pick-up signal (a voice signal) 21 using the sound pick-up signal (a noise-dominated signal) 22, thereby outputting the output signal 27.

When the relationship PD1≤−T is established, it is determined that a noise-dominated sound picked up by the sub-microphone 12 is usable for the noise reduction process (YES in step S7). This is because the relationship PD1≤−T indicates that the phase of a voice component carried by the sound pick-up signal 22 obtained based on a sound picked up by the sub-microphone 12 is more advanced than the phase of a voice component carried by the sound pick-up signal 21 obtained based on a sound picked up by the main microphone 11. In this case, the sound pick-up signal (a noise-dominated signal) 22 and the sound pick-up signal (a voice signal) 21 are treated by the adaptive filter 18 as a voice signal and a noise-dominated signal, respectively. Then, the noise reduction process is performed by the adaptive filter 18 (step S8) to reduce a noise component carried by the sound pick-up signal (a voice signal) 22 using the sound pick-up signal (a noise-dominated signal) 21, thereby outputting the output signal 27.

When the relationship −T<PD1<T is established, it is determined that the sound pick-up signals 21 and 22 are not usable for the noise reduction process (NO in step S7). This is because it is highly likely that the distance from a sound source to the main microphone 11 and the distance from the sound source to the sub-microphone 12 are almost the same as each other. Then, the noise reduction process is not performed by the adaptive filter 18, with either the sound pick-up signal 21 or the sound pick-up signal 22 being output as the output signal 27. In this case, the sound pick-up signal 21 may be output as the output signal 27 when the magnitude of a sound picked up by the main microphone 11 is larger than the magnitude of a sound picked up by the sub-microphone 12. Or the sound pick-up signal 22 may be output as the output signal 27 when the magnitude of a sound picked up by the main microphone 11 is smaller than the magnitude of a sound picked up by the sub-microphone 12.

Explained next is the case in which a voice incoming direction is detected by the voice direction detector 16, in step S4, based on the power difference PD2 (power information) between the sound pick-up signals 21 and 22, with the analysis by the adaptive filter controller 17 on the relationship between the power difference PD2 and the positive value P, that is, PD2≥P, PD2≤−P or −P<PD2<P.

When the relationship PD2≥P is established, it is determined that a noise-dominated sound picked up by the sub-microphone 12 is usable for the noise reduction process (YES in step S7). This is because the relationship PD2≥P indicates that the magnitude of the sound pick-up signal 21 obtained based on a sound picked up by the main microphone 11 is larger than the magnitude of the sound pick-up signal 22 obtained based on a sound picked up by the sub-microphone 12. Then, the regular noise reduction process is performed by the adaptive filter 18 (step S8) to reduce a noise component carried by the sound pick-up signal (voice signal) 21 using the sound pick-up signal (noise-dominated signal) 22, thereby outputting the output signal 27.

When the relationship PD2≤−P is established, it is determined that a noise-dominated sound picked up by the sub-microphone 12 is usable for the noise reduction process (YES in step S7). This is because the relationship PD2≤−P indicates that the magnitude of the sound pick-up signal 22 obtained based on a sound picked up by the sub-microphone 12 is larger than the magnitude of the sound pick-up signal 21 obtained based on a sound picked up by the main microphone 11. In this case, the sound pick-up signal (a noise-dominated signal) 22 and the sound pick-up signal (a voice signal) 21 are treated by the adaptive filter 18 as a voice signal and a noise-dominated signal, respectively. Then, the noise reduction process is performed by the adaptive filter 18 (step S8) to reduce a noise component carried by the sound pick-up signal (a voice signal) 22 using the sound pick-up signal (a noise-dominated signal) 21, thereby outputting the output signal 27.

When the relationship −P<PD2<P is established, it is determined that the sound pick-up signals 21 and 22 are not usable for the noise reduction process (No in step S7). This is because it is highly likely that the distance from a sound source to the main microphone 11 and the distance from the sound source to the sub-microphone 12 are almost the same as each other. Then, the noise reduction process is not performed by the adaptive filter 18, with either the sound pick-up signal 21 or the sound pick-up signal being output as the output signal 27. In this case, the sound pick-up signal 21 may be output as the output signal 27 when the phase of a sound picked up by the main microphone 11 is more advanced than the phase of a sound picked up by the sub-microphone 12. Or the sound pick-up signal 22 may be output as the output signal 27 when the phase of a sound picked up by the main microphone 11 is more delayed than the phase of a sound picked up by the sub-microphone 12.

Explained next is an audio input apparatus having the noise reduction apparatus 1 (FIG. 1) or 2 (FIG. 8) installed therein according to the present invention.

Figure 9:
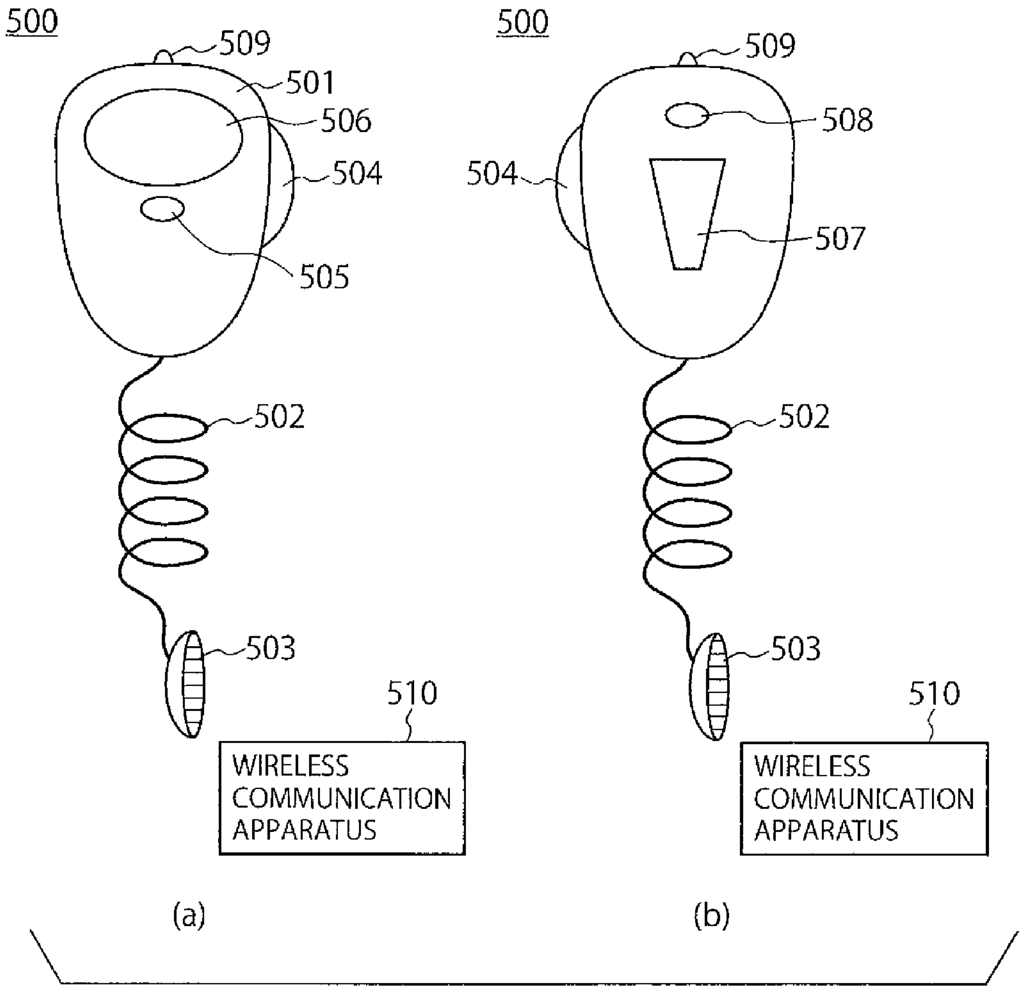
FIG. 9 is a schematic illustration of an audio input apparatus having the noise reduction apparatus according to the first embodiment of the present invention, installed therein.

FIG. 9 is a schematic illustration of an audio input apparatus 500 having the noise reduction apparatus 1 or 2 installed therein, with views (a) and (b) showing the front and rear faces of the audio input apparatus 500, respectively.

As shown in FIG. 9, the audio input apparatus 500 is detachably connected to a wireless communication apparatus 510. The wireless communication apparatus 510 is an ordinary wireless communication apparatus for use in wireless communication at a specific frequency.

The audio input apparatus 500 has a main body 501 equipped with a cord 502 and a connector 503. The main body 501 is formed having a specific size and shape so that a user can grab it with no difficulty. The main body 501 houses several types of parts, such as, a microphone, a speaker, an electronic circuit, and the noise reduction apparatus 1 or 2 of the present invention.

As shown in the view (a) of FIG. 9, a main microphone 505 and a speaker 506 are provided on the front face of the main body 501. Provided on the rear face of the main body 501 are a belt clip 507 and a sub-microphone 508, as shown in the view (b) of FIG. 9. Provided at the top and the side of the main body 501 are an LED 509 and a PTT (Push To Talk) unit 504, respectively. The LED 509 informs a user of the user's voice pick-up state detected by the audio input apparatus 500. The PTT unit 504 has a switch that is pushed into the main body 501 to switch the wireless communication apparatus 510 into a speech transmission state.

The noise reduction apparatus 1 (or 2) according to the first embodiment is installed in the audio input apparatus 500. The main microphone 11 and the sub-microphone 12 (FIG. 1) of the noise reduction apparatus 1 correspond to the main microphone 505 shown in the view (a) of FIG. 9 and the sub-microphone 508 shown in the view (b) of FIG. 9, respectively.

The output signal 27 (FIG. 1) output from the noise reduction apparatus 1 is supplied from the audio input apparatus 500 to the wireless communication apparatus 510 through the cord 502. The wireless communication apparatus 510 can transmit a low-noise voice sound to another wireless communication apparatus when the output signal 27 supplied thereto is a signal output after the noise reduction process (step S8 in FIG. 7) is performed.

Explained next is a wireless communication apparatus (a transceiver, for example) having the noise reduction apparatus 1 (FIG. 1) or 2 (FIG. 8) installed therein according to the present invention.

Figure 10:
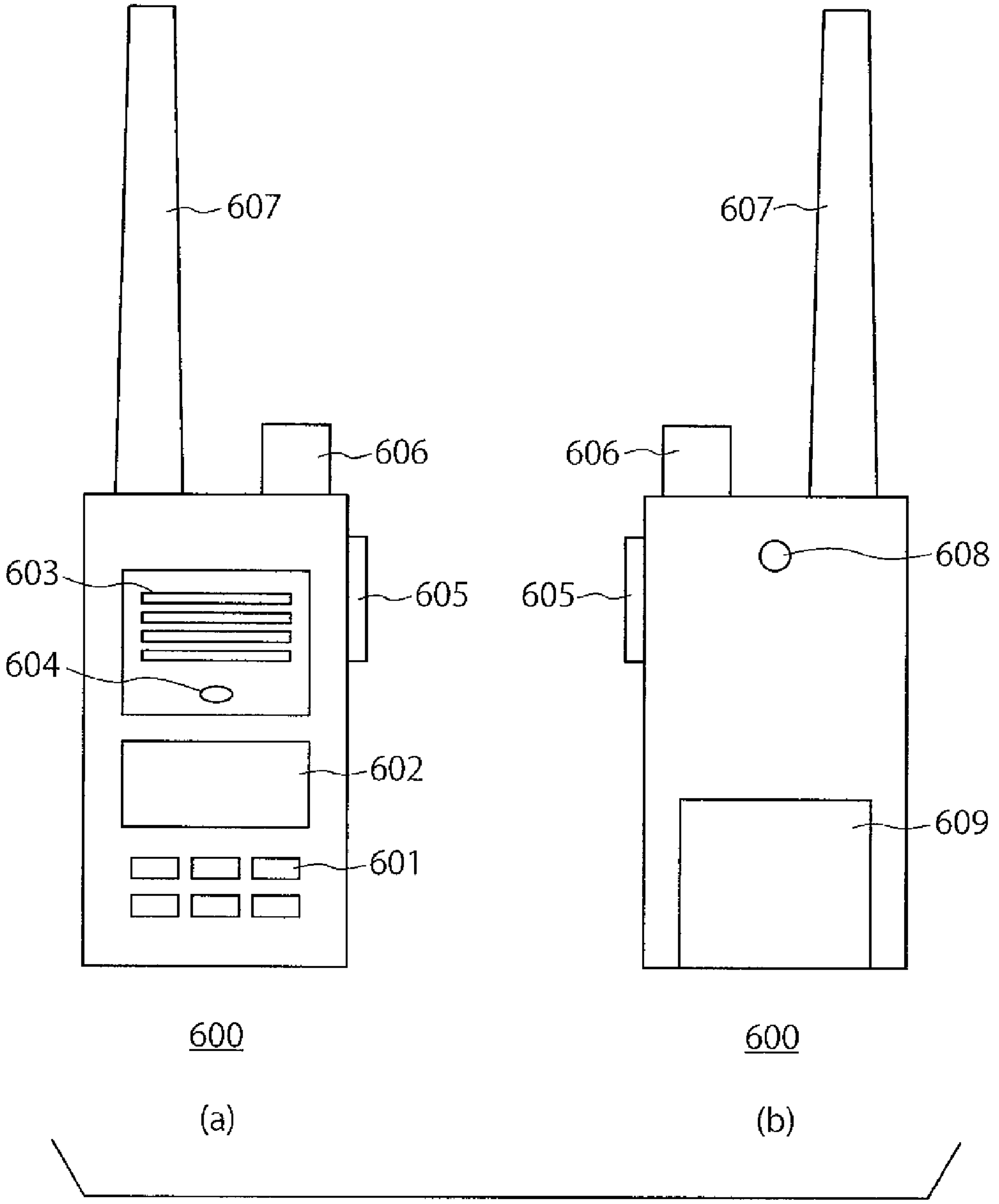
FIG. 10 is a schematic illustration of a wireless communication apparatus having the noise reduction apparatus according to the first embodiment of the present invention, installed therein.

FIG. 10 is a schematic illustration of a wireless communication apparatus 600 having the noise reduction apparatus 1 or 2 installed therein, with views (a) and (b) showing the front and rear faces of the wireless communication apparatus 600, respectively.

The wireless communication apparatus 600 is equipped with input buttons 601, a display screen 602, a speaker 603, a main microphone 604, a PTT (Push To Talk) unit 605, a switch 606, an antenna 607, a sub-microphone 608, and a cover 609.

The noise reduction apparatus 1 (or 2) in the first embodiment is installed in the wireless communication apparatus 600. The main microphone 11 and the sub-microphone 12 (FIG. 1) of the noise reduction apparatus 1 correspond to the main microphone 604 shown in the view (a) of FIG. 10 and the sub-microphone 608 shown in the view (b) of FIG. 10, respectively.

The output signal 27 (FIG. 1) output from the noise reduction apparatus 1 undergoes a high-frequency process by an internal circuit of the wireless communication apparatus 600 and is transmitted via the antenna 607 to another wireless communication apparatus. The wireless communication apparatus 600 can transmit a low-noise voice sound to another wireless communication apparatus when the output signal 27 supplied thereto is a signal output after the noise reduction process (step S8 in FIG. 7) is performed.

The noise reduction apparatus 1 may start the operation explained with reference to FIG. 7 when a user depresses the PTT unit 605 for the start of sound transmission and halt the operation when the user detaches a finger from the PTT unit 605 for the completion of sound transmission.

A mobile wireless communication apparatus, such as a transceiver, may be used in an environment with much noise, for example, an intersection and a factory with a sound of a machine, hence requiring reduction of noises picked up by a microphone.

Especially, a transceiver may be used in such a manner that a user listens to a sound from a speaker attached to the transceiver while the speaker is apart from a user' ear. Moreover, mostly users hold a transceiver apart from his or her body and hold it in a variety of ways. A speaker microphone having a picked up unit (a microphone) and a reproduction unit (a speaker) apart from a transceiver body can be used in a variety of ways. For example, a microphone can be slung over a user's neck or placed on a user's shoulder so that users can speak without facing the microphone. Moreover, a user may speak from a direction closer to the rear face of a microphone than to the front face having a pickup. It is thus not always the case that a voice sound reaches a speaker microphone from an appropriate direction.

Therefore, detection of an incoming direction while a speech segment only is being detected even when a conversation is obstructed with a high level of noise is required for a noise reduction process for an audio input apparatus such as a transceiver and a speaker microphone used in such a situation discussed above.

The speech segment determiner 15 (FIG. 1) of the noise reduction apparatus 1 in this embodiment can detect a speech segment even if there is a high level of noise, as described above. Then, while a speech segment is being detected, the voice direction detector 16 detects a voice incoming direction and updates the voice incoming-direction information for the control of the adaptive filter 18.

The detection of an incoming direction while a speech segment only is being detected lowers the processing amount at the voice direction detector 16 and provides highly reliable voice incoming-direction information. Therefore, with highly reliable voice incoming-direction information and speech segment information, the adaptive filter 18 can perform a noise reduction process to reduce a noise component carried by a voice signal in a variety of environments.

Moreover, the first embodiment is advantageous as follows, as described above in detail. For example, noises coming from a user's back side can be reduced. Even if a sound is coming from a variety of directions, noise reduction can be performed by the adaptive filter 18 with no increase in computation load. Smaller circuit scale, power consumption and cost are achieved. Even if a sound source is located between a main microphone and a sub-microphone, a voice sound level is not lowered when the noise reduction process is performed. Moreover, the first embodiment is applicable in an environment of high noise level.

As described above in detail, the first embodiment of the present invention offers a noise reduction apparatus, an audio input apparatus, a wireless communication, apparatus, and a noise reduction method that can reduce a noise component carried by a voice signal in a variety of environments.

Embodiment 2

Figure 11:
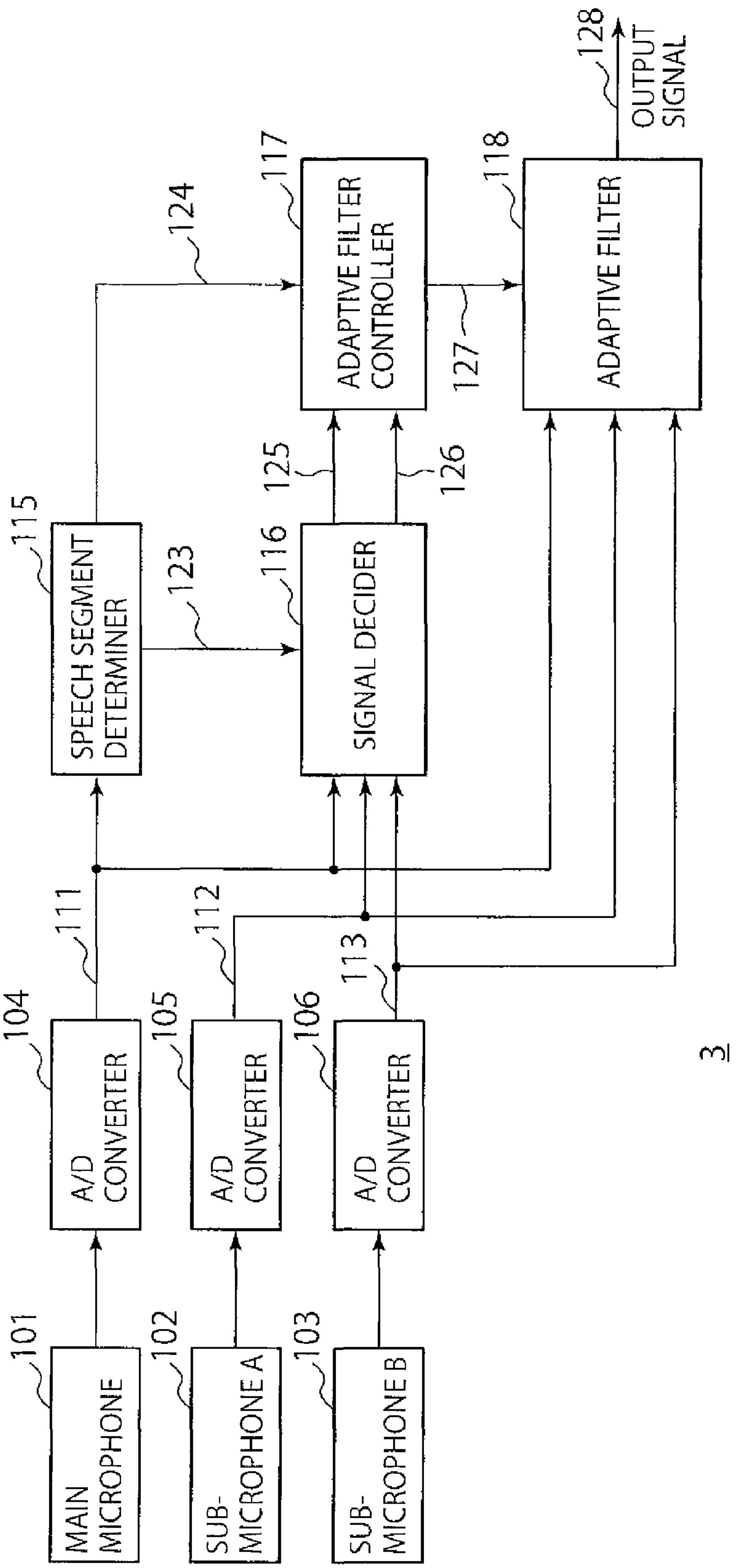
FIG. 11 is a block diagram schematically showing the configuration of a noise reduction apparatus according to a second embodiment of the present invention.

FIG. 11 is a block diagram schematically showing the configuration of a noise reduction apparatus 3 according to a second embodiment of the present invention. The noise reduction apparatus 3 of the second embodiment is different from the noise reduction apparatus 1 (FIG. 1) of the first embodiment in that there are two sub-microphones A and B, and a signal decider.

The noise reduction apparatus 3 shown in FIG. 11 is provided with a main microphone 101, sub-microphones 102 and 103, A/D converters 104, 105 and 106, a speech segment determiner 115, a signal decider 116, an adaptive filter controller 117, and an adaptive filter 118.

The main microphone 101 and the sub-microphones 102 and 103 pick up a sound including a speech segment and/or a noise component. In detail, the main microphone 101 is a voice-component pick-up microphone that picks up a sound that mainly includes a voice component and converts the sound into an analog signal that is output to the A/D converter 104. The sub-microphone 102 is a noise-component pick-up microphone that picks up a sound that mainly includes a noise component and converts the sound into an analog signal that is output to the A/D converter 105. The sub-microphone 103 is also a noise-component pick-up microphone that picks up a sound that mainly includes a noise component and converts the sound into an analog signal that is output to the A/D converter 106. A noise component picked up by the sub-microphone 102 or 103 is used for reducing a noise component included in a sound picked up by the main microphone 101, for example.

The second embodiment is described with three microphones (which are the main microphone 101 and the sub-microphones 102 and 103 in FIG. 11) connected to the noise reduction apparatus 3. However, three or more sub-microphones can be connected to the noise reduction apparatus 3.

In FIG. 11, the A/D converter 104 samples an analog signal output from the main microphone 101 at a predetermined sampling rate and converts the sampled analog signal into a digital signal to generate a sound pick-up signal 111. The sound pick-up signal 111 generated by the A/D converter 104 is output to the speech segment determiner 115, the signal decider 116, and the adaptive filter 118.

The A/D converter 105 samples an analog signal output from the sub-microphone 102 at a predetermined sampling rate and converts the sampled analog signal into a digital signal to generate a sound pick-up signal 112. The sound pick-up signal 112 generated by the A/D converter 105 is output to the signal decider 116 and the adaptive filter 118.

The A/D converter 106 samples an analog signal output from the sub-microphone 103 at a predetermined sampling rate and converts the sampled analog signal into a digital signal to generate a sound pick-up signal 113. The sound pick-up signal 113 generated by the A/D converter 106 is output to the signal decider 116 and the adaptive filter 118.

In the second embodiment, a frequency band for a voice sound input to the main microphone 101 and the sub-microphones 102 and 103 is roughly in the range from 100 Hz to 4,000 Hz, for example. In this frequency band, the A/D converters 104, 105 and 106 convert an analog signal carrying a voice component into a digital signal at a sampling frequency in the range from about 8 kHz to 12 kHz.

The speech segment determiner 115 determines whether or not a sound picked up the main microphone 101 is a speech segment (voice component) based on a sound pick-up signal 111 output from the A/D converter 104. When it is determined that a sound picked up the main microphone 101 is a speech segment, the speech segment determiner 115 outputs speech segment information 123 and 124 to the signal decider 116 and the adaptive filter controller 117, respectively.

The speech segment determiner 115 can use any appropriate technique, such as, the speech segment determination technique I or II, especially when the noise reduction apparatus 3 is used in an environment of high noise level, like the first embodiment described above.

In the noise reduction apparatus 3 shown in FIG. 11, the speech segment determiner 115 performs speech segment determination using only the sound pick-up signal 111 obtained based on a sound picked up by the main microphone 101. This is based on a presumption in the second embodiment that it is highly likely that voice sounds are mostly picked up by the main microphone 101, not by the sub-microphones 102 and 103.

However, it may happen that voice sounds are mostly picked up by the sub-microphone 102 or 103, not by the main microphone 101, depending on the environment in which the noise reduction apparatus 3 is used. For this reason, like shown in FIG. 8, in addition to the sound pick-up signal 111 obtained based on a sound picked by the main microphone 101, the sound pick-up signal 112 obtained based on a sound picked by the sub-microphone 102 or 103 may be supplied to the speech segment determiner 115 for speech segment determination.

Returning to FIG. 11, the signal decider 116 decides and selects two sound pick-up signals to be used for a noise reduction process to be performed by the adaptive filter 118 among the sound pick-up signals 111, 112 and 113, and obtains sound pick-up signal selection information 125 on the selected two sound pick-up signals. Moreover, the signal decider 116 obtains phase difference information 126 on the phase difference between the selected two sound pick-up signals. Then, the signal decider 116 output the sound pick-up signal selection information 125 and phase difference information 126 to the adaptive filter controller 117.

For the same reason discussed in the first embodiment, it is also preferable in the second embodiment to set the sampling frequency to 24 kHz or higher for the sound pick-up signals 111, 112 and 113 to be supplied to the signal decider 116 for obtaining the phase difference between the sound pick-up signals 111 and 112, between the sound pick-up signals 111 and 113, and between the sound pick-up signals 112 and 113.

The noise reduction apparatus 3 in this embodiment shown in FIG. 11 is equipped with two sub-microphones A and B. In the case of two sub-microphones, it is preferable as shown in (b) of FIG. 19 or of FIG. 21 that two sub-microphones (711 and 712 in FIG. 19 or 811 and 812 in FIG. 21) are arranged diagonally and apart from each other with a specific distance on the body of equipment having the noise reduction apparatus 3 installed therein. The distance between two sub-microphones requires to be long enough so that a voice incoming direction can be detected appropriately with at least one of the two sub-microphones even if the other is covered with a user's hand that holds the equipment, which will be explained later in detail.

Figure 12:
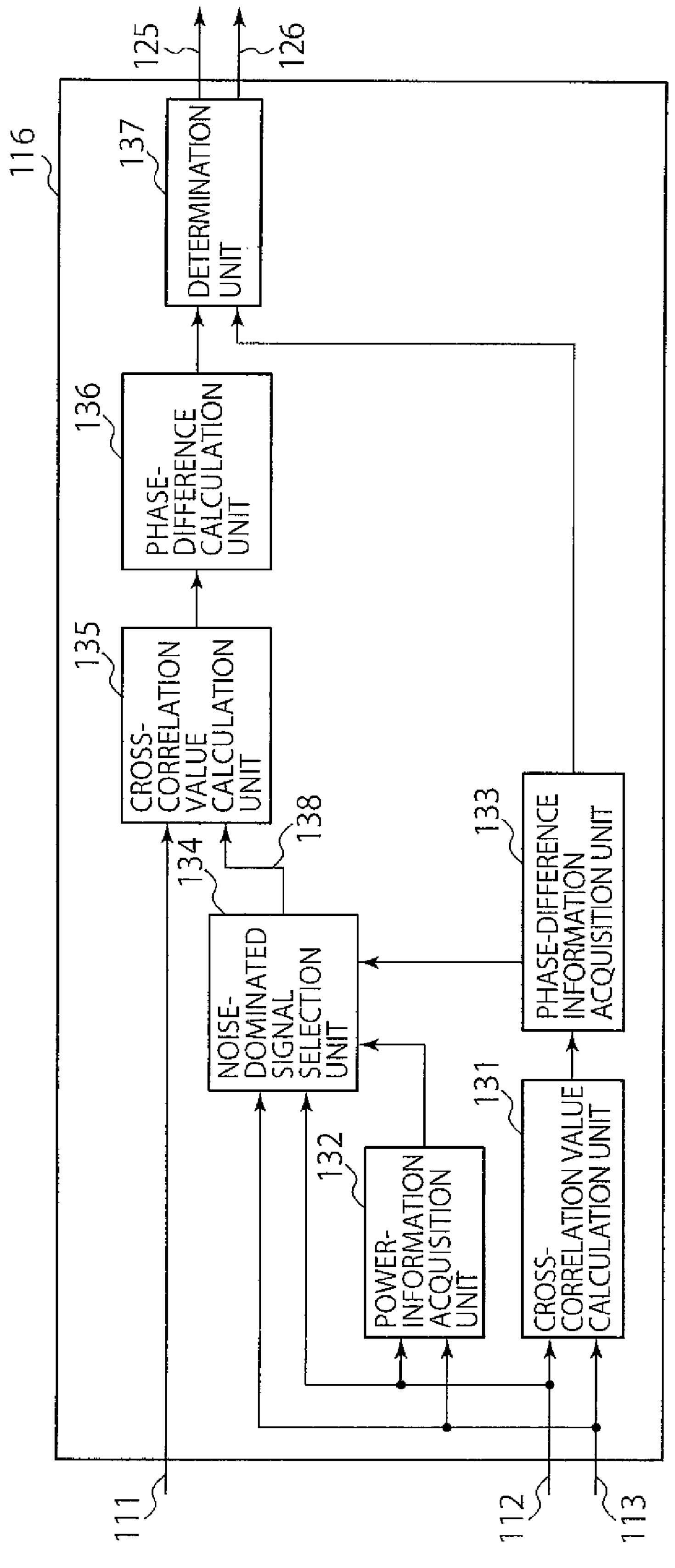
FIG. 12 is a block diagram schematically showing an exemplary configuration of a signal decider installed in the noise reduction apparatus according to the second embodiment of the present invention.

FIG. 12 is a block diagram showing an exemplary configuration of the signal decider 116 installed in the noise reduction apparatus 3 according to the second embodiment.

The signal decider 116 shown in FIG. 12 is provided with a cross-correlation value calculation unit 131, a power-information acquisition unit 132, a phase-difference information acquisition unit 133, a noise-dominated signal selection unit 134, a cross-correlation value calculation unit 135, a phase-difference calculation unit 136, and a determination unit 137.

As explained with reference to FIG. 11, when the speech segment determiner 115 determines that a sound picked up by the main microphone 101 is a speech segment, the determiner 115 outputs speech segment information 123 to the signal decider 116.

When the speech segment information 123 is input to the signal decider 116 in FIG. 12, the cross-correlation value calculation unit 131 acquires cross-correlation information on the cross correlation between the sound pick-up signals 112 and 113 obtained based on sounds picked up by the sub-microphones 102 and 103, respectively. The acquired cross-correlation information is output to the phase-difference information acquisition unit 133.

The phase-difference information acquisition unit 133 acquires a phase difference between two signal wave forms having a correlation to acquire a phase difference between voice components carried by the sound pick-up signals 112 and 113. The acquired phase difference information is output to the noise-dominated signal selection unit 134 and the determination unit 137.

The cross-correlation value calculation unit 131 and the phase-difference information acquisition unit 133 operate in the same manner as the cross-correlation value calculation unit 55 and the phase-difference information acquisition unit 56, respectively, as described with reference to FIG. 4, hence explanation thereof being omitted for brevity.

In the second embodiment, the signal decider 116 can accurately calculate a phase difference even if a sound pick-up signal carries a noise component. This is because the calculation of a phase difference is done only when the speech segment determiner 115 determines that a sound picked up by the main microphone 101 is a speech segment.

Moreover, when the speech segment information 123 is input to the signal decider 116 in FIG. 12, the power-information acquisition unit 132 acquires power information (a power ratio or a power difference between the sound pick-up signals 112 and 113) based on the magnitudes of the sound pick-up signals 112 and 113. The acquired power information is output to the noise-dominated signal selection unit 134. The power-information acquisition unit 132 operates in the same manner as the voice direction detector 16*b* described with reference to FIG. 5, hence explanation thereof being omitted for brevity.

There are two requirements for a noise-dominated signal so that the adaptive filter 118 (FIG. 11) can accurately update its filter coefficients based on the noise-dominated signal. One requirement (A) is that a sub-microphone picks up a smaller amount of a voice component in addition to a noise component. The other requirement (B) is that the noise characteristics of a noise component picked up by a sub-microphone are closer to the noise characteristics of a noise component picked up by a main microphone in addition to a voice component.

The requirement (A) discussed above is more satisfied when a sub-microphone is located farther from a sound source. If there are two sub-microphones, a sub-microphone that is located farther from a sound source can be found with phase comparison.

In the case of the second embodiment, comparison is made between the phase of the sound pick-up signal 112 obtained based on a sound picked up by the sub-microphone 102 and the phase of the sound pick-up signal 113 obtained based on a sound picked up by the sub-microphone 103. If the sound pick-up signal 112 has a more delayed phase than the sound pick-up signal 113, it is determined that the sub-microphone 102 is located farther than the sub-microphone 103 from a sound source. Then, the sound pick-up signal 112 is selected as a noise-dominated signal for use in noise reduction. On the other hand, if the sound pick-up signal 113 has a more delayed phase than the sound pick-up signal 112, it is determined that the sub-microphone 103 is located farther than the sub-microphone 102 from a sound source. Then, the sound pick-up signal 113 is selected as a noise-dominated signal for use in noise reduction.

Concerning the requirement (A), when a sub-microphone is located farther from a sound source, the amount of a voice component is reduced. It is therefore required to consider the environment in which the noise reduction apparatus 3 is used. In view of acoustic characteristics, any object that covers a microphone affects the performance of the noise reduction apparatus 3. Accordingly, in addition to the phase difference, checking whether the pickup of a microphone is not covered with any object, in other words, whether a sound is picked up by a microphone at a stable sound level is important, for obtaining excellent acoustic characteristics constantly.

In FIG. 12, based on the phase difference information and the power information output from the phase-difference information acquisition unit 133 and the power-information acquisition unit 132, respectively, the noise-dominated signal selection unit 134 selects either the sound pick-up signal 112 or 113 as an appropriate signal to be used as a noise-dominated signal for noise reduction. With the use of phase difference information and power information, external environmental effects can be reflected in the selection of a sound pick-up signal as a noise-dominated signal for noise reduction. The sound pick-up signal 112 or 113 selected as a noise-dominated signal for noise reduction is output to the cross-correlation value calculation unit 135, as a sound pick-up signal 138.

When the sound pick-up signal 111 obtained based on a sound picked up by the main microphone 101 and the sound pick-up signal 138 are input, the cross-correlation value calculation unit 135 acquires information on cross correlation between sound pick-up signals 111 and 138, and outputs cross-correlation information to the phase-difference calculation unit 136.

With the cross-correlation information, the phase-difference calculation unit 136 obtains a phase difference between two signal waveforms determined to have a correlation with each other to obtain a phase difference between a voice component carried by the sound pick-up signal 111 and a voice component carried by the sound pick-up signal 138. Then, the phase-difference calculation unit 136 outputs the acquired phase difference information to the determination unit 137.

The cross-correlation value calculation unit 135 and the phase-difference calculation unit 136 operate in the same manner as the cross-correlation value calculation unit 55 and the phase-difference information acquisition unit 56, respectively, as described with reference to FIG. 4, hence explanation thereof being omitted for brevity.

In FIG. 12, the cross-correlation value calculation unit 131 and the cross-correlation value calculation unit 135 operate in the same manner as each other. Thus, the cross-correlation value calculation unit 131 and the cross-correlation value calculation unit 135 may be combined into a single unit. Moreover, the phase-difference information acquisition unit 133 and phase-difference calculation unit 136 operate in the same manner as each other. Thus, the phase-difference information acquisition unit 133 and phase-difference calculation unit 136 may be combined into a single unit.

Based on the phase difference information output from the phase-difference calculation unit 136, the determination unit 137 determines whether the sound pick-up signal 111 can be used as a voice signal to be subjected to noise reduction and the sound pick-up signal 138 (that is the sound pick-up signal 112 or 113 selected by the noise-dominated signal selection unit 134) can be used as a noise-dominated signal for use in noise reduction of the voice signal. Then, the phase-difference calculation unit 136 decides two sound pick-up signals to be used in the noise reduction process and outputs sound pick-up signal selection information 125 on the decided two sound pick-up signals to the adaptive filter controller 117 (FIG. 11).

Explained next is the operation of the signal decider 116 with respect to the flowcharts of FIGS. 13 and 14.

Figure 13:
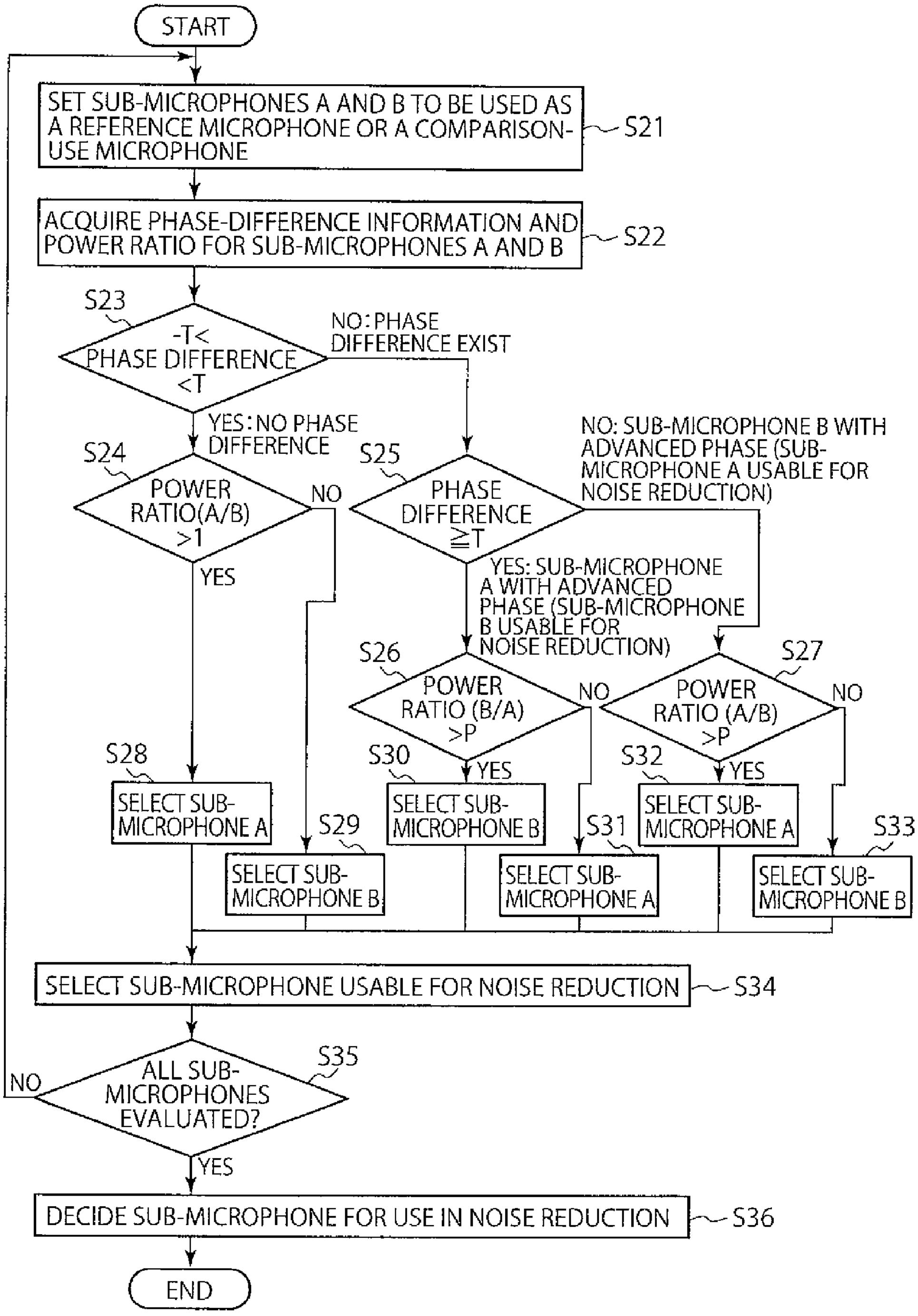
FIG. 13 is a flowchart showing an operation of the signal decider installed in the noise reduction apparatus according to the second embodiment of the present invention.

A sub-microphone selection process performed by the signal decider 116 is explained first with reference to FIG. 13.

In FIG. 13, sub-microphones A and B are set to be used as a reference microphone or a comparison-use microphone in phase-difference comparison (step S21). For example, the sub-microphone 102 is set as a reference microphone and the sub-microphone 103 is set as a comparison-use microphone.

Next, the phase-difference information on the sound pick-up signals 112 and 113 obtained based on sounds picked up by the sub-microphones 102 and 103, respectively, is acquired at the cross-correlation value calculation unit 131 and the phase-difference information acquisition unit 133, and the power information (power ratio, in this case) on the sound pick-up signals 112 and 113 is acquired at the power-information acquisition unit 132 (step S22).

Next, it is determined by the noise-dominated signal selection unit 134 whether there is a phase difference between the sound pick-up signals 112 and 113 (step S23). In detail, it is determined whether a phase difference between the sound pick-up signals 112 and 113 falls within a specific range (−T<phase difference<T), T being a threshold value set to be freely.

If the phase difference between the sound pick-up signals 112 and 113 falls within the specific range (−T<phase difference<T), it is determined that there is no phase difference between the sound pick-up signals 112 and 113 (YES in step S23). In this case, it is determined by the noise-dominated signal selection unit 134 whether a power ratio (A/B) of the sound pick-up signal 112 to the sound pick-up signal 113 is larger than the value of 1 (step S24). The value can be set to any value other than 1, which may be decided in accordance with the threshold value T used in step S23.

If the power ratio (A/B) is larger than 1 (YES in step S24), the sound pick-up signal 112 (the sub-microphone A) is selected (step S28). On the other hand, if the power ratio (A/B) is equal to or smaller than 1 (NO in step S24), the sound pick-up signal 113 (the sub-microphone B) is selected (step S29).

As described above, when it is determined in step S23 that there is no phase difference between the sound pick-up signals 112 and 113, the power is compared between the sound pick-up signals 112 and 113 (power ratio A/B) so as to select a noise-dominated signal more suitable for noise reduction. When there is no phase difference between the sound pick-up signals 112 and 113, there is no power difference between these signals unless there is a factor of power difference, such as, an object that covers the pickup of a sub-microphone. However, when the pickup of a sub-microphone is covered with an object, such as a user's hand, clothes, etc., a sound pick-up signal exhibits a lowered sound level. Such object affects the acoustic characteristics of a microphone, and hence gives adverse effects to the adaptive filter 118 in generation of a pseudo-noise component. For this reason, by selecting a signal obtained based on a sound picked up by a sub-microphone with less effects of an object that covers the pickup thereof, a noise-dominated signal more suitable for noise reduction can be selected.

Again in FIG. 13, if the phase difference between the sound pick-up signals 112 and 113 does not fall within the specific range (−T<phase difference<T), it is determined that there is a phase difference between the sound pick-up signals 112 and 113 (NO in step S23). In this case, it is determined by the noise-dominated signal selection unit 134 which phase of the sound pick-up signals 112 and 113 is more advanced (in step S25). In detail, it is determined whether the phase difference between the sound pick-up signals 112 and 113 is equal to or larger than the threshold value T (phase difference≥T).

If it is determined that the phase difference between the sound pick-up signals 112 and 113 is equal to or larger than the threshold value T (YES in step S25), it is indicated that the phase of the sound pick-up signal 112 is more advanced than the phase of the sound pick-up signal 113. A sound pick-up signal having a delayed phase is considered to be appropriate as a noise-dominated signal for use in noise reduction. Thus, the sound pick-up signal 113 (sub-microphone B) is considered to be appropriate as a noise-dominated signal for use in noise reduction.

Then, it is determined by the noise-dominated signal selection unit 134 whether a power ratio (B/A) of the sound pick-up signal 113 to the sound pick-up signal 112 is larger than a specific value P (step S26). If it is determined that the power ratio (B/A) is larger than the specific value P (YES step S26), it is determined that the sound pick-up signal 113 possesses a certain power level (with smaller effects of an object that covers the pickup of the sub-microphone B), and hence the sound pick-up signal 113 (sub-microphone B) is selected as a noise-dominated signal for use in noise reduction (step S30).

On the other hand, if it is determined that the power ratio (B/A) is equal to or small than the specific value P (NO step S26), it is determined that the sound pick-up signal 113 does not possess a certain power level due to the effects of an object that covers the pickup of the sub-microphone B, and hence the sound pick-up signal 112 (sub-microphone A) is selected as a noise-dominated signal for use in noise reduction (step S31).

The signal power is attenuated by an amount proportional to the square of the distance from a sound source. Therefore, if there is a phase difference, a signal of delayed phase (far from a sound source) possesses a smaller (more attenuated) power than a signal of advanced phase. The specific value P to be used for comparison with the power ratio (B/A) in step S26 is a threshold value obtained by adding the amount of attenuation caused by unignorable effects of an object that covers the pickup of a microphone to the amount of attenuation caused by a phase difference discussed above.

On the other hand, if it is determined that the phase difference between the sound pick-up signals 112 and 113 is smaller than the threshold value T (NO in step S25), it is indicated that the phase of the sound pick-up signal 113 is more advanced than the phase of the sound pick-up signal 112. A sound pick-up signal having a delayed phase is considered to be appropriate as a noise-dominated signal for use in noise reduction. Thus, the sound pick-up signal 112 (sub-microphone A) is considered to be appropriate as a noise-dominated signal for use in noise reduction.

Then, it is determined by the noise-dominated signal selection unit 134 whether the power ratio (A/B) of the sound pick-up signal 112 to the sound pick-up signal 113 is larger than the specific value P (step S27). If it is determined that the power ratio (A/B) is larger than the specific value P (YES step S27), it is determined that the sound pick-up signal 112 possesses a certain power level (with smaller effects of an object that covers the pickup of the sub-microphone A), and hence the sound pick-up signal 112 (sub-microphone A) is selected as a noise-dominated signal for use in noise reduction (step S32).

On the other hand, if it is determined that the power ratio (A/B) is equal to or small than the specific value P (NO step S27), it is determined that the sound pick-up signal 112 does not possess a certain power level due to the effects of an object that covers the pickup of the sub-microphone A, and hence the sound pick-up signal 113 (sub-microphone B) is selected as a noise-dominated signal for use in noise reduction (step S33).

Then, the noise-dominated signal selection unit 134 determines the selected sub-microphone as usable for the noise reduction process (step S34). It is then determined whether all of the steps from step S21 to S34 are complete for all sub-microphones if there are three or more sub-microphones (step S35). If it is complete (YES in step S35), the noise-dominated signal selection unit 134 decides the sub-microphone determined as usable in step S34 as the sub-microphone for use in the noise reduction process (step S35). On the other hand, if not complete (No in step S35), the process returns to step S21 to repeat this step and the following steps from S22 to S34, with the sub-microphone determined as usable in step S34 as a reference microphone and a new sub-microphone as a comparison-use microphone in step S21.

With the process described with reference to FIG. 13, a sub-microphone to be used as a sub-microphone for use in the noise reduction process is selected and decided between the sub-microphones A and B (102 and 103, respectively, in FIG. 11), and the sound pick-up signal (112 or 113) obtained based on a sound picked up by the selected sub-microphone is nominated as a noise-dominated signal for use in noise reduction.

In the process described above with respect to FIG. 13, a sound pick-up signal suitable as a noise-dominated signal for use in noise reduction is selected by the noise-dominated signal selection unit 134 based on the phase difference information and the power ratio output from the phase-difference information acquisition unit 133 and the power-information acquisition unit 132, respectively. However, a sound pick-up signal suitable as a noise-dominated signal for use in noise reduction may be selected based on the phase difference information only.

In the case of the phase difference information only, in FIG. 13, the phase difference information is only acquired in step S22, with omission of steps S24, S26 and S27. In detail, after the acquisition of the phase difference information in step S22, if it is determined that there is no phase difference between the sound pick-up signals 112 and 113 (YES in step S23), either the sound pick-up signal 112 or 113 is selected as a noise-dominated signal for use in noise reduction. On the other hand, if it is determined that there is a phase difference between the sound pick-up signals 112 and 113 (NO in step S23). Then, if it is determined that the phase difference is equal to or larger than the threshold value T (YES in step S25) which indicates that the phase of the sound pick-up signal 112 is more advanced than the phase of the sound pick-up signal 113, the sound pick-up signal 113 is selected as a noise-dominated signal for use in noise reduction. On the other hand, if it is determined that the phase difference is smaller than the threshold value T (NO in step S25) which indicates that the phase of the sound pick-up signal 113 is more advanced than the phase of the sound pick-up signal 112, the sound pick-up signal 112 is selected as a noise-dominated signal for use in noise reduction.

Suppose that the main microphone 101 and a user's mouth that is a sound source have a preferable positional relationship (for example, when the main microphone 101 is attached to a headset or a helmet). In this case, the sound pick-up signal 111 obtained based on a sound picked up by the main microphone 101 and the sound pick-up signal 112 or 113 obtained based on a sound picked up by selected the sub-microphone 102 or 103 can be used as a voice signal to be subjected to noise reduction and a noise-dominated signal for use in the noise reduction, respectively.

However, in the case of a transceiver, a speaker microphone, etc., it may happen that a sound source and a main microphone for picking up a sound generated by the sound source have no constant positional relationship. It is assumed in this case that a noise reduction apparatus is not used in a good condition, for example, when a user does not speak into a main microphone but speaks into a sub-microphone.

For the reason discussed above, in the second embodiment, it is verified whether the sound pick-up signal 111 obtained based on a sound picked up by the main microphone 101 and the sound pick-up signal 112 or 113 obtained based on a sound picked up by the selected the sub-microphone 102 or 103 can be used as a voice signal to be subjected to noise reduction and a noise-dominated signal for use in the noise reduction, respectively. The verification process allows the section of a voice signal and a noise-dominated signal for the noise reduction process from among the sound pick-up signals 111, 112 and 113 aiming for the optimal noise reduction effect.

The verification process performed by the signal decider 116 (FIG. 12) will be explained with reference to a flowchart shown in FIG. 14.

Figure 14:
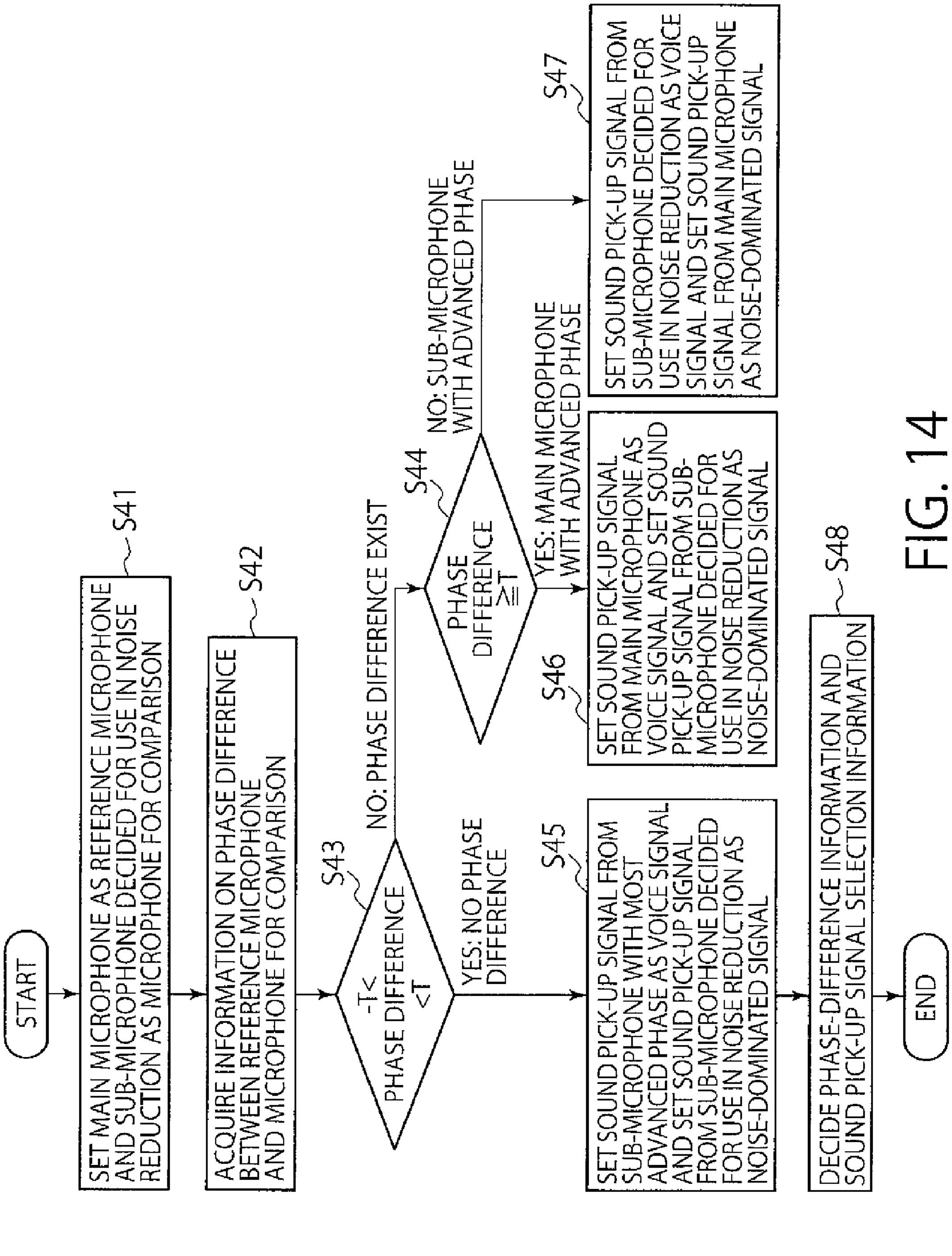
FIG. 14 is another flowchart showing an operation of the signal decider installed in the noise reduction apparatus according to the second embodiment of the present invention.

In FIG. 14, the main microphone 101 is set as a reference microphone and the sub-microphone 102 or 103 decided in step S36 of FIG. 13 for use in noise reduction is set as a microphone for comparison (step S41). Next, the phase-difference information is acquired at the cross-correlation value calculation unit 135 and the phase-difference calculation unit 136 on the difference in phase between a voice component carried by the sound pick-up signal 111 obtained based on a sound picked up by the main microphone 101 and a voice component carried by the sound pick-up signal 138 (FIG. 12) obtained based on a sound picked up by the sub-microphone 102 or 103 selected in step S36 of FIG. 13 (step S42).

Next, it is determined by the determination unit 137 whether there is a phase difference between the sound pick-up signals 111 and 138 (step S43). In detail, it is determined whether a phase difference between the sound pick-up signals 111 and 138 falls within the specific range $(-T<\text{phase difference}<T)$.

If the phase difference between the sound pick-up signals 111 and 138 falls within the specific range $(-T<\text{phase difference}<T)$, it is determined that there is no phase difference between the sound pick-up signals 111 and 138 (YES in step S43). In this case, it is assumed that the sound pick-up signal 111 has a similar phase delay as the sound pick-up signal 138 that is originally the sound pick-up signal 112 or 113 having a phase delayed most among the sound pick-up signals 111, 112 and 113 because of being selected by the noise-dominant signal selection unit 134 (FIG. 12). Based on the assumption, the sound pick-up signal 112 or 113 not selected as the sound pick-up signal 138 (FIG. 12) and having a phase advanced most among the signals 111, 112 and 113 is set as a voice signal to be subjected to noise reduction and the sound pick-up signal 138 having a phase delayed most among the signals 111, 112 and 113 is set as a noise-dominant signal for use in the noise reduction (step S45).

In detail, the sound pick-up signal 138 selected by the noise-dominant signal selection unit 134 has a phase delayed most among the sound pick-up signals 111, 112 and 113. Therefore, if the phase difference between the sound pick-up signals 111 and 138 falls within the specific range $(-T<\text{phase difference}<T)$, it is assumed that the sound pick-up signal 111 has a similar phase delay as the sound pick-up signal 138. It is further assumed that the main microphone 101 does not pick up a voice sound appropriately. For this reason, in step S45, the sound pick-up signal 112 or 113 not selected as the sound pick-up signal 138 and having a phase advanced most among the signals 111, 112 and 113 is set as a voice signal to be subjected to noise reduction and the sound pick-up signal 138 having a phase delayed most among the signals 111, 112 and 113 is set as a noise-dominant signal for use in the noise reduction.

If there are three or more sub-microphones, a sound pick-up signal picked up a sub-microphone by which the sound pick-up signal exhibits the most advanced phase can be selected by a process similar to the process in FIG. 13 of detecting a sound pick-up signal having the most delayed phase. In detail, the process of selecting a sound pick-up signal having a more advanced phase can be repeated instead of the process of selecting a sound pick-up signal having a more delayed phase in FIG. 13.

Again in FIG. 14, if the phase difference between the sound pick-up signals 111 and 138 does not fall within the specific range $(-T<\text{phase difference}<T)$, it is determined that there is a phase difference between the sound pick-up signal 111 obtained based on a sound picked up by the reference microphone (main microphone 101) and the sound pick-up signal 138 obtained based on a sound picked up by the microphone (sub-microphone 102 or 103) for comparison (NO in step S43).

In this case, it is determined by the determination unit 137 which phase of the sound pick-up signals 111 and 138 is more advanced (in step S44). In detail, it is determined whether the phase difference between the sound pick-up signals 111 and 138 is equal to or larger than the threshold value T (phase $\text{difference}\geq T$).

If it is determined that the phase difference between the sound pick-up signals 111 and 138 is equal to or larger than the threshold value T (YES in step S44), it is indicated that the phase of the sound pick-up signal 111 is more advanced than the phase of the sound pick-up signal 138. In this case, the sound pick-up signal 111 obtained based on a sound picked up by the main microphone 101 is set as a voice signal to be subjected to noise reduction and the sound pick-up signal 138 that is the sound pick-up signal 112 or 113 obtained based on a sound picked up by the sub-microphone 102 or 103 is set as a noise-dominated signal for use in the noise reduction (step S46).

On the other hand, if it is determined that the phase difference between the sound pick-up signals 111 and 138 is smaller than the threshold value T (NO in step S44), it is indicated that the phase of the selected sound pick-up signal 138 is more advanced than the phase of the sound pick-up signal 111. In this case, the sound pick-up signal 138 that is the sound pick-up signal 112 or 113 obtained based on a sound picked up by the sub-microphone 102 or 103 is set as a voice signal to be subjected to noise reduction and the sound pick-up signal 111 obtained based on a sound picked up by the main microphone 101 is set as a noise-dominated signal for use in the noise reduction (step S47).

Based on the steps described above, the determination unit 137 decides sound pick-up signal selection information 125 on the sound pick-up signals for use in the noise reduction process at the adaptive filter controller 117 and also decides the phase-difference information 126 between these sound pick-up signals (step S48), the information 125 and 126 being supplied to the adaptive filter controller 117.

Concerning the phase-difference information 126, there are two cases. The first case is that the sound pick-up signal 111 obtained based on a sound picked up by the main microphone 101 and the sound pick-up signal 138 that is the sound pick-up signal 112 or 113 obtained based on a sound picked up by the sub-microphone 102 or 103 are set as the signals for the noise reduction process (step S46 or S47). The second case is that the sound pick-up signals 112 and 113 obtained based on sounds picked up by the sub-microphones 102 and 103, respectably, are set as the signals for the noise reduction process (step S45).

In FIG. 12, in the first case, the determination unit 137 outputs a phase difference output from the phase-difference calculation unit 136 to the adaptive filter controller 117 as the phase difference information 126 which is supplied to the adaptive filter controller 117. On the other hand, in the second case, the determination unit 137 outputs a phase difference output from the phase-difference information acquisition unit 133 to the adaptive filter controller 117 as the phase difference information 126 which is supplied to the adaptive filter controller 117.

The process of FIG. 14 is summarized as explained below.

When there are one main microphone and a plurality of sub-microphones, there is a case where a phase of a specific sound pick-up signal obtained based on a sound picked up by a specific sub-microphone among the plurality of sub-microphones (the phase of the specific sound pick-up signal being most advanced among phases of sound pick-up signals obtained based on sounds picked up by the plurality of sub-microphones) is more advanced than a phase of a sound pick-up signal obtained based on a sound picked up by the main microphone. In this case, it is preferable for the signal decider 116 to decide the specific sound pick-up signal as a first sound pick-up signal to be subjected to reduction of a noise component.

Also when there are one main microphone and a plurality of sub-microphones, there is a case where a phase of a specific sound pick-up signal obtained based on a sound picked up by a specific sub-microphone among the plurality of sub-microphones (the phase of the specific sound pick-up signal being most delayed among phases of sound pick-up signals obtained based on sounds picked up by the plurality of sub-microphones) is more delayed than a phase of a sound pick-up signal obtained based on a sound picked up by the main microphone. In this case, it is preferable for the signal decider 116 to decide the specific sound pick-up signal as a second sound pick-up signal to be used for reducing a noise component carried by a first sound pick-up signal decided to be subjected to noise reduction.

In the process of FIG. 14, although the sound pick-up signals for use in the noise reduction process are decided based on the phase difference information only, the power information may also be considered.

In detail, in the process of FIG. 14, the signal decider 116 decides a sound pick-up signal having the most advanced phase among a plurality of sound pick-up signals as a first sound pick-up signal to be subjected to noise reduction and a sound pick-up signal having the most delayed phase among the plurality of sound pick-up signals as a second sound pick-up signal to be used for reducing a noise component carried by the first sound pick-up signal.

However, the signal decider 116 may decide a sound pick-up signal having the most delayed phase among a plurality of sound pick-up signals and having a power that is larger than a predetermined value (for example, the value P described above) as the second sound pick-up signal to be used for reducing a noise component carried by the first sound pick-up signal.

Moreover, there is a case where a sound pick-up signal having the most delayed phase among a plurality of sound pick-up signals has a power equal to or smaller than the predetermined value. In this case, it is preferable for the signal decider 116 to decide a specific sound pick-up signal as the second sound pick-up signal to be used for reducing a noise component carried by the first sound pick-up signal, a phase of the specific sound pick-up signal being delayed next to the most delayed phase among the plurality of sound pick-up signal.

Moreover, there is a case where each phase difference between sound pick-up signals among a plurality of sound pick-up signals is within predetermined range (for example, $-T<\text{phase difference}<T$ described above) except for the first sound pick-up signal. In this case, it is preferable for the signal decider 116 to decide a specific sound pick-up signal as the second sound pick-up signal to be used for reducing a noise component carried by the first sound pick-up signal, a power of the specific sound pick-up signal being the largest among the plurality of sound pick-up signals except for the first sound pick-up signal.

Returning to FIG. 11, the adaptive filter controller 117 generates a control signal 127 for control of the adaptive filter 118 based on the speech segment information 124 output from the speech segment determiner 115 and the sound pick-up signal selection information 125 on the sound pick-up signals decided for use in the noise reduction process and the phase difference information 126 on the decided sound pick-up signals output from the signal decider 116. The generated control signal 127 carries the speech segment information 124, the sound pick-up signal selection information 125 and the phase difference information 126, which is then output to the adaptive filter 118.

The adaptive filter 118 generates a low-noise signal when the two sound pick-up signals selected for the noise reduction process from among the sound pick-up signals 111, 112, and 113 are supplied from the A/D converters 104, 105 and 106, respectively, and outputs the low-noise signal as an output signal 128. The two sound pick-up signals selected for the noise reduction process are the signals decided by the signal decider 116. In order to reduce a noise component carried by a voice signal (that is the sound pick-up signal 111, 112 or 113 selected as the voice signal), the adaptive filter 118 generates a pseudo-noise component that is highly likely carried by the voice signal if it is a real noise component and subtracts the pseudo-noise component from the voice signal. The pseudo-noise component is generated by using the noise-dominated signal for use in noise reduction (that is the sound pick-up signal 111, 112 or 113 selected as the noise-dominated signal for noise reduction).

In this noise reduction control, the speech segment information 124 supplied to the adaptive filter controller 117 is used as information for deciding the timing of updating the filter coefficients of the adaptive filter 118. In this embodiment, the noise reduction process may be performed in the following two ways. When not a speech segment but a noise segment is detected by the speech segment determiner 115, the filter coefficients of the adaptive filter 18 are updated for active noise reduction. On the other hand, when a speech segment is detected by the speech segment determiner 115, the noise reduction process is performed with no updating of the filter coefficients of the adaptive filter 118.

Figure 15:
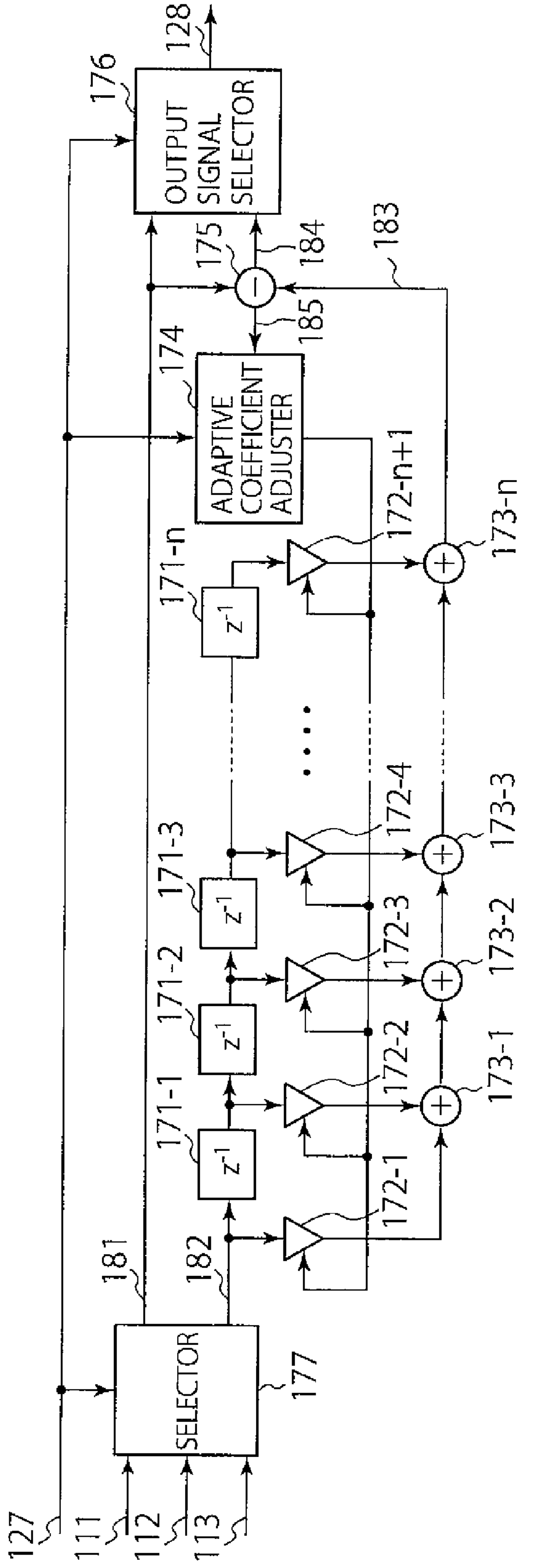
FIG. 15 is a block diagram showing an exemplary configuration of an adaptive filter installed in the noise reduction apparatus according to the second embodiment of the present invention.

FIG. 15 is a block diagram showing an exemplary configuration of the adaptive filter 118 installed in the noise reduction apparatus 3 according to the second embodiment.

The adaptive filter 118 shown in FIG. 15 is provided with delay elements 171-1 to 171-$n$, multipliers 172-1 to 172-$n$+1, adders 173-1 to 173-$n$, an adaptive coefficient adjuster 174, a subtracter 175, an output signal selector 176, and a selector 177.

With reference to FIG. 15, the selector 177 outputs two sound pick-up signals among the sound pick-up signals 111, 112 and 113 input from the A/D converters 104, 105 and 106 (FIG. 11), respectively, as a voice signal 181 to be subjected to noise reduction and a noise-dominated signal 182 for use in the noise reduction, in accordance with the control signal 27 output from the adaptive filter controller 117. In detail, the selector 177 outputs two sound pick-up signals among the sound pick-up signals 111, 112 and 113 as the voice signal 181 to be subjected to noise reduction and the noise-dominated signal 182 for use in the noise reduction, in accordance with the sound pick-up signal selection information 125 output from the signal decider 116.

The delay elements 171-1 to 171-$n$, the multipliers 172-1 to 172-$n$+1, and the adders 173-1 to 173-$n$ constitute an FIR filter that processes the noise-dominated signal 182 to generate a pseudo-noise signal 183.

The adaptive coefficient adjuster 174 adjusts the coefficients of the multipliers 172-1 to 172-$n$+1 in accordance with the control signal 127 (for example, the phase-difference information 126 and the speech segment information 124) depending on what is indicated by the phase-difference information 126 or the speech segment information 124.

In detail, the adaptive coefficient adjuster 174 adjusts the coefficients of the multipliers 172-1 to 172-$n$+1 to have a smaller adaptive error when the speech segment information 124 indicates a noise segment (a non-speech segment). On the other hand, the adaptive coefficient adjuster 174 makes no adjustments or a fine adjustment only to the coefficients of the multipliers 172-1 to 172-$n$+1 when the speech segment information 124 indicates a speech segment. Moreover, the adaptive coefficient adjuster 174 makes no adjustments or a fine adjustment only to the coefficients of the multipliers 172-1 to 172-$n$+1 when the phase-difference information 126 indicates that a phase difference between two signals of the sound pick-up signals 111 to 113 (the two signals corresponding to the voice signal 181 and the noise-dominated signal 182) falls within the specific range ($-T<$phase difference$<T$), namely, there is almost no phase difference between the voice signal and noise-dominated signal. When there is almost no phase difference between the two signals discussed above, cancellation of a voice component is limited by diminishing a noise reduction effect with no adjustments or a fine adjustment only in the noise reduction process. Moreover, when the speech segment information 124 indicates a noise segment (a non-speech segment) and when the phase difference information 126 indicates that there is almost no phase difference between the two signals discussed above, the adaptive coefficient adjuster 174 makes no adjustments or a fine adjustment only to the coefficients of the multipliers 172-1 to 172-$n$+1. In this case, also cancellation of a voice component is limited by diminishing a noise reduction effect with no adjustments or a fine adjustment only in the noise reduction process.

The subtracter 175 subtracts the pseudo-noise signal 183 from the voice signal 181 to generate a low-noise signal 184 that is then output to the output signal selector 176. The low-noise signal 184 is also output to the adaptive coefficient adjuster 174, as a feedback signal 185.

The output signal selector 176 selects either the voice signal 181 or the low-noise signal 184, as the output signal 128, in accordance with the control signal 127 (for example, the phase difference information 126) output from the adaptive filter controller 117. In detail, when there is almost no phase difference between two signals of the sound pick-up signals 111 to 113 (the two signals corresponding to the voice signal 181 and the noise-dominated signal 182), the output signal selector 176 outputs the voice signal 181 as the output signal 128, with no noise reduction. On the other hand, when the phase difference between the two signals discussed above is equal to or larger than a specific threshold value, the output signal selector 176 outputs the low-noise signal 184 as the output signal 128.

Figure 16:
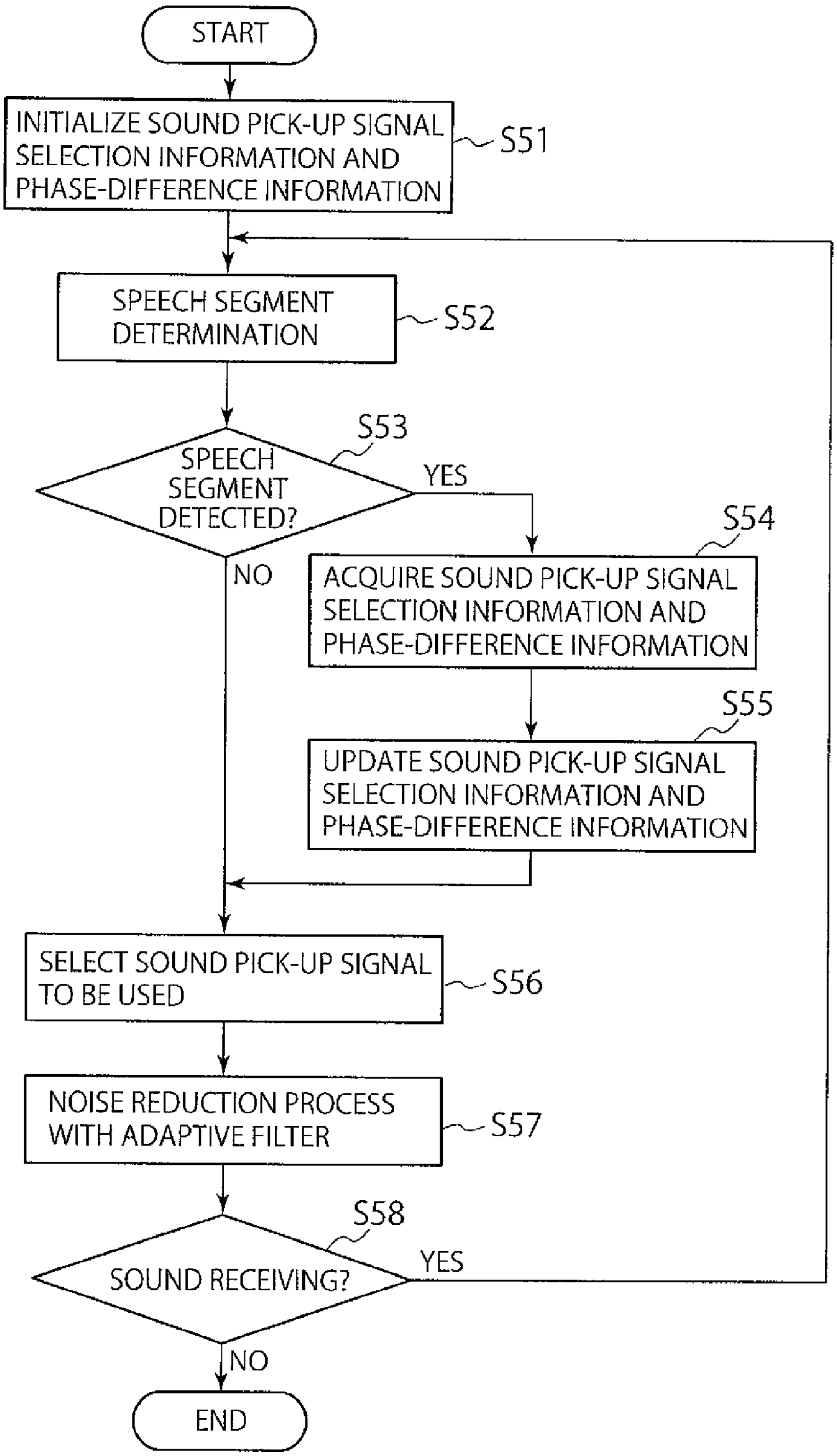
FIG. 16 is a flowchart showing an operation of the noise reduction apparatus according to the second embodiment of the present invention.

Next, the operation of the noise reduction apparatus 3 (FIG. 11) will be explained with reference to FIG. 16 that is a flowchart showing the operation.

One requirement in this operation is that the sound pick-up signal selection information 125 and the phase difference information 126 generated by the signal decider 116 are updated when it is certain that a sound picked up by the main microphone 101 is a speech segment, or the speech segment determiner 115 detects a speech segment.

Under the requirement discussed above, the sound pick-up signal selection information 125 and the phase difference information 126 are initialized to a predetermined initial value (step S51). The initial value is a parameter to be set to equipment having the noise reduction apparatus 3 installed therein, when the equipment is used in an appropriate mode (with the microphones 101, 102 and 103 at an appropriate position when used), for example.

Then, it is determined by the speech segment determiner 115 whether a sound picked up by the main microphone 101 is a speech segment (step S52). High accuracy of speech segment determination is achieved with stricter requirement, such as, higher or larger threshold levels or values in the speech segment determination technique I or II described above.

When a speech segment is detected by the speech segment determiner 115 (YES in step S53), the speech segment information 123 and 124 are supplied to the signal decider 116 and the adaptive filter controller 117, respectively. Then, the sound pick-up signal selection information 125 and the phase difference information 126 are acquired by the signal decider 116 (step S54). The sound pick-up signal selection information 125 and the phase difference information 126 can be acquired as explained with reference to FIGS. 13 and 14. Then, the sound pick-up signal selection information 125 and the phase difference information 126 to be included in the control signal 127 are updated by the adaptive filter controller 117 to newly acquired information (step S55).

On the other hand, when no speech segment is detected by the speech segment determiner 115 (NO in step S53), the sound pick-up signal selection information 125 and the phase difference information 126 are not updated.

Following to step S53 or S55, a voice signal and a noise-dominated signal are selected from among the sound pick-up signals 111 to 113 at the selector 117 of the adaptive filter 118 based on the sound pick-up signal selection information 125 (S56). Then, the noise reduction process is performed by the adaptive filter 18 using the voice signal and the noise-dominated signal that are two signals selected from among the sound pick-up signals 111 to 113 (step S57).

Following to step S57, it is checked whether a sound (a voice or noise sound) is being picked up by any of the main microphone 101, the sub-microphone 102 and the sub-microphone 103 (step S58). When a sound is being picked up (YES in step S58), the process returns to step S52 to repeat this and the following steps. On the other hand, when any sound is not being picked up (NO in step S58), the operation of the noise reduction apparatus 3 (with the noise reduction process) is finished.

As described above, in the second embodiment, the speech segment determiners 115 of the noise reduction apparatus 3 can detect a speech segment even if there is a high level of noise, as described above. Then, when a speech segment is detected only, the signal decider 116 decides two signals to be used in the noise reduction process from among the sound pick-up signals 111 to 113 and updates the phase difference information on the two sound pick-up signals. Thus, the signal decider 116 can reduce the amount of information for processing. Moreover, the signal decider 116 updates the phase difference information and also the sound pick-up signal selection information only when a speech segment is detected. Thus, highly reliable phase difference information and sound pick-up signal selection information can be acquired. Furthermore, in the second embodiment, two sound pick-up signals most appropriate for the noise reduction process are selected from among a plurality of sound pick-up signals. Thus, accurate noise reduction can be performed in a variety of environments.

As described above in detail, the second embodiment of the present invention offers a noise reduction apparatus, an audio input apparatus, a wireless communication apparatus, and a noise reduction method that can reduce a noise component carried by a voice signal in a variety of environments.

Embodiment 3

Figure 17:
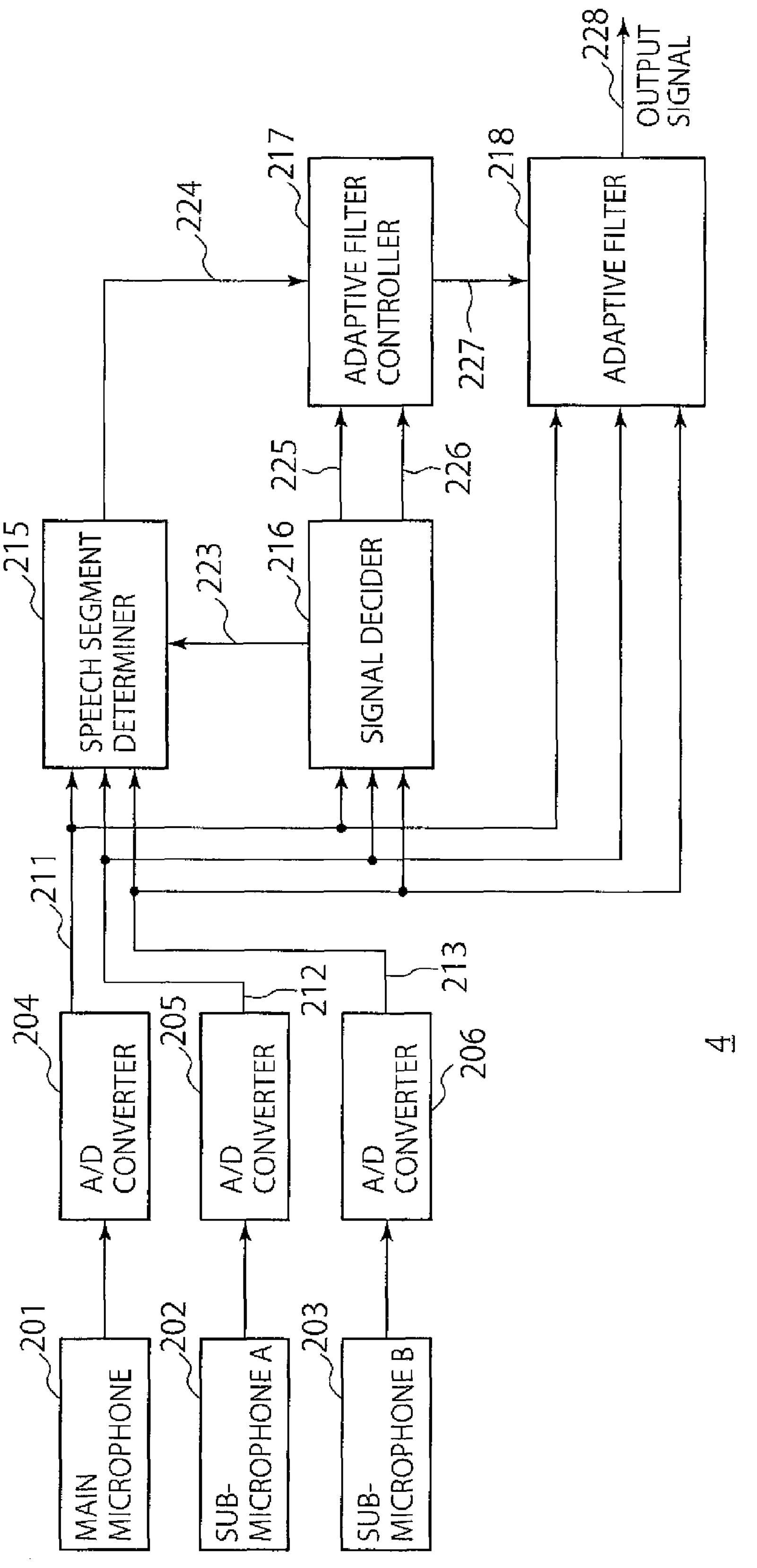
FIG. 17 is a block diagram schematically showing the configuration of a noise reduction apparatus according to a third embodiment of the present invention.

FIG. 17 is a block diagram schematically showing the configuration of a noise reduction apparatus 4 according to a third embodiment of the present invention.

The noise reduction apparatus 4 shown in FIG. 17 is provided with a main microphone 201, sub-microphones 202 and 203, A/D converters 204, 205 and 206, a speech segment determiner 215, a signal decider 216, an adaptive filter controller 217, and an adaptive filter 218.

The noise reduction apparatus 4 according to the third embodiment is different from the noise reduction apparatus 2 (FIG. 11) according to the second embodiment in the following two points. The first is that, in addition to a sound pick-up signal 211 obtained based on a sound picked up by the main microphone 201, sound pick-up signals 212 and 213 obtained based on sounds picked up by the sub-microphones 202 and 203 are supplied to the speech segment determiner 215. The second is that sound pick-up signal selection information 223 is supplied to the speech segment determiner 215.

The main microphone 201, the sub-microphones 202 and 203, and the A/D converters 204, 205 and 206 shown in FIG. 17 are identical to the main microphone 101, the sub-microphones 102 and 103, and the A/D converters 104, 105 and 106, respectively, shown in FIG. 11, hence the explanation thereof being omitted for brevity.

In FIG. 17, the sound pick-up signals 211, 212 and 123 output from the A/D converters 204, 205 and 206, respectively, are supplied to the speech segment determiner 215, the signal decider 216 and the adaptive filter 218.

The signal decider 216 decides one of the sound pick-up signals 211, 212 and 123 as a sound pick-up signal to be used for speech segment determination at the speech segment determiner 215. Then, the signal decider 216 outputs information on a sound pick-up signal to be used for speech segment determination as sound pick-up signal selection information 223 to the speech segment determiner 215. It is presumed that, while a voice sound is being input to the noise reduction apparatus 4, the phase of a sound pick-up signal carrying the voice component is most advanced among a plurality of sound pick-up signals. Under the presumption, the signal decider 216 decides one of the sound pick-up signals 211, 212 and 123 having the most advanced phase as a sound pick-up signal to be used for speech segment determination.

The signal decider 216 shown in FIG. 17 is identical to the signal decider 116 shown in FIG. 12, except for outputting the sound pick-up signal selection information 223 to the speech segment determiner 215.

The operation of the signal decider 216 is identical to the signal decider 116 explained with respect to the flowcharts of FIGS. 13 and 14, except for that a sound pick-up signal decided as a voice signal in step S45, S46 or S47 of FIG. 14 is used in speech segment determination. Moreover, through step S45, S46 or S47, the signal decider 216 decides two sound pick-up signals from among the sound pick-up signals 211, 212 and 213 as signals to be used in the noise reduction process. Then, the signal decider 216 acquires sound pick-up signal selection information 225 on the decided two sound pick-up signals for use in noise reduction and phase difference information 226 on the phase difference between the two sound pick-up signals. The signal selection information 225 and the phase difference information 226 are supplied to the adaptive filter controller 217.

The speech segment determiner 215 determines whether or not a sound picked up by the main microphone 201 or the sub-microphone 202, or the sub-microphone 203 is a speech segment (voice component) based on the sound pick-up signal 211 or 212, or 213 that is indicated by the sound pick-up signal selection information 223 output from the signal decider 216. When it is determined that a sound picked up one of the main microphone 201, the sub-microphone 202 and the sub-microphone 203 is a speech segment, the speech segment determiner 215 outputs speech segment information 224 to the adaptive filter controller 217.

The speech segment determiner 215 can use any appropriate technique, such as, the speech segment determination technique I or II, especially when the noise reduction apparatus 4 is used in an environment of high noise level, like the first embodiment described above.

The adaptive filter controller 217 decides sound pick-up signal selection information 225 and phase difference information 226 to be used for control of the adaptive filter 218 in accordance with the speech segment information 224 output from the speech segment determiner 215.

To the adaptive filter controller 217, sound pick-up signal selection information 225 and phase difference information 226 are supplied at specific intervals, including information 225 and 226 acquired while a speech segment is being detected and other information 225 and 226 acquired while a non-speech segment is being detected. The sound pick-up signal selection information 225 and phase difference information 226 acquired while a speech segment is being detected are highly accurate information. On the other hand, the sound pick-up signal selection information 225 and phase difference information 226 acquired while a non-speech segment is being detected are not so accurate information.

Therefore, the adaptive filter controller 217 decides the highly accurate sound pick-up signal selection information 225 and phase difference information 226 in accordance with the speech segment information 224 output from the speech segment determiner 215 as the information 225 and 226 to be used for control of the adaptive filter 218 for accurate noise reduction.

In this operation, the speech segment information 224 is output to the adaptive filter controller 217 after the speech segment determination performed by the speech segment determiner 215 when given the sound pick-up signal selection information 223 from the signal decider 216. Therefore, the timing at which the sound pick-up signal selection information 225 and the phase difference information 226 are supplied to the adaptive filter controller 217 is earlier than the timing at which the speech segment information 224 is output to the adaptive filter controller 217.

In order to adjust the timing difference, the adaptive filter controller 217 may be equipped with a buffer that temporarily holds the sound pick-up signal selection information 225 and the phase difference information 226 so that these information 225 and 226 are output to the adaptive filter controller 217 at the same timing as the speech segment information 224.

The adaptive filter controller 217 generates a control signal 227 for control of the adaptive filter 228 based on the speech segment information 224 output from the speech segment determiner 215, the sound pick-up signal selection information 225 on two sound pick-up signals to be used for noise reduction and the phase difference information 226 on the two sound pick-up signals. The generated control signal 227 carries the speech segment information 224, the sound pick-up signal selection information 225 and the phase difference information 226, which is then output to the adaptive filter 218.

The adaptive filter 218 generates a low-noise signal using two sound pick-up signals selected from among the sound pick-up signals 211, 212 and 213 supplied from the A/D converters 204, 205 and 206, respectively, and outputs a low-noise signal as an output signal 228. The two sound pick-up signals selected from among the sound pick-up signals 211, 212 and 213 are those decided by the signal decider 216 for use in noise reduction.

In detail, in order to reduce a noise component carried by a voice signal, using a noise-dominated signal, the adaptive filter 218 generates a pseudo-noise component that is highly likely carried by the voice signal if it is a real noise component, and subtracts the pseudo-noise component from the voice signal for noise reduction.

The adaptive filter controller 217 and the adaptive filter 218 shown in FIG. 17 are identical to the adaptive filter controller 117 and the adaptive filter 118, respectively, shown in FIG. 11, hence the explanation thereof being omitted for brevity.

Figure 18:
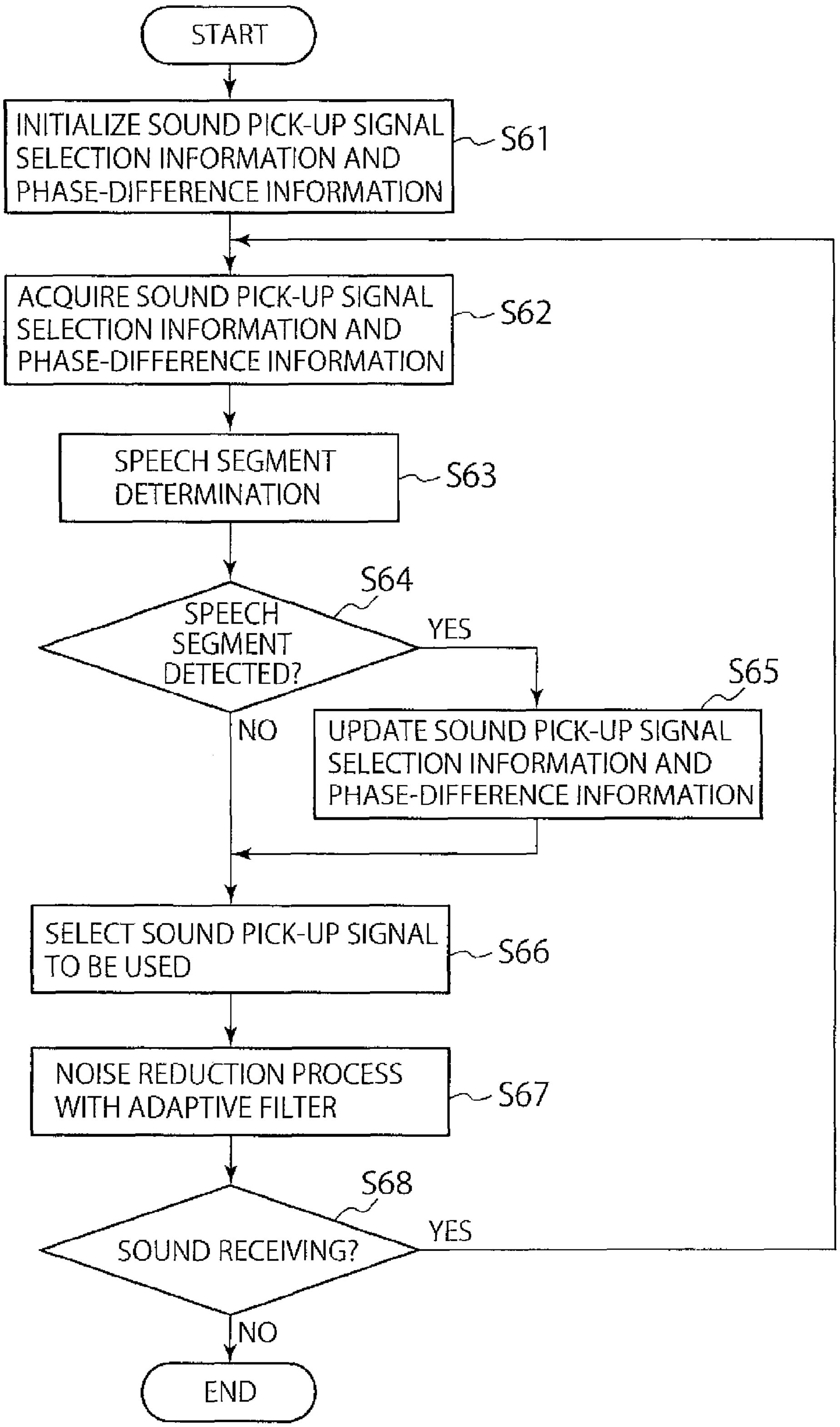
FIG. 18 is a flowchart showing an operation of the noise reduction apparatus according to the third embodiment of the present invention.

Next, the operation of the noise reduction apparatus 4 will be explained with reference to FIG. 18 that is a flowchart showing the operation.

One requirement in this operation is that the sound pick-up signal selection information 225 and the phase difference information 226 generated by the signal decider 216 are updated when it is certain that a sound picked up by one of the microphone 201, 202 and 203 is a speech segment, or the speech segment determiner 215 detects a speech segment.

Under the requirement discussed above, the sound pick-up signal selection information 225 and the phase difference information 226 are initialized to a predetermined initial value (step S61). The initial value is a parameter to be set to equipment having the noise reduction apparatus 4 installed therein, when the equipment is used in an appropriate mode (with the microphones 201, 202 and 203 at an appropriate position when used), for example.

Next, the sound pick-up signal selection information 223 and 225, and the phase difference information 226 are acquired by the signal decider 216 using the sound pick-up signals 211 to 213 (step S62). In this step, the sound pick-up signal selection information 223 on a sound pick-up signal to be used for speech segment determination is supplied to the speech segment determiner 215. Also in this step, the sound pick-up signal selection information 225 on two sound pick-up signals to be used for noise reduction and the phase difference information 226 on the two sound pick-up signals are supplied to the adaptive filter controller 217.

Then, speech segment determination is performed by the speech segment determiner 215 using a sound pick-up signal indicated by the sound pick-up signal selection information 223 (step S63). If a speech segment is detected (YES in step S64), the speech segment 224 is supplied to the adaptive filter controller 217. Then, the sound pick-up signal selection information 225 and the phase difference information 226 are updated by the adaptive filter controller 217 to the information 225 and 226 acquired at the timing at which a speech segment is detected (step S65). On the other hand, if a speech segment is not detected (NO in step S64), no update is made to the sound pick-up signal selection information 225 and the phase difference information 226.

Following to step S64 or S65, a voice signal to be subjected to noise reduction and a noise-dominated signal for use in the noise reduction are selected from among the sound pick-up signals 111 to 113 at the selector 177 of the adaptive filter 218 based on the sound pick-up signal selection information 225 (S66). Then, the noise reduction process is performed by the adaptive filter 218 using the voice signal and the noise-dominated signal that are two signals selected from among the sound pick-up signals 111 to 113 (step S67).

Following to step S67, it is checked whether a sound (a voice or noise sound) is being picked up by any of the main microphone 201, the sub-microphone 202 and the sub-microphone 203 (step S68). When a sound is being picked up (YES in step S68), the process returns to step S62 to repeat this and the following steps. On the other hand, when any sound is not being picked up (NO in step S68), the operation of the noise reduction apparatus 4 (with the noise reduction process) is finished.

The difference between the second embodiment and the third embodiment will be discussed hereinbelow.

In the noise reduction apparatus 3 according to the second embodiment shown in FIG. 11, the sound pick-up signal 111 obtained based on a sound picked up by the main microphone 101 is used for speech segment determination at the speech segment determiner 115. The second embodiment is preferable in the case where the sound pick-up signal 111 mainly carries a voice component. This is based on a precondition that a user speaks into the main microphone 101 with an appropriate distance in a stable condition.

The second embodiment is advantageous in that: it is enough for the speech segment determiner 115 to perform speech segment determination only for the sound pick-up signal 111 obtained based on a sound picked up by the main microphone 101; and it is enough for the signal decider 116 to acquire the sound pick-up signal selection information 125 and the phase difference information 126 only when a speech segment id detected, thus reducing signal processing load.

As discussed above, it is a precondition of the second embodiment that a user speaks into the main microphone 101 with an appropriate distance in a stable condition. However, for equipment having a noise reduction apparatus, it may happen that a user does not speak into the main microphone 101 with an appropriate distance in a stable condition. In this case, it could happen that a sub-microphone picks up more voice sounds than a main microphone.

Different from the second embodiment, the noise reduction apparatus 4 according to the third embodiment shown in FIG.

17 has the following features. In detail, the signal decider 216 decides a sound pick-up signal to be used for speech segment determination at the speech segment determiner 215 from among the sound pick-up signals 211 to 213. Then, the speech segment determiner 215 performs speech segment determination using a sound pick-up signal decided by the signal decider 216. Another feature is that the adaptive filter controller 217 controls the adaptive filter 218 using the sound pick-up signal selection information 225 and phase difference information 226 acquired at the timing at which the speech segment determiner 215 detects a speech segment.

Therefore, the third embodiment is advantageous in that: using one of a plurality of sound pick-up signals, the speech segment determination can be performed accurately even if a noise level is high; and using two of a plurality of sound pick-up signals, accurate noise reduction can be performed even if equipment having the noise reduction apparatus 4 is used in an environment of high noise level.

As described above in detail, the third embodiment of the present invention offers a noise reduction apparatus, an audio input apparatus, a wireless communication apparatus, and a noise reduction method that can reduce a noise component carried by a voice signal in a variety of environments.

Embodiment 4

Explained next is an application of a noise reduction apparatus (according to the embodiment 2 or 3, for example) equipped with at least three microphones to an audio input apparatus according to the present invention.

Figure 19:
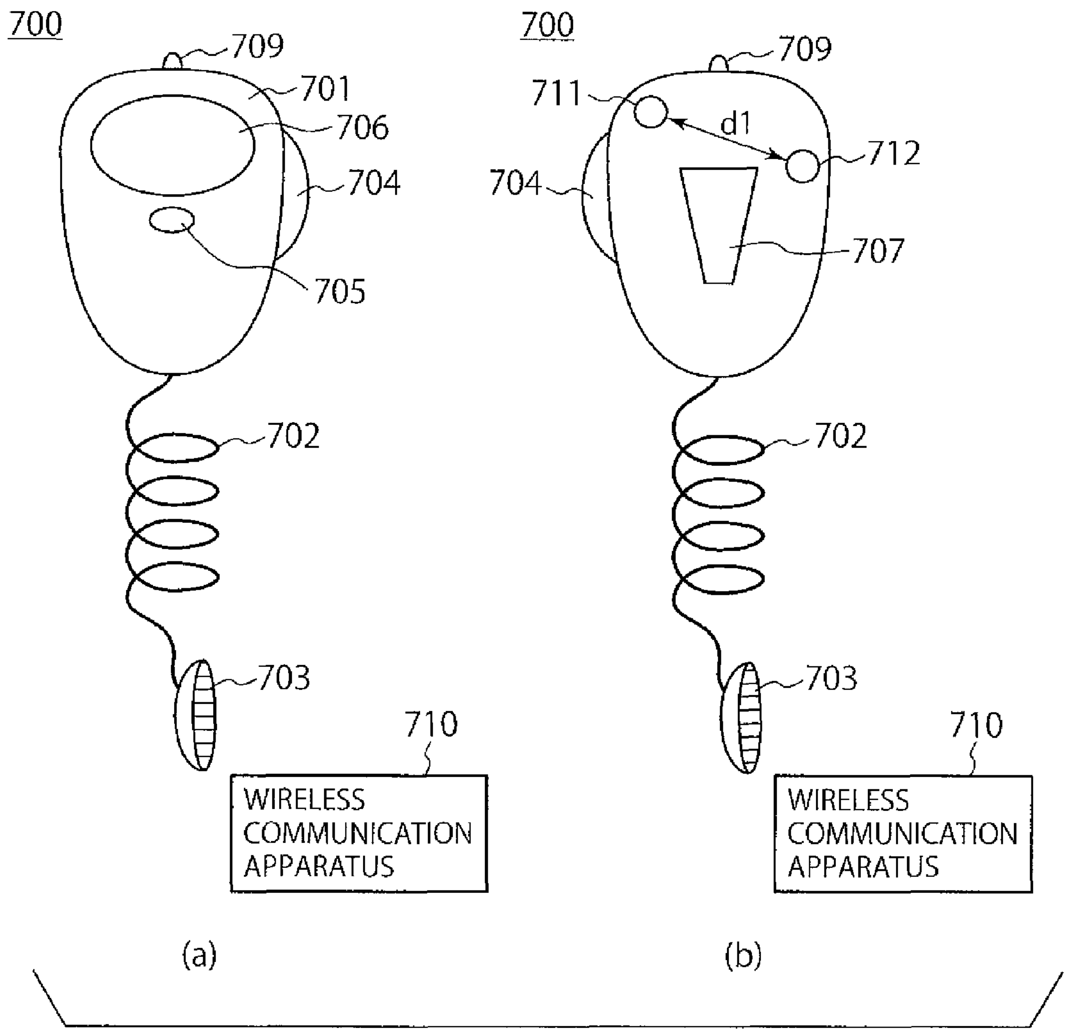
FIG. 19 is a schematic illustration of an audio input apparatus according to a fourth embodiment of the present invention.

FIG. 19 is a schematic illustration of an audio input apparatus 700 having the noise reduction apparatus 3 or 4 installed therein, with views (a) and (b) showing the front and rear faces of the audio input apparatus 700, respectively.

As shown in FIG. 19, the audio input apparatus 700 is detachably connected to a wireless communication apparatus 710. The wireless communication apparatus 710 is an ordinary wireless communication apparatus for use in wireless communication at a specific frequency.

The audio input apparatus 700 has a main body 701 equipped with a cord 702 and a connector 703. The main body 701 is formed having a specific size and shape so that a user can grab it with no difficulty. The main body 701 houses several types of parts, such as, a microphone, a speaker, an electronic circuit, and the noise reduction apparatus 3 or 4 of the present invention.

As shown in the view (a) of FIG. 19, a main microphone 705 and a speaker 706 are provided on the front face of the main body 701. Provided on the rear face of the main body 701 are a belt clip 707 and sub-microphones 711 and 712, as shown in the view (b) of FIG. 19. Provided at the top and the side of the main body 701 are an LED 709 and a PTT (Push To Talk) unit 704, respectively. The LED 709 informs a user of the user's voice pick-up state detected by the audio input apparatus 700. The PTT unit 704 has a switch that is pushed into the main body 701 to switch the wireless communication apparatus 710 into a speech transmission state.

The noise reduction apparatus 3 (FIG. 11) according to the second embodiment can be installed in the audio input apparatus 700. In this case, the main microphone 101 of the noise reduction apparatus 3 corresponds to the main microphone 705 shown in the view (a) of FIG. 19. Moreover, the sub-microphones 102 and 103 of the noise reduction apparatus 3 correspond to the sub-microphones 711 and 712, respectively, shown in the view (b) of FIG. 19.

The output signal 128 (FIG. 11) output from the noise reduction apparatus 3 is supplied from the audio input apparatus 700 to the wireless communication apparatus 710 through the cord 702. The wireless communication apparatus 710 can transmit a low-noise voice sound to another wireless communication apparatus when the output signal 128 supplied thereto is a signal output after the noise reduction process (step S57 in FIG. 16) is performed. The same is applied to the noise reduction apparatus 4 shown in FIG. 17 according to the third embodiment.

In the audio input apparatus 700 according to the fourth embodiment, as shown in the view (a) of FIG. 19, the main microphone (a first microphone) 705 is provided on the front face (a first face) of the main body 701. On the other hand, the sub-microphones (a second and a third microphone) 711 and 712 are provided on the rear face (a second face) of the main body 701, as shown in the view (b) of FIG. 19.

Figure 20:
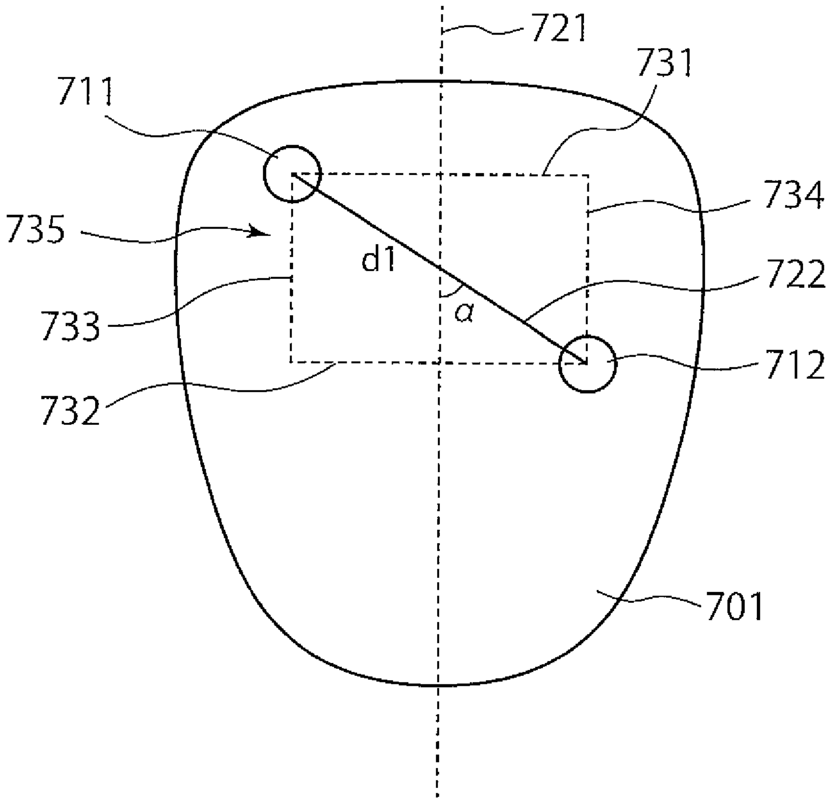
FIG. 20 is a view showing an exemplary arrangement of sub-microphones on the rear face of the audio input apparatus according to the fourth embodiment of the present invention.

FIG. 20 is a view showing the arrangement of the sub-microphones 711 and 712 on the rear face of the audio input apparatus 700 according to the fourth embodiment.

In the audio input apparatus 700 according to the fourth embodiment, as shown in FIG. 20, the sub-microphones 711 and 712 are provided on the rear face (the second face) that is apart from the front face (the first face) with a specific distance, asymmetrically with respect to a center line 721 on the rear face with a specific distance d1. The distance d1 may be in the range from about 3 cm to 7 cm, for example. The distance between the front face (the first face) and the rear face (the second face) of the audio input apparatus 700 may be in the range from about 2 cm to 4 cm, for example.

The sub-microphones 711 and 712 are required to be provided on the rear face (the second face) asymmetrically with respect to the center line 721 with the specific distance d1 so that both of the sub-microphones 711 and 712 cannot be covered with a user's hand when the user holds the audio input apparatus 700. The arrangement of the sub-microphones 711 and 712 achieves highly accurate noise reduction by the noise reduction apparatus 3 or 4 using at least either the sub-microphone 711 or 712.

Moreover, the sub-microphones 711 and 712 may be provided on the rear face of the audio input apparatus 700 with an angle $\alpha$ between the center line 721 and a line 722 that connects the sub-microphones 711 and 712. The angle $\alpha$ may be set to be a value that satisfies an expression tangent $\alpha=a/b$ where a and b are two sides (lines 731 and 733) of a rectangle 735 that can be formed on the rear face of the audio input apparatus 700 as large as possible. When the rectangle is a square, the angle $\alpha$ is about 45 degrees. The angle $\alpha$ becomes smaller as two opposite sides of the rectangle become longer than the other two opposite sides like an oblong on the rear face of the audio input apparatus 700.

Furthermore, the sub-microphones 711 and 712 may be provided on a diagonal of the rectangle 735 on the rear face of the audio input apparatus 700, that is formed of two lines 731 and 732 that intersect with the center line 721 and other two lines 733 and 734 arranged on both sides of the center line 721 symmetrically. The arrangement of the sub-microphones 711 and 712 on a diagonal of a rectangle on the rear face of the audio input apparatus 700 allows the selection of a noise-dominant signal that can be effectively used in the noise reduction process even if noise sounds come from several directions.

Embodiment 5

Explained next is another application of a noise reduction apparatus (according to the embodiment 2 or 3, for example)

equipped with at least three microphones to a wireless communication apparatus (a transceiver, for example) according to the present invention.

Figure 21:
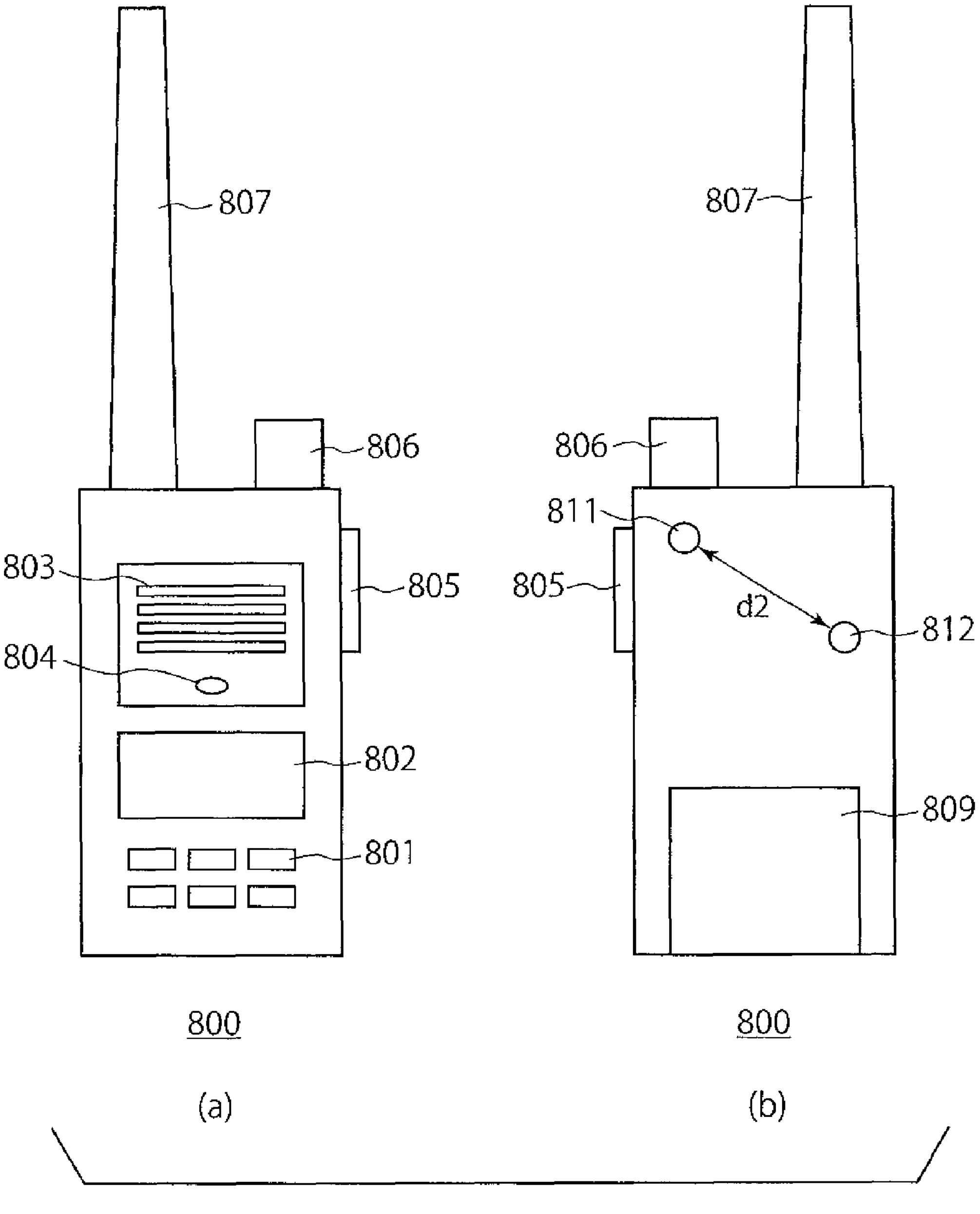
FIG. 21 is a schematic illustration of a wireless communication apparatus according to a fifth embodiment of the present invention.

FIG. 21 is a schematic illustration of a wireless communication apparatus 800 having a reduction apparatus equipped with at least three microphones installed therein, with views (a) and (b) showing the front and rear faces of the wireless communication apparatus 800, respectively.

The wireless communication apparatus 800 is equipped with input buttons 801, a display screen 802, a speaker 803, a main microphone 804, a PTT (Push To Talk) unit 805, a switch 806, an antenna 807, a cover 809, and sub-microphones 811 and 812.

The noise reduction apparatus 3 (FIG. 11) according to the second embodiment can be installed in the wireless communication apparatus 800. In this case, the main microphone 101 of the noise reduction apparatus 3 corresponds to the main microphone 804 shown in the view (a) of FIG. 21. Moreover, the sub-microphones 102 and 103 of the noise reduction apparatus 3 correspond to the sub-microphones 811 and 812, respectively, shown in the view (b) of FIG. 21.

The output signal 128 (FIG. 11) output from the noise reduction apparatus 1 undergoes a high-frequency process by an internal circuit of the wireless communication apparatus 800 and is transmitted via the antenna 807 to another wireless communication apparatus. The wireless communication apparatus 800 can transmit a low-noise voice sound to another wireless communication apparatus when the output signal 128 supplied thereto is a signal output after the noise reduction process (step S57 in FIG. 16) is performed. The same is applied to the noise reduction apparatus 4 shown in FIG. 17 according to the third embodiment.

In the wireless communication apparatus 800 according to the fifth embodiment, as shown in the view (a) of FIG. 21, the main microphone (a first microphone) 804 is provided on the front face (a first face) of the wireless communication apparatus 800.

On the other hand, as shown in the view (b) of FIG. 21, the sub-microphones (a second and a third microphone) 811 and 812 are provided on the rear face (a second face) of the wireless communication apparatus 800, asymmetrically with respect to a center line (not shown) on the rear face with a specific distance d2, in the similar manner for the sub-microphones 711 and 712, as shown in FIG. 20. The distance d2 may be in the range from about 3 cm to 7 cm, for example. The distance between the front face (the first face) and the rear face (the second face) of the wireless communication apparatus 800 may be in the range from about 2 cm to 4 cm, for example.

The sub-microphones 811 and 812 are required to be provided on the rear face (the second face) asymmetrically with respect to a center line (not shown) on the rear face with the specific distance d2 so that both of the sub-microphones 811 and 812 cannot be covered with a user's hand when the user holds the wireless communication apparatus 800. The arrangement of the sub-microphones 811 and 812 achieves highly accurate noise reduction by the noise reduction apparatus 3 or 4 using at least either the sub-microphone 811 or 812.

Moreover, the sub-microphones 811 and 812 may be provided on the rear face of the wireless communication apparatus 800 with an angle $\alpha$ between a center line (not shown) and a line 722 that connects the sub-microphones 711 and 712. The center line (not shown) lies on the rear face of the wireless communication apparatus 800 between the top and bottom sides and passes through the center of a line that connects the sub-microphones 811 and 812 with the distance d2. The angle $\alpha$ may be set to be a value that satisfies an expression tangent $\alpha$=a/b where a and b are two sides of a rectangle that can be formed on the rear face of the wireless communication apparatus 800 as large as possible. When the rectangle is a square, the angle $\alpha$ is about 45 degrees. The angle $\alpha$ becomes smaller as two opposite sides of the rectangle become longer than the other two opposite sides like an oblong on the rear face of the wireless communication apparatus 800.

Furthermore, the sub-microphones 811 and 812 may be provided on the rear face on a diagonal of a rectangle that is formed of two parallel lines that intersect with the center line described above and other two parallel lines arranged on both sides of the center line. The arrangement of the sub-microphones 811 and 812 on a diagonal of a rectangle on the rear face of the wireless communication apparatus 800 allows the selection of a noise-dominant signal that can be effectively used in the noise reduction process even if noise sounds come from several directions.

As described above in detail with several embodiments, it is preferable that a noise reduction apparatus includes: a signal decider configured to decide a first sound pick-up signal and a second sound pick-up signal to be used for reducing a noise component carried by the first sound pick-up signal, from among a plurality of sound pick-up signals obtained based on sounds picked up by a plurality of microphones, based on phase difference information on the plurality of sound pick-up signals; and an adaptive filter configured to reduce the noise component carried by the first sound pick-up signal using the second sound pick-up signal.

It is preferable for the noise reduction apparatus to include a speech segment determiner configured to determine whether or not a sound picked up by one of the plurality of microphones is a speech segment based on a sound pick-up, signal obtained based on the sound picked up by the one of the plurality of microphones. In this case, it is preferable for the signal decider to decide the first and second sound pick-up signals from among the plurality of sound pick-up signals when it is determined that the sound picked up by the one of the plurality of microphones is the speech segment.

It is preferable for the noise reduction apparatus to include a speech segment determiner configured to determine whether or not a sound picked up by one of the plurality of microphones is a speech segment based on the first sound pick-up signal decided by the signal decider. In this case, it is preferable for the adaptive filter to reduce a noise component carried by the first sound pick-up signal using the second sound pick-up signal when it is determined that the sound picked up by one of the plurality of microphones is the speech segment.

It is also preferable for the signal decider to decide a sound pick-up signal having the most advanced phase among the plurality of sound pick-up signals as the first sound pick-up signal and a sound pick-up signal having the most delayed phase among the plurality of sound pick-up signals as the second sound pick-up signal to be used for reducing a noise component carried by the first sound pick-up signal.

Moreover, it is preferable for the signal decider to decide a sound pick-up signal having the most delayed phase among the plurality of sound pick-up signals and having a power that is larger than a predetermined value as the second sound pick-up signal to be used for reducing a noise component carried by the first sound pick-up signal.

Moreover, there is a case where a sound pick-up signal having the most delayed phase among the plurality of sound pick-up signals has a power equal to or smaller than a predetermined value. In this case, it is preferable for the signal decider to decide a specific sound pick-up signal as the second sound pick-up signal to be used for reducing a noise component carried by the first sound pick-up signal, a phase of the specific sound pick-up signal being delayed next to the most delayed phase among the plurality of sound pick-up signal.

Moreover, there is a case where each phase difference between sound pick-up signals among the plurality of sound pick-up signals is within a predetermined range except for the first sound pick-up signal. In this case, it is preferable for the signal decider to decide a specific sound pick-up signal as the second sound pick-up signal to be used for reducing a noise component carried by the first sound pick-up signal, a power of the specific sound pick-up signal being the largest among the plurality of sound pick-up signals except for the first sound pick-up signal.

Furthermore, it is preferable for the noise reduction apparatus that the plurality of microphones includes one main microphone that picks up a sound mainly including a voice component and a plurality of sub-microphones that pick up a sound mainly including a noise component.

When there are one main microphone and a plurality of sub-microphones, there is a case where a phase of a specific sound pick-up signal obtained based on a sound picked up by a specific sub-microphone among the plurality of sub-microphones (the phase of the specific sound pick-up signal being most advanced among phases of sound pick-up signals obtained based on sounds picked up by the plurality of sub-microphones) is more advanced than a phase of a sound pick-up signal obtained based on a sound picked up by the main microphone. In this case, it is preferable for the signal decider to decide the specific sound pick-up signal as the first sound pick-up signal to be subjected to reduction of a noise component.

Also when there are one main microphone and a plurality of sub-microphones, there is a case where a phase of a specific sound pick-up signal obtained based on a sound picked up by a specific sub-microphone among the plurality of sub-microphones (the phase of the specific sound pick-up signal being most delayed among phases of sound pick-up signals obtained based on sounds picked up by the plurality of sub-microphones) is more delayed than a phase of a sound pick-up signal obtained based on a sound picked up by the main microphone. In this case, it is preferable for the signal decider to decide the specific sound pick-up signal as the second sound pick-up signal to be used for reducing a noise component carried by the first sound pick-up signal.

It is preferable for the noise reduction apparatus that signals are supplied to the signal decider as the plurality of sound pick-up signals at a sampling frequency of 24 KHz or higher and signals are supplied to the adaptive filter as the plurality of sound pick-up signals at a sampling frequency of 12 KHz or lower.

Moreover, it is preferable that an audio input apparatus includes: a first face and an opposite second face that is apart from the first face with a specific distance; a plurality of microphones among which a first microphone is provided on the first face, and a second microphone and a third microphone are provided on the second face asymmetrically with respect to a center line on the second face; a signal decider configured to decide a first sound pick-up signal and a second sound pick-up signal to be used for reducing a noise component carried by the first sound pick-up signal, from among a plurality of sound pick-up signals obtained based on sounds picked up by the plurality of microphones, based on phase difference information on the plurality of sound pick-up signals; and an adaptive filter configured to reduce a noise component carried by the first sound pick-up signal using the second sound pick-up signal.

It is also preferable that a wireless communication apparatus includes: a first face and an opposite second face that is apart from the first face with a specific distance; a plurality of microphones among which a first microphone is provided on the first face, and a second microphone and a third microphone are provided on the second face asymmetrically with respect to a center line on the second face; a signal decider configured to decide a first sound pick-up signal and a second sound pick-up signal to be used for reducing a noise component carried by the first sound pick-up signal, from among a plurality of sound pick-up signals obtained based on sounds picked up by the plurality of microphones, based on phase difference information on the plurality of sound pick-up signals; and an adaptive filter configured to reduce a noise component carried by the first sound pick-up signal using the second sound pick-up signal.

Furthermore, it is preferable that a noise reduction method includes the steps of: deciding a first sound pick-up signal and a second sound pick-up signal to be used for reducing a noise component carried by the first sound pick-up signal, from among a plurality of sound pick-up signals obtained based on sounds picked up by a plurality of microphones, based on phase difference information on the plurality of sound pick-up signals; and reducing a noise component carried by the first sound pick-up signal using the second sound pick-up signal.

Moreover, it is preferable that an audio input apparatus has a noise reduction apparatus that includes: a first face and an opposite second face that is apart from the first face with a specific distance; a first microphone that picks up a sound mainly including a voice component, the first microphone being provided on the first face; and a second microphone and a third microphone that pick up a sound mainly including a noise component, the second and third microphones being provided on the second face asymmetrically with respect to a center line on the second face.

It is preferable for the audio input apparatus that the second and third microphones are provided on the second face with a predetermined angle between the center line and a line that connects the second and third microphones. It is also preferable for the audio input apparatus that the second and third microphones are provided a diagonal of a rectangle on the second face, the rectangle being formed of two lines that intersect with the center line and other two lines arranged on both sides of the center line symmetrically.

Moreover, it is preferable that a wireless communication apparatus has a noise reduction apparatus that includes: a first face and an opposite second face that is apart from the first face with a specific distance; a first microphone that picks up a sound mainly including a voice component, the first microphone being provided on the first face; and a second microphone and a third microphone that pick up a sound mainly including a noise component, the second and third microphones being provided on the second face asymmetrically with respect to a center line on the second face.

It is preferable for the wireless communication apparatus that the second and third microphones are provided on the second face with a predetermined angle between the center line and a line that connects the second and third microphones. It is also preferable for the wireless communication apparatus that the second and third microphones are provided a diagonal of a rectangle on the second face, the rectangle being formed of two lines that intersect with the center line and other two lines arranged on both sides of the center line symmetrically.

It is further understood by those skilled in the art that the foregoing description is a preferred embodiment of the disclosed device or method and that various changes and modifications may be made in the invention without departing from the spirit and scope thereof.

As described above in detail, the present invention offers a noise reduction apparatus, an audio input apparatus, a wireless communication apparatus, and a noise reduction method that can reduce a noise component carried by a voice signal in a variety of environments.

What is claimed is:

1. A noise reduction apparatus comprising:

a speech segment determiner configured to determine whether or not a sound picked up by at least either a first microphone or a second microphone is a speech segment and to output speech segment information when it is determined that the sound picked up by the first or the second microphone is the speech segment;

a voice direction detector configured, when receiving the speech segment information, to detect a voice incoming direction indicating from which direction a voice sound travels, based on a first sound pick-up signal obtained based on a sound picked up by the first microphone and a second sound pick-up signal obtained based on a sound picked up by the second microphone and to output voice incoming-direction information when the voice incoming direction is detected; and an adaptive filter configured to perform a noise reduction process using the first and second sound pick-up signals based on the speech segment information and the voice incoming-direction information.

2. The noise reduction apparatus according to claim 1, wherein the voice direction detector detects the voice incoming direction based on a phase difference between the first and second sound pick-up signals.

3. The noise reduction apparatus according to claim 2, wherein the adaptive filter performs the noise reduction process to reduce a noise component carried by the first sound pick-up signal using the second sound pick-up signal when the first sound pick-up signal has a more advanced phase than the second sound pick-up signal whereas the adaptive filter performs the noise reduction process to reduce a noise component carried by the second sound pick-up signal using the first sound pick-up signal when the second sound pick-up signal has a more advanced phase than the first sound pick-up signal.

4. The noise reduction apparatus according to claim 2, wherein when the phase difference is within a predetermined range, the adaptive filter outputs either the first or the second sound pick-up signal without performing the noise reduction process.

5. The noise reduction apparatus according to claim 1, wherein the voice direction detector detects the voice incoming direction based on magnitudes of the first and second sound pick-up signals.

6. The noise reduction apparatus according to claim 5, wherein the adaptive filter performs the noise reduction process to reduce a noise component carried by the first sound pick-up signal using the second sound pick-up signal when the first sound pick-up signal has a greater magnitude than the second sound pick-up signal whereas the adaptive filter performs the noise reduction process to reduce a noise component carried by the second sound pick-up signal using the first sound pick-up signal when the second sound pick-up signal has a greater magnitude than the first sound pick-up signal.

7. The noise reduction apparatus according to claim 5, wherein when a power difference that is a difference between magnitudes of the first and second sound pick-up signals is within a predetermined range, the adaptive filter outputs either the first or the second sound pick-up signal without performing the noise reduction process.

8. The noise reduction apparatus according to claim 1, wherein the voice direction detector detects the voice incoming direction based on a phase difference between the first and second sound pick-up signals and magnitudes of the first and second sound pick-up signals.

9. The noise reduction apparatus according to claim 1, wherein the speech segment determiner detects the speech segment based on the first sound pick-up signal when the first sound pick-up signal has a more advanced phase than the second sound pick-up signal whereas the speech segment determiner detects the speech segment based on the second sound pick-up signal when the second sound pick-up signal has a more advanced phase than the first sound pick-up signal.

10. The noise reduction apparatus according to claim 1, wherein signals are supplied to the voice direction detector as the first and second sound pick-up signals at a sampling frequency of 24 KHz or higher and signals are supplied to the adaptive filter as the first and second sound pick-up signals at a sampling frequency of 12 KHz or lower.

11. The noise reduction apparatus according to claim 1, wherein the speech segment determiner outputs more accurate speech segment information to the voice direction detector than speech segment information to the adaptive filter.

12. An audio input apparatus comprising:

a first face and an opposite second face that is apart from the first face with a specific distance;

a first microphone and a second microphone provided on the first face and the second face, respectively;

a speech segment determiner configured to determine whether or not a sound picked up by at least either the first microphone or the second microphone is a speech segment and to output speech segment information when it is determined that the sound picked up by the first or the second microphone is the speech segment;

a voice direction detector configured, when receiving the speech segment information, to detect a voice incoming direction indicating from which direction a voice sound travels, based on a first sound pick-up signal obtained based on a sound picked up by the first microphone and a second sound pick-up signal obtained based on a sound picked up by the second microphone and to output voice incoming-direction information when the voice incoming direction is detected; and an adaptive filter configured to perform a noise reduction process using the first and second sound pick-up signals based on the speech segment information and the voice incoming-direction information.

13. A noise reduction method comprising the steps of:

determining whether or not a sound picked up by at least either a first microphone or a second microphone is a speech segment;

detecting a voice incoming direction indicating from which direction a voice sound travels, based on a first sound pick-up signal obtained based on a sound picked up by the first microphone and a second sound pick-up signal obtained based on a sound picked up by the second microphone, when it is determined that the sound picked up by the first or the second microphone is the speech segment; and performing a noise reduction process using the first and second sound pick-up signals based on speech segment information indicating that the sound picked up by the first or the second microphone is the speech segment and voice incoming-direction information indicating the voice incoming direction.

14. The noise reduction method according to claim 13, the voice incoming direction is detected based on a phase difference between the first and second sound pick-up signals.

15. The noise reduction method according to claim 14, wherein the noise reduction process is performed to reduce a noise component carried by the first sound pick-up signal using the second sound pick-up signal when the first sound pick-up signal has a more advanced phase than the second sound pick-up signal whereas the noise reduction process is performed to reduce a noise component carried by the second sound pick-up signal using the first sound pick-up signal when the second sound pick-up signal has a more advanced phase than the first sound pick-up signal.

16. The noise reduction method according to claim 14, wherein when the phase difference is within a predetermined range, the adaptive filter outputs either the first or the second sound pick-up signal without performing the noise reduction process.

17. The noise reduction method according to claim 14, wherein the voice incoming direction is detected based on magnitudes of the first and second sound pick-up signals.

18. The noise reduction method according to claim 17, wherein the noise reduction process is performed to reduce a noise component carried by the first sound pick-up signal using the second sound pick-up signal when the first sound pick-up signal has a greater magnitude than the second sound pick-up signal whereas the noise reduction process is performed to reduce a noise component carried by the second sound pick-up signal using the first sound pick-up signal when the second sound pick-up signal has a greater magnitude than the first sound pick-up signal.

19. The noise reduction method according to claim 14, wherein the voice incoming direction is detected based on a phase difference between the first and second sound pick-up signals and magnitudes of the first and second sound pick-up signals.

20. The noise reduction method according to claim 19, wherein the speech segment is detected based on the first sound pick-up signal when the first sound pick-up signal has a more advanced phase than the second sound pick-up signal whereas the speech segment is detected based on the second sound pick-up signal when the second sound pick-up signal has a more advanced phase than the first sound pick-up signal.

* * * * *